Dec. 2, 1958 W. BUCHHOLZ ET AL 2,863,134
ADDRESS SELECTION SYSTEM FOR A MAGNETIC DRUM
Filed Oct. 25, 1952 35 Sheets-Sheet 1

INVENTORS
WERNER BUCHHOLZ
CECIL A. DEUTSCHLE
DAVID J. CRAWFORD
BY A. J. Etienne
ATTORNEY

ADDRESS SELECTION SYSTEM FOR A MAGNETIC DRUM

Filed Oct. 25, 1952 35 Sheets-Sheet 2

INVENTORS
WERNER BUCHHOLZ
CECIL A. DEUTSCHLE
DAVID J. CRAWFORD
BY A. J. Etienne
ATTORNEY

ADDRESS SELECTION SYSTEM FOR A MAGNETIC DRUM

Filed Oct. 25, 1952

INVENTORS
WERNER BUCHHOLZ
CECIL A. DEUTSCHLE
DAVID J. CRAWFORD

BY A. J. Etienne

ATTORNEY

INVENTORS
WERNER BOCHHOLZ
CECIL A. DEUTSCHLE
DAVID J. CRAWFORD
BY A. J. Etienne
ATTORNEY INVENTORS
WERNER BOCHHOLZ
CECIL A. DEUTSCHLE
DAVID J. CRAWFORD
BY A. J. Etienne
ATTORNEY INVENTORS
WERNER BUCHHOLZ
CECIL A. DEUTSCHLE
DAVID J. CRAWFORD
BY A. J. Etienne
ATTORNEY INVENTORS
WERNER BUCHHOLZ
CECIL A. DEUTSCHLE
DAVID J. CRAWFORD
BY A. J. Etienne
ATTORNEY

ADDRESS SELECTION SYSTEM FOR A MAGNETIC DRUM

INVENTORS
WERNER BUSHHOLZ
CECIL A. DEUTSCHLE
DAVID J. CRAWFORD
BY A. J. Etienne
ATTORNEY INVENTORS
WERNER BUCHHOLZ
CECIL A. DEUTSCHLE
DAVID J. CRAWFORD
BY A. J. Etienne
ATTORNEY Dec. 2, 1958 W. BUCHHOLZ ET AL 2,863,134

ADDRESS SELECTION SYSTEM FOR A MAGNETIC DRUM

Filed Oct. 25, 1952 35 Sheets-Sheet 10

DRUM CTR CIRCUITS

INVENTOR
WERNER BUCHHOLZ
CECIL A. DEUTSCHLE
BY DAVID J. CRAWFORD
A. J. Etienne
ATTORNEY Dec. 2, 1958 W. BUCHHOLZ ET AL 2,863,134

ADDRESS SELECTION SYSTEM FOR A MAGNETIC DRUM

Filed Oct. 25, 1952 35 Sheets-Sheet 11

INVENTORS
WERNER BUCHHOLZ
CECIL A. DEUTSCHLE
DAVID J. CRAWFORD
BY A. J. Etienne
ATTORNEY

ADDRESS SELECTION SYSTEM FOR A MAGNETIC DRUM

Filed Oct. 25, 1952 35 Sheets-Sheet 12

INVENTOR
WERNER BUCHHOLZ
CECIL A. DEUTSCHLE
DAVID J. CRAWFORD
BY A. J. Etienne
ATTORNEY INVENTORS
WERNER BUCHHOLZ
CECIL A. DEUTSCHLE
DAVID J. CRAWFORD
BY A. J. Etienne
ATTORNEY

ADDRESS SELECTION SYSTEM FOR A MAGNETIC DRUM

Filed Oct. 25, 1952 35 Sheets-Sheet 14

INVENTORS
WERNER BUSHHOLZ
CECIL A. DEUTSCHLE
DAVID J. CRAWFORD
BY A. J. Etienne
ATTORNEY

DRUM READ-WRITE TIMING CIRCUITS

INVENTORS
WERNER BUCHHOLZ
CECIL A. DEUTSCHLE
DAVID J. CRAWFORD
BY A. J. Etienne
ATTORNEY INVENTORS
WERNER BUCHHOLZ
CECIL A. DEUTSCHLE
DAVID J. CRAWFORD
BY A. J. Etienne
ATTORNEY INVENTORS
WERNER BUCHHOLZ
CECIL A. DEUTSCHLE
DAVID J. CRAWFORD
BY A. J. Etienne
ATTORNEY

ADDRESS SELECTION SYSTEM FOR A MAGNETIC DRUM

Filed Oct. 25, 1952 35 Sheets-Sheet 18

INVENTOR
WERNER BUCHHOLZ
CECIL A. DEUTSCHLE
DAVID J. CRAWFORD
BY A. J. Etienne
ATTORNEY Dec. 2, 1958 W. BUCHHOLZ ET AL 2,863,134

ADDRESS SELECTION SYSTEM FOR A MAGNETIC DRUM

Filed Oct. 25, 1952 35 Sheets-Sheet 19

INVENTORS
WERNER BUCHHOLZ
CECIL A. DEUTSCHLE
DAVID J. CRAWFORD

BY A. J. Etienne
ATTORNEY

DRUM RELAY SWITCHING CIRCUITS

INVENTORS
WERNER BUCHHOLZ
CECIL A. DEUTSCHLE
DAVID J. CRAWFORD
BY A. J. Etienne
ATTORNEY

DRUM RELAY SWITCHING CIRCUITS

INVENTORS
WERNER BUCHHOLZ
CECIL A. DEUTSCHLE
DAVID J. CRAWFORD
BY A. J. Etienne
ATTORNEY

ADDRESS SELECTION SYSTEM FOR A MAGNETIC DRUM

Filed Oct. 25, 1952 35 Sheets-Sheet 22

INVENTORS
WERNER BUCHHOLZ
CECIL A. DEUTSCHLE
DAVID J. CRAWFORD
BY A. J. Etienne
ATTORNEY INVENTORS
WERNER BUCHHOLZ
CECIL A. DEUTSCHLE
DAVID J. CRAWFORD
BY A. J. Etienne
ATTORNEY INVENTORS
WERNER BUCHHOLZ
CECIL A. DEUTSCHLE
DAVID J. CRAWFORD
BY A. J. Etienne
ATTORNEY

ADDRESS SELECTION SYSTEM FOR A MAGNETIC DRUM

Filed Oct. 25, 1952 35 Sheets-Sheet 25

INVENTORS
WERNER BUCHHOLZ
CECIL A. DEUTSCHLE
DAVID J. CRAWFORD
BY A. J. Etienne
ATTORNEY

ADDRESS SELECTION SYSTEM FOR A MAGNETIC DRUM

INVENTORS
WERNER BUCHHOLZ
CECIL A. DEUTSCHLE
DAVID J. CRAWFORD
BY A. J. Etienne
ATTORNEY INVENTORS
WERNER BUCHHOLZ
CECIL A. DEUTSCHLE
DAVID J. CRAWFORD
BY A. J. Etienne
ATTORNEY INVENTORS
WERNER BUCHHOLZ
CECIL A. DEUTSCHLE
DAVID J. CRAWFORD
BY A. J. Etienne
ATTORNEY

ADDRESS SELECTION SYSTEM FOR A MAGNETIC DRUM

Filed Oct. 25, 1952 35 Sheets-Sheet 29

INVENTORS
WERNER BUCHHOLZ
CECIL A. DEUTSCHLE
BY DAVID J. CRAWFORD
A. J. Etienne
ATTORNEY

ADDRESS SELECTION SYSTEM FOR A MAGNETIC DRUM

Filed Oct. 25, 1952 35 Sheets-Sheet 30

INVENTORS
WERNER BUCHHOLZ
CECIL A. DEUTSCHLE
DAVID J. CRAWFORD
BY A. J. Etienne
ATTORNEY INVENTORS
WERNER BUCHHOLZ
CECIL A. DEUTSCHLE
DAVID J. CRAWFORD
BY A. J. Etienne
ATTORNEY Dec. 2, 1958 W. BUCHHOLZ ET AL 2,863,134

ADDRESS SELECTION SYSTEM FOR A MAGNETIC DRUM

Filed Oct. 25, 1952 35 Sheets-Sheet 32

INVENTORS
WERNER BUCHHOLZ
CECIL A. DEUTSCHLE
DAVID J. CRAWFORD

BY A. J. Etienne

ATTORNEY

ADDRESS SELECTION SYSTEM FOR A MAGNETIC DRUM

Filed Oct. 25, 1952 35 Sheets-Sheet 33

INVENTORS
WERNER BUCHHOLZ
CECIL A. DEUTSCHLE
DAVID J. CRAWFORD
BY A. J. Etienne
ATTORNEY INVENTORS
WERNER BUCHHOLZ
CECIL A. DEUTSCHLE
DAVID J. CRAWFORD
BY A. J. Etienne
ATTORNEY

ADDRESS SELECTION SYSTEM FOR A MAGNETIC DRUM

INVENTORS
WERNER BUCHHOLZ
CECIL A. DEUTSCHLE
BY DAVID J. CRAWFORD
A. J. Etienne
ATTORNEY 2,863,134

ADDRESS SELECTION SYSTEM FOR A MAGNETIC DRUM

Werner Buchholz, Poughkeepsie, Cecil A. Deutschle, Verbank, and David J. Crawford, Poughkeepsie, N. Y., assignors to International Business Machines Corporation, New York, N. Y., a corporation of New York Application October 25, 1952, Serial No. 316,914

35 Claims. (Cl. 340—174)

The present invention relates to a magnetic drum data storage device for computers comprising a part of a complete data processing device and more particularly to completely automatic means for setting a drum address into a control device and utilizing said setting for selecting the address on the drum and also successive drum addresses by operation of said control device.

One of the objects of the present invention is to provide a count down counter with means for automatically setting up an indication of a drum address therein, which counter is in turn driven by pulses produced in synchronism with the drum rotation, to count down said counter setting until zero in the counter is reached, whereupon the data at this address is read or data is written on the drum, at that address, and without further settings of addresses into the counter, consecutively designated addresses may be read or written.

A further object is to provide a count down counter including cascade connected dual stability elements and means for resetting the counter to zero and then setting the counter to all 1's, prior to transfer of the address to the counter thus insuring that upon such transfer, no undesired flipping of the dual stability elements ensues.

Another object is to provide novel drum address selecting means whereby several addresses, distributed about the periphery of the drum, may be selectively sequentially chosen, in one single revolution of the drum.

A further object is to provide novel drum address selecting means for a plurality of drums, means to selectively produce either reading from or writing on the drum and means for automatically selecting an address for a single drum and selectively producting either reading or writing at the selected address.

Still another object is to provide, for a magnetic drum storage device, a drum address lay-out with addresses designated by consecutive number designations, distributed about the drum, and with certain other addresses interleaved with said first addresses, in combination with means to select the consecutively numbered addresses only, in one or more revolutions of the drum.

Still another object is to provide precessing means whereby consecutively numbered addresses may be laid out on the drum, the precessing means ensuring that no more than one number address is fixed at any particular spot on the drum periphery.

A further object is to provide a novel drum address selecting device for selecting a series of numbered addresses including an address designated as "zero," means producing control signals for initiating transfer of a desired address to the address selector, and means automatically operative when no such control signal is provided to produce selection of the zero address.

Another object is to provide a novel drum address selecting device controlled by a plurality of control signals and means effective when less than said full plurality of signals is provided for automatically selecting a zero address.

A further object is to provide novel drum address selecting device for use with a complete data processing system and means coordinating with said address selector and said system to provide necessary delays in the relative timing of their respective operations to thus produce a delayed synchronization of the respective parts.

Other objects of the invention will be pointed out in the following description and claims and illustrated in the accompanying drawings, which disclose, by way of examples, the principle of the invention and the best mode, which has been contemplated of applying that principle.

Figs. 5*a*–5*e* are diagrammatic representations of various wave forms produced during operation of the device.

Figure 6:
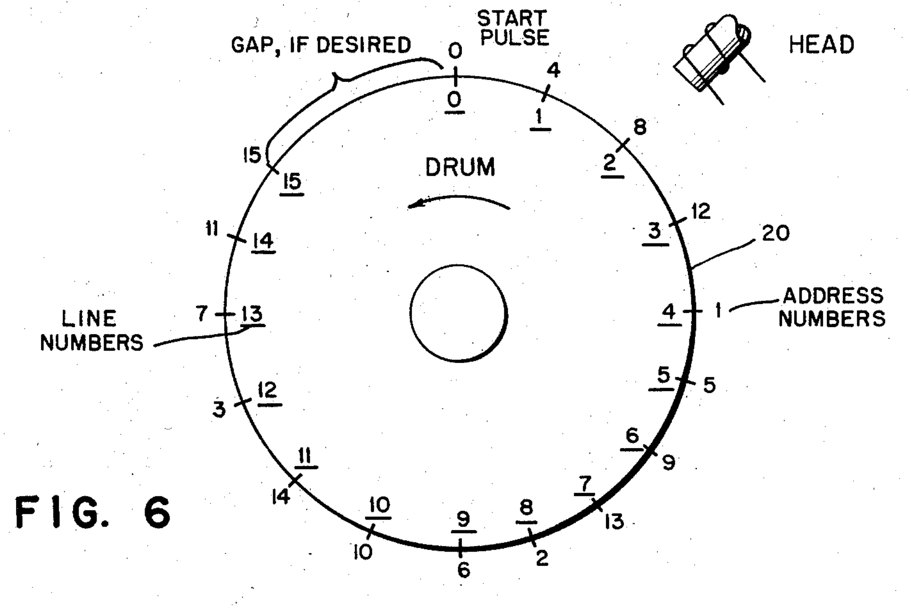

Fig. 6 is a simplified diagrammatic illustration of a drum and one head, illustrating the basic scheme of the invention.

Figure 7:
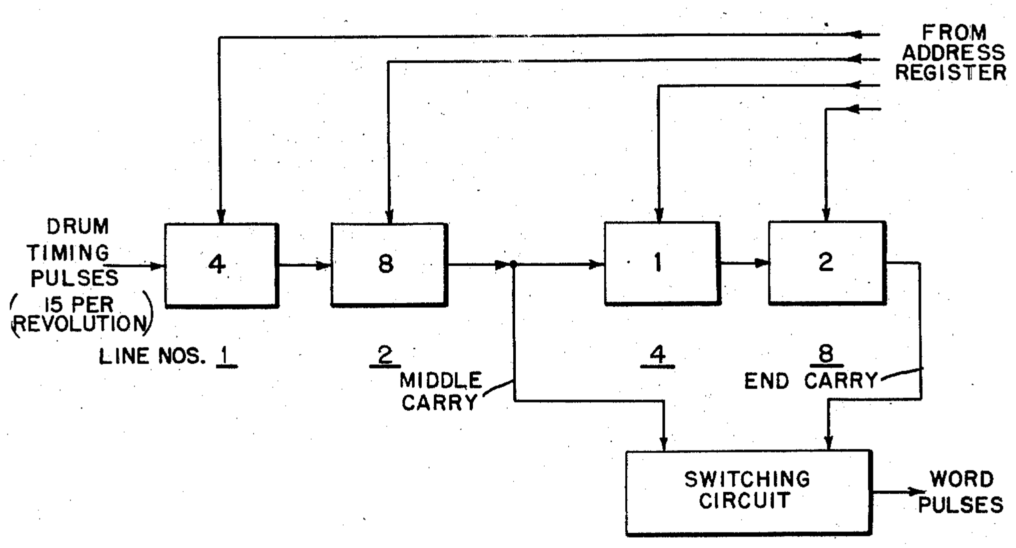

Fig. 7 is a block diagram of a counter to be used with the device of Fig. 6.

Figure 8:
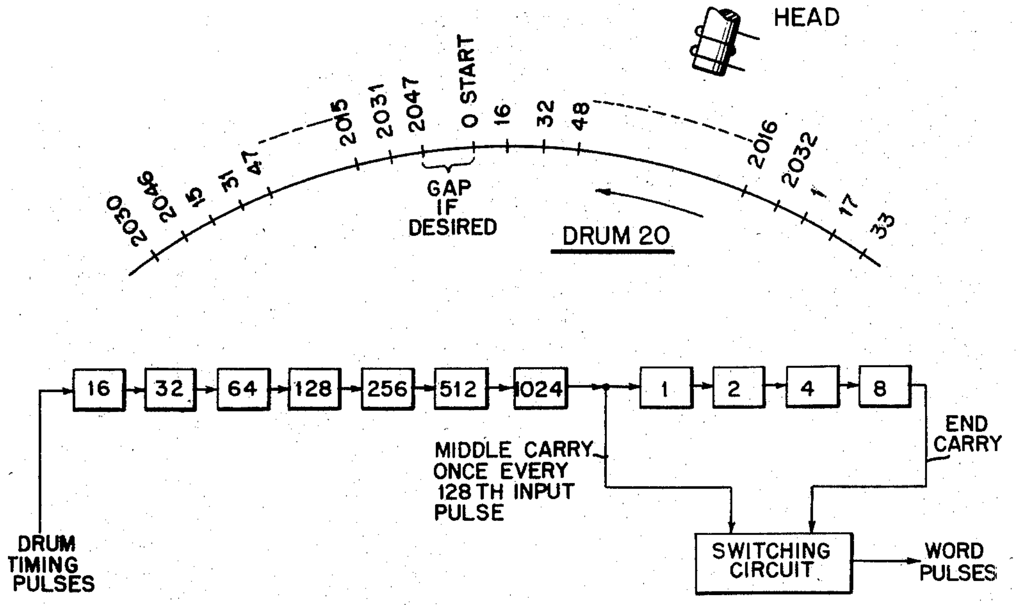

Fig. 8 is a view, on an enlarged scale, with respect to Fig. 6, illustrating a drum lay-out, with consecutively numbered addresses 128 lines apart, of a drum constructed for use with a complete data processing system and also a block diagram of a counter to be employed with the system of Fig. 8.

Figure 9:
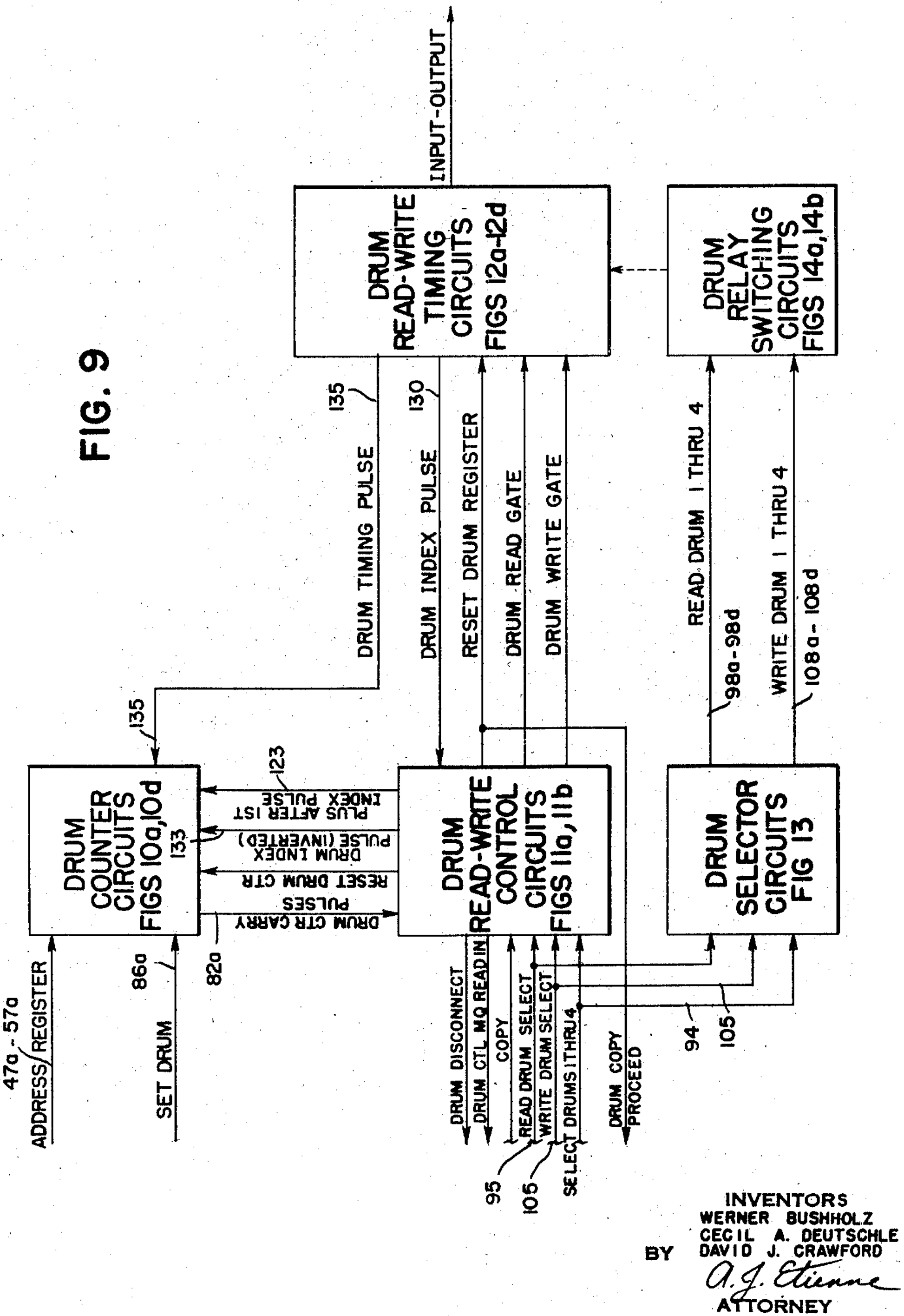

Fig. 9 is a master block diagram illustrating the relationships of the various block diagrams of the device.

Figures 10, 10A:
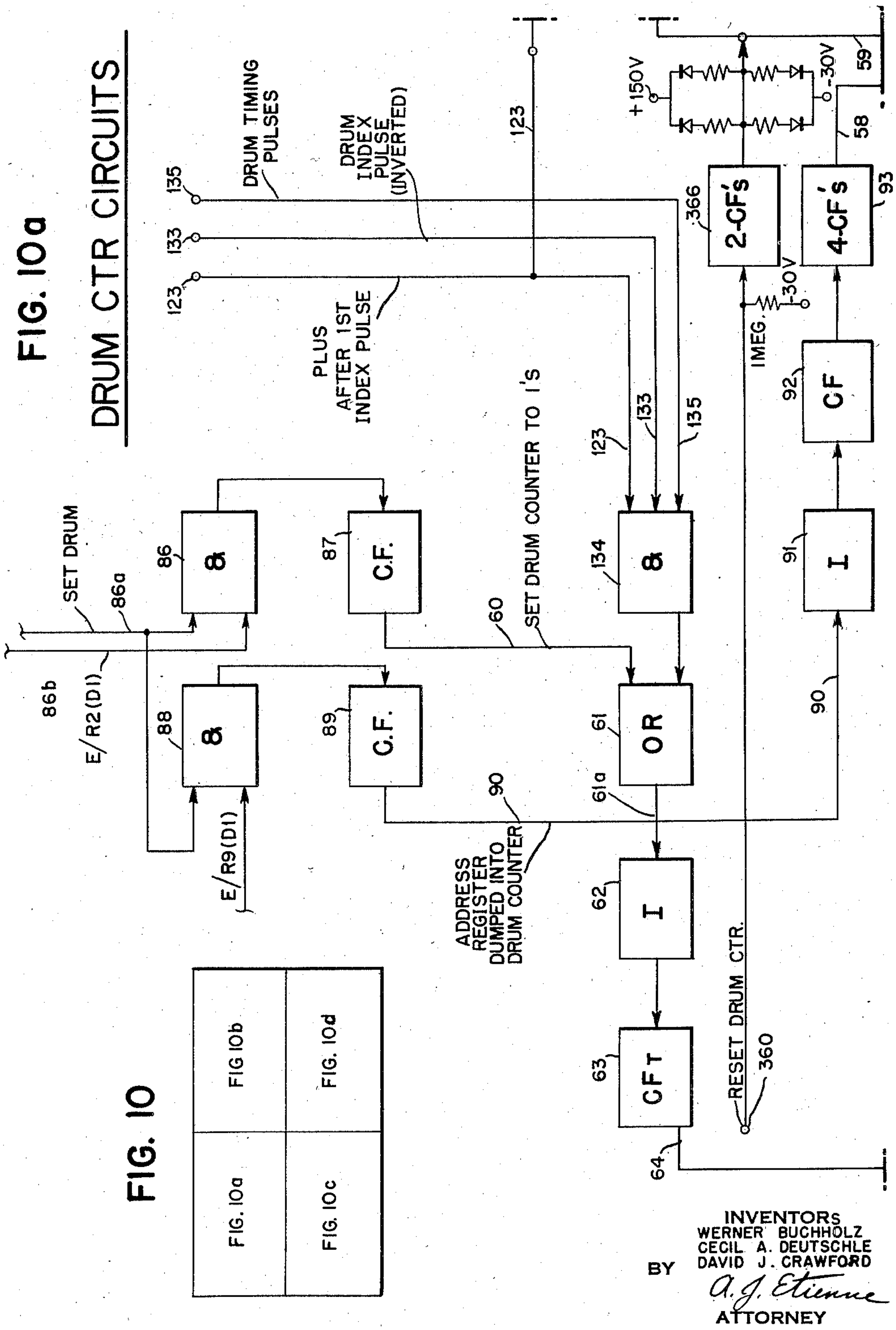

Fig. 10 illustrates the lay-out of Figs. 10*a* to 10*d*, inclusive.

Figs. 10*a*, 10*b*, 10*c* and 10*d*, arranged as shown in Fig. 10, comprise a block diagram circuit lay-out for the Drum Counter, as labeled in Fig. 9.

Figure 11A:
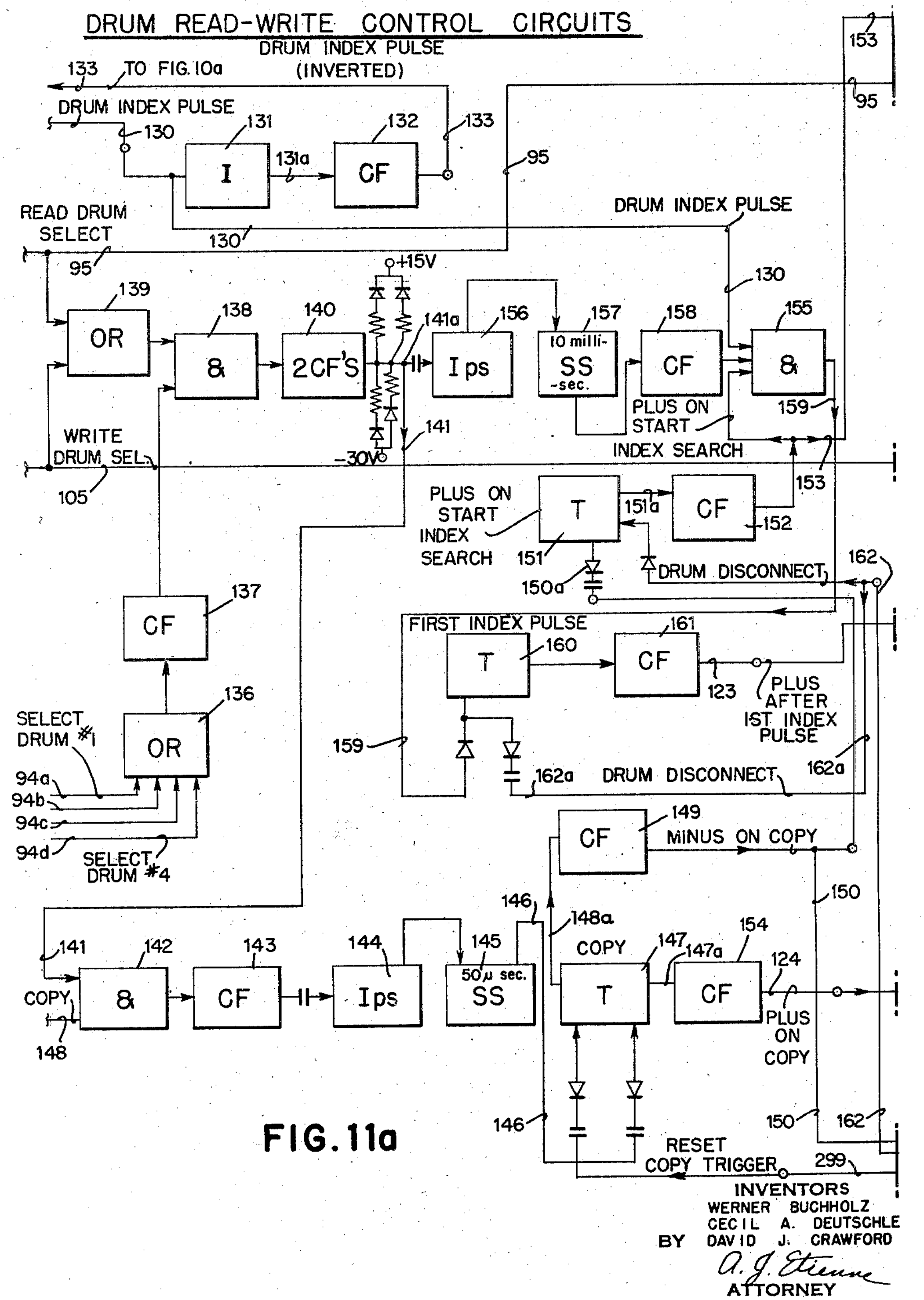
Figure 11B:
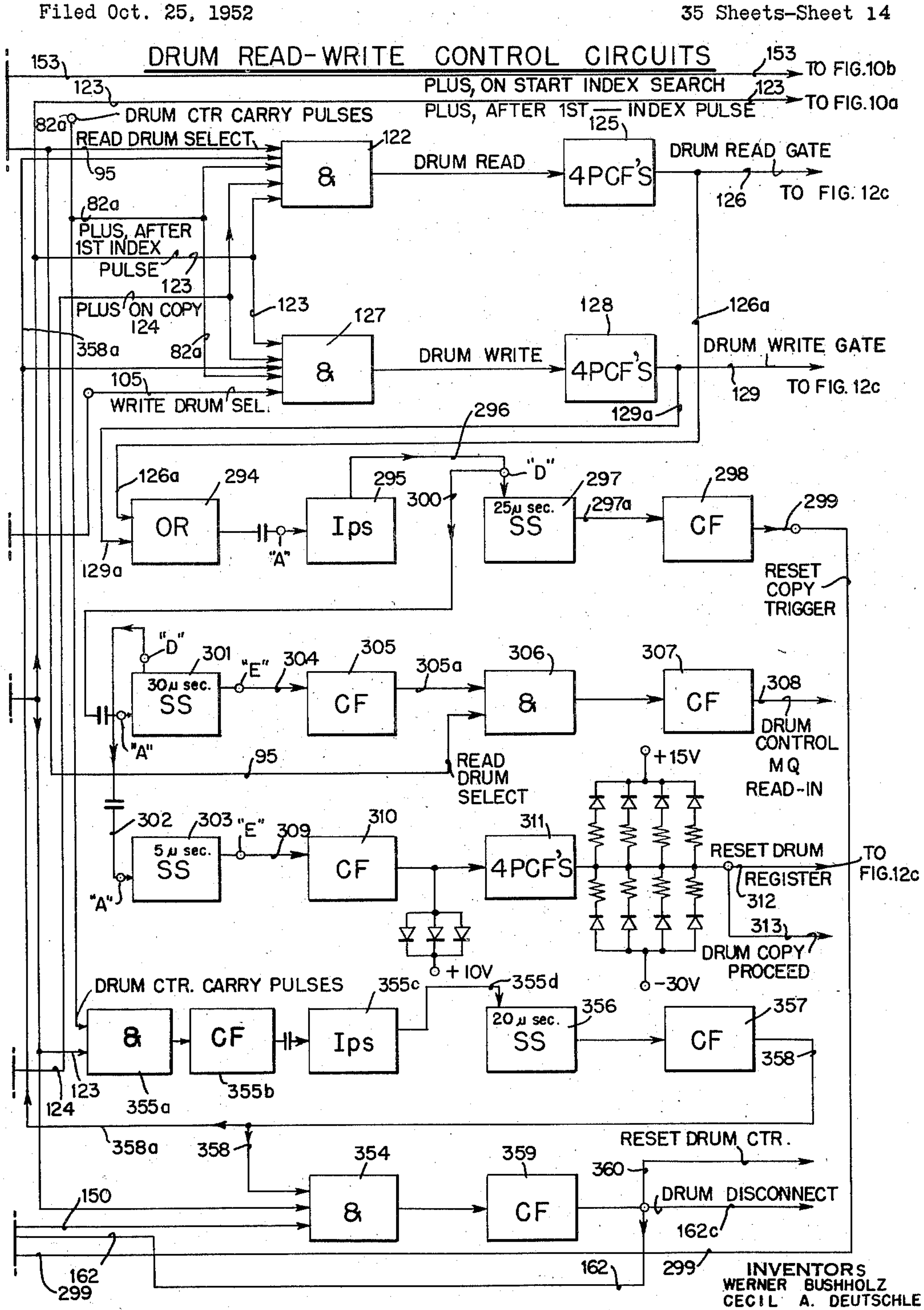

Figs. 11*a* and 11*b* comprise a block diagram circuit lay-out of the Drum Read-Write Control Circuits, as labeled in Fig. 9.

Figure 12:
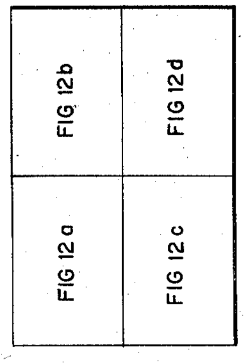
Figure 12B:
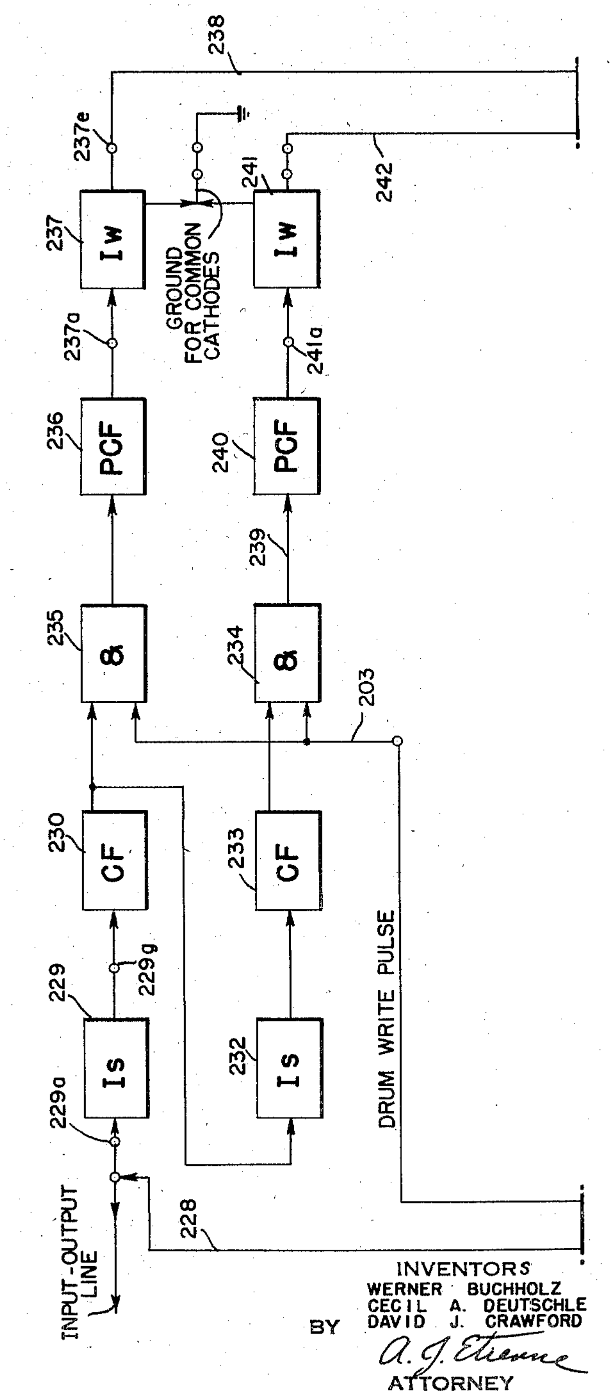

Fig. 12 illustrates the lay-out of Figs. 12*a* to 12*d*, inclusive.

Figs. 12*a* to 12*d* comprise a block diagram circuit lay-out of the drum Read-Write Timing Circuits, as labeled in Fig. 9.

Figure 13:
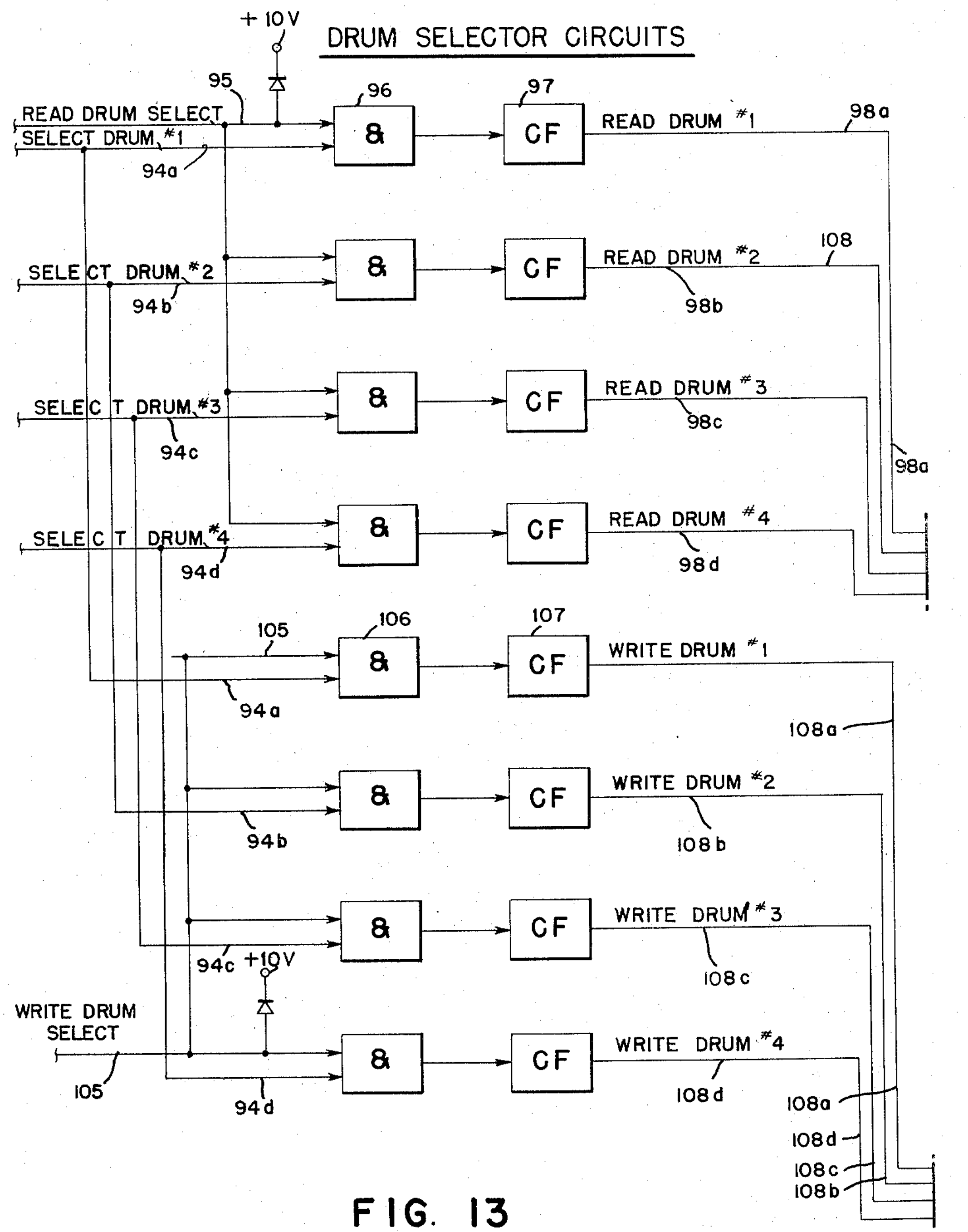

Fig. 13 is a block diagram circuit lay-out illustrating the Drum Selector Circuits, as labeled in Fig. 9.

Figure 14A:
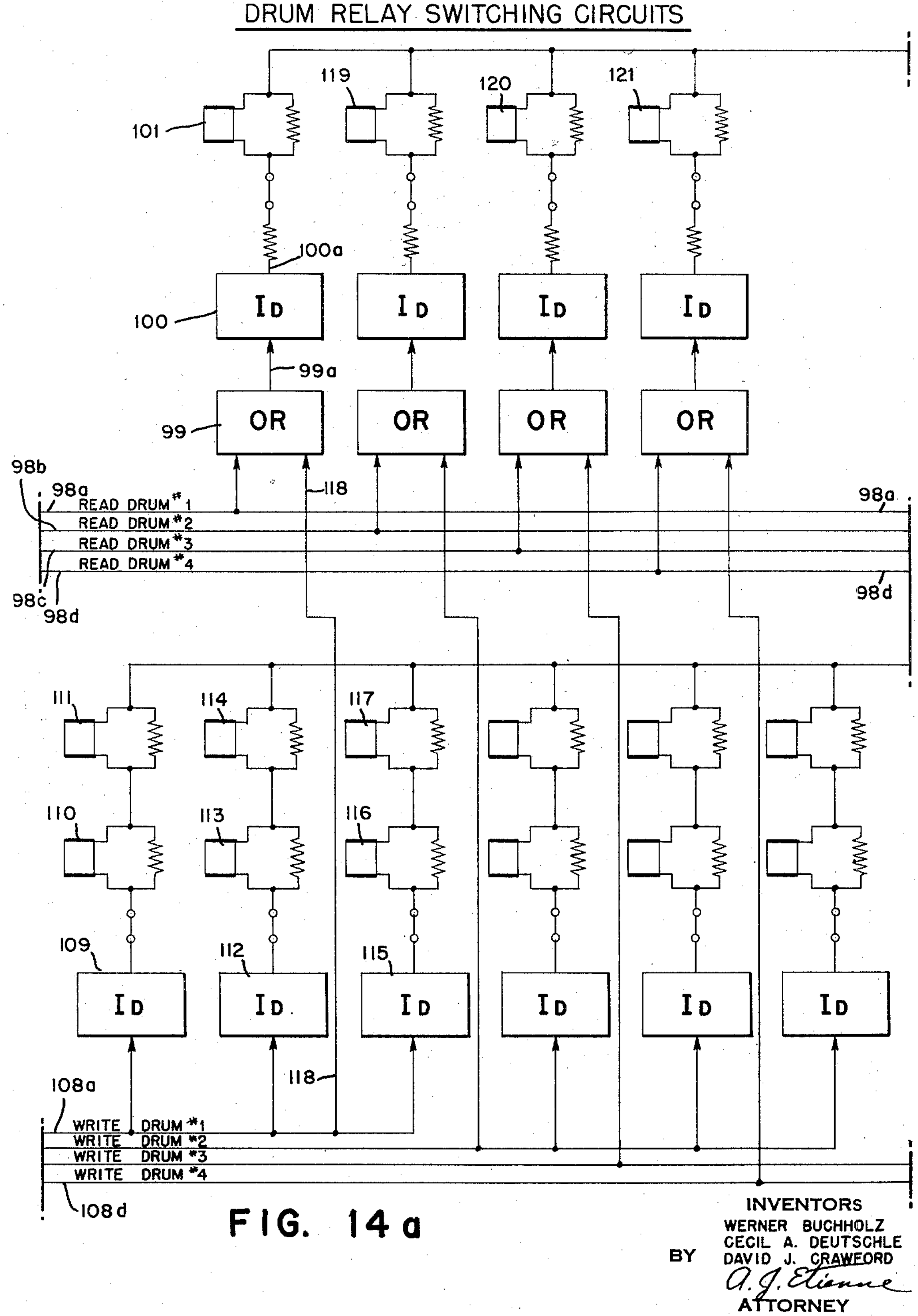
Figure 14B:
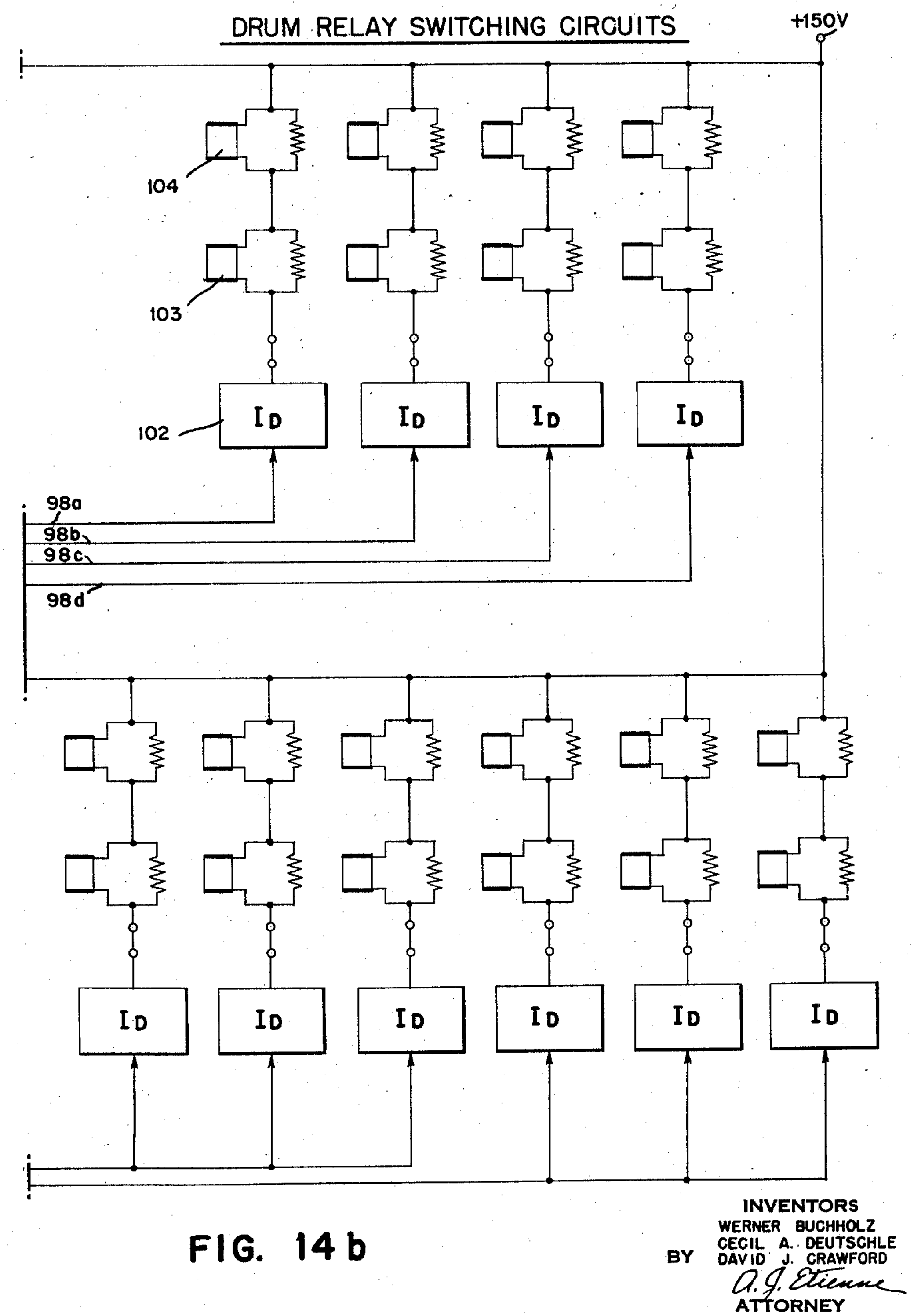

Figs. 14*a* and 14*b* comprise a block diagram circuit lay-out illustrating the Drum Relay Switching Circuits, as labeled in Fig. 9.

Figure 15A:
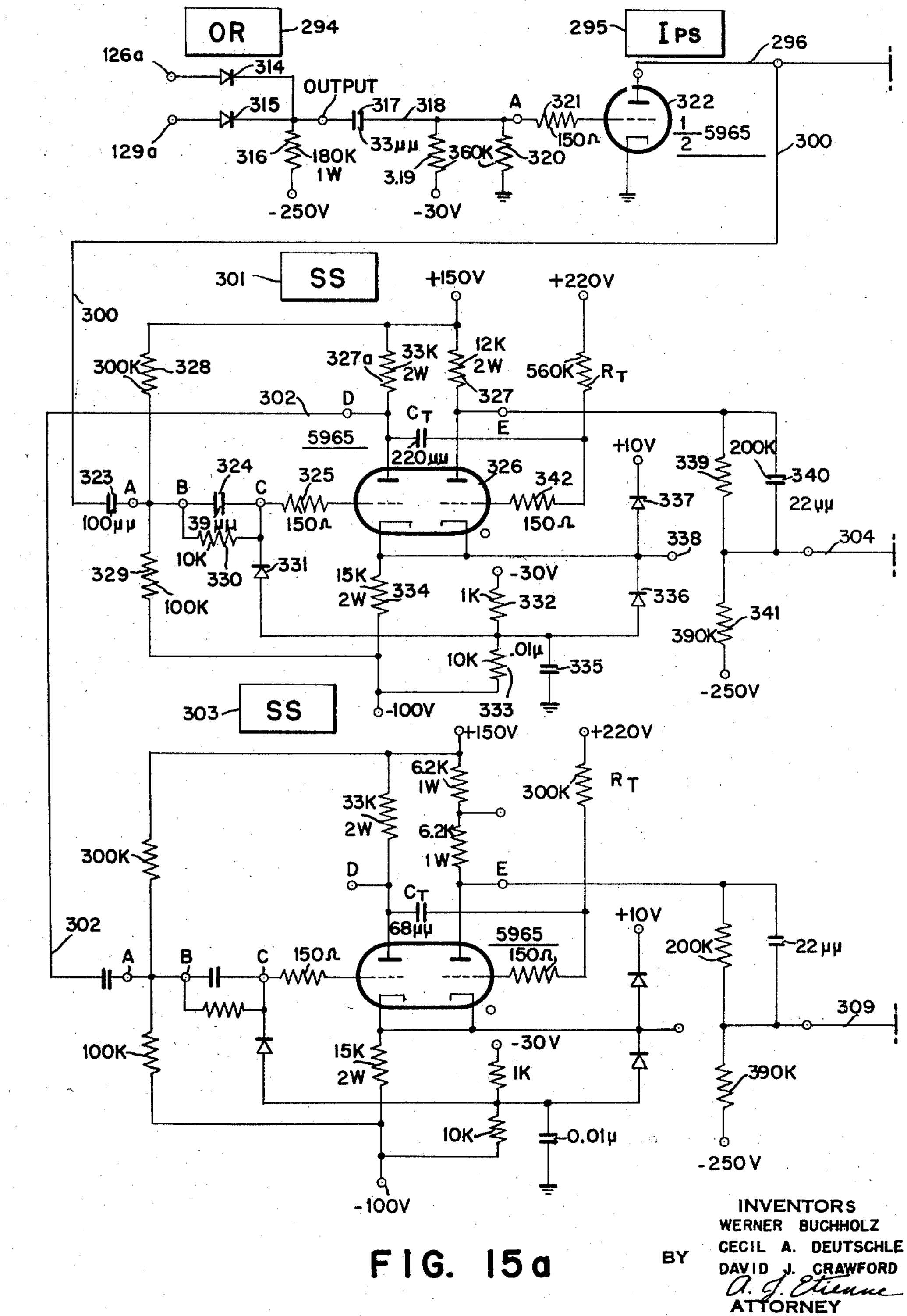
Figure 15B:
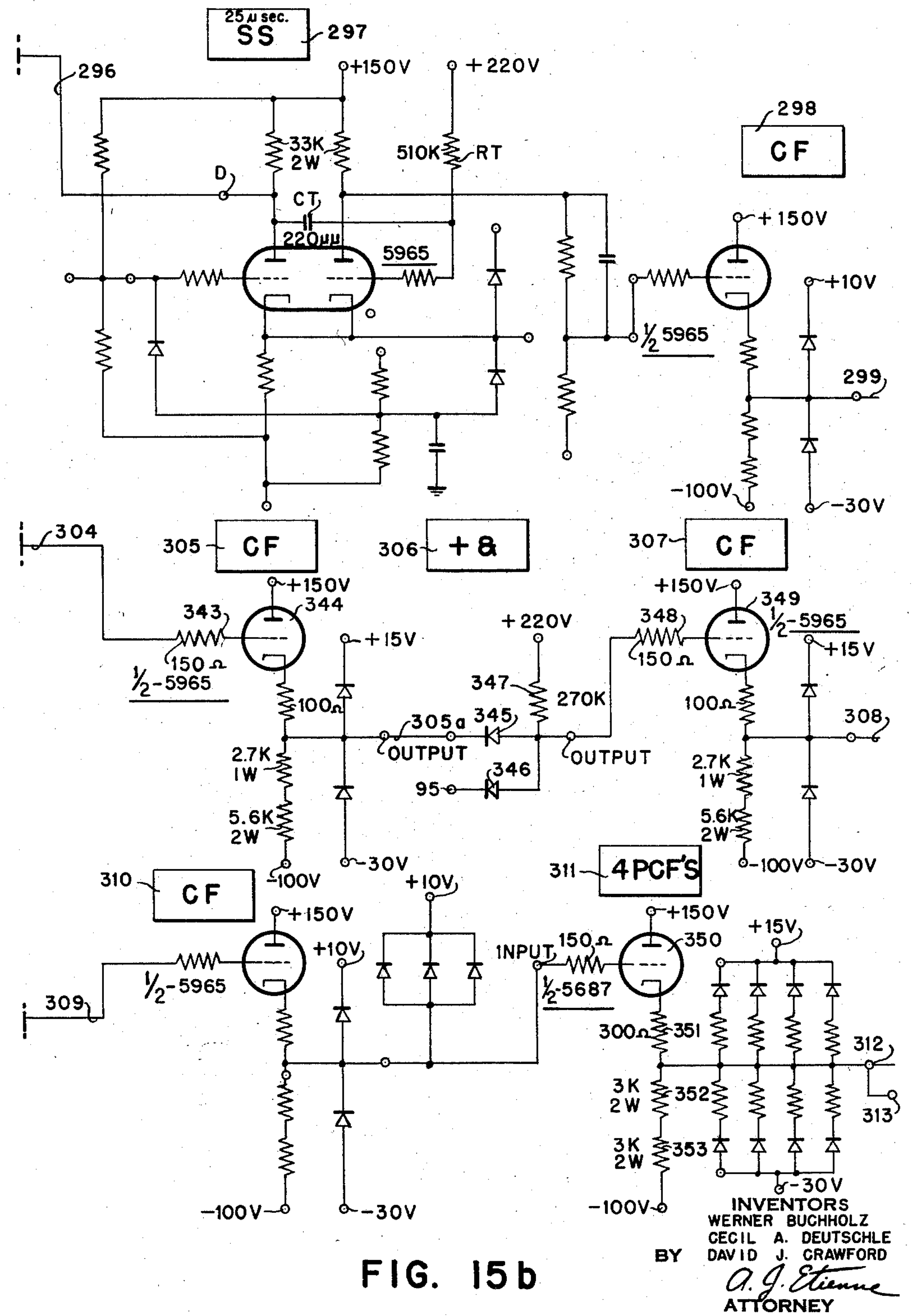

Figs. 15*a* and 15*b* comprise a detailed circuit diagram of the inside wiring of various blocks, comprising a portion only of the circuit illustrated in Fig. 11*b* and also illustrate the specific interconnections of the components of the circuits.

Figure 12A:
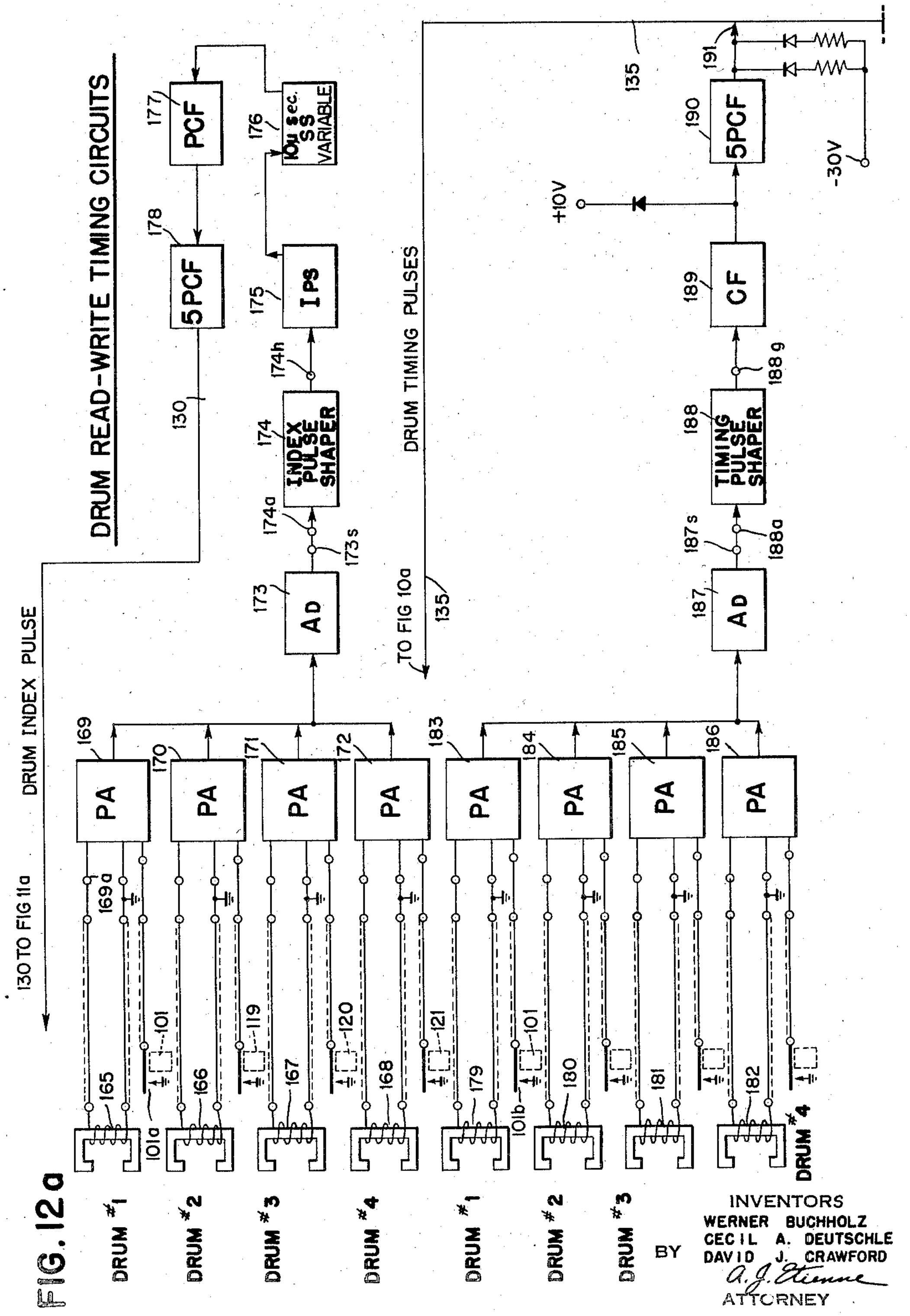
Figure 12C:
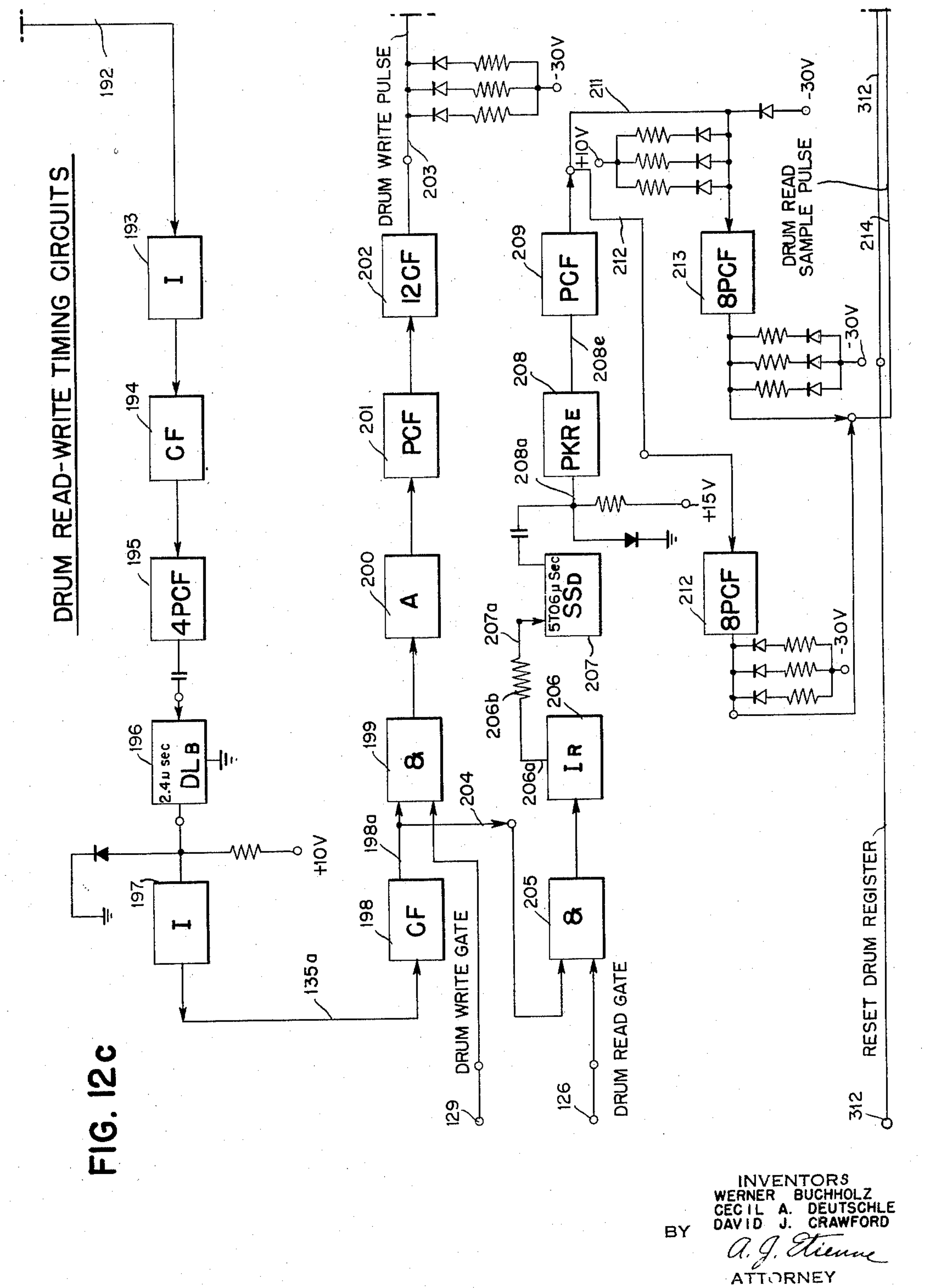
Figure 16:
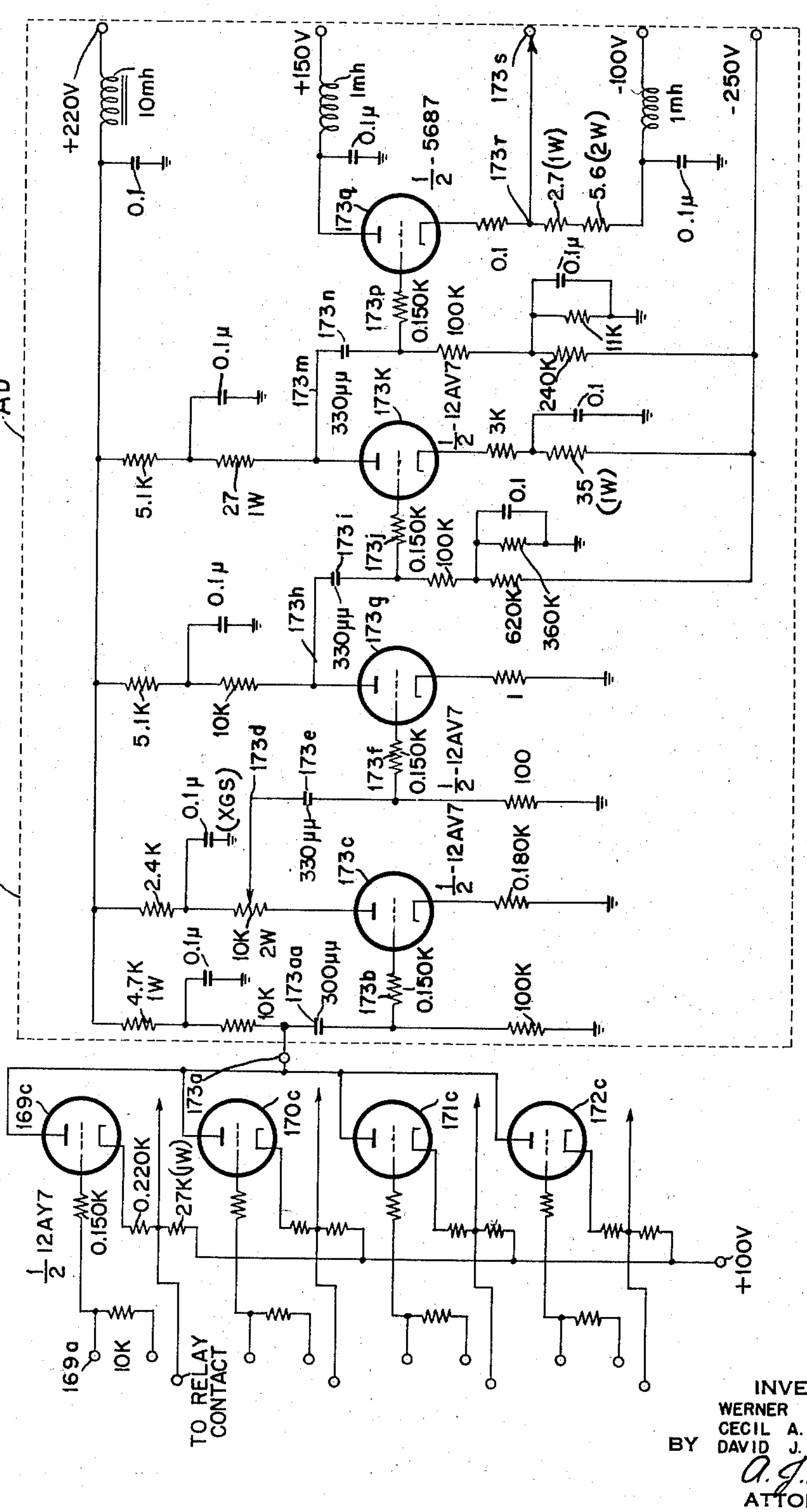

Fig. 16 comprises a detailed circuit diagram of the inside wiring of the pre-amplifier PA and main amplifier AD blocks of the circuit of Fig. 12*a*.

Figure 5A:
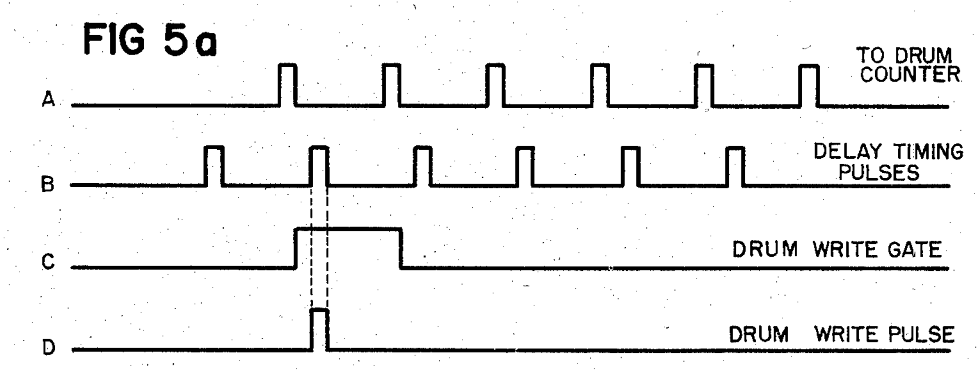
Figure 5B:
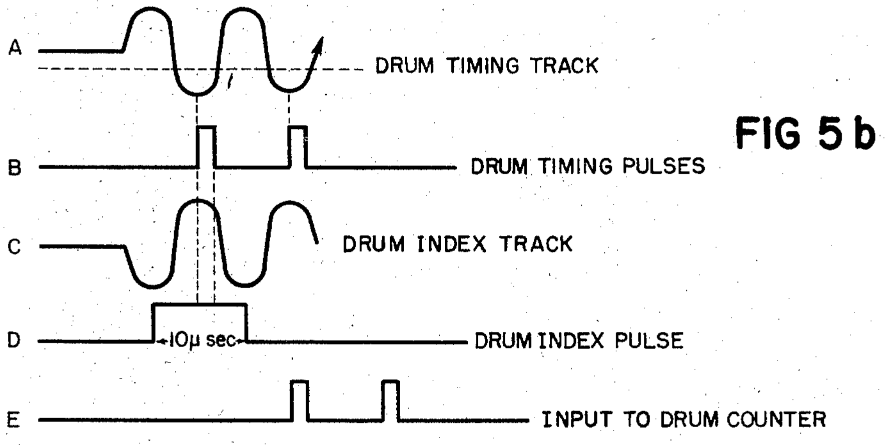
Figure 5C:
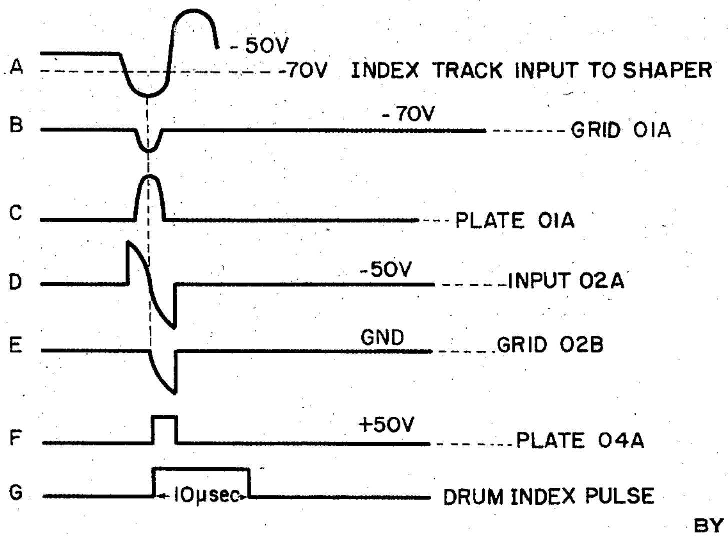
Figure 17:
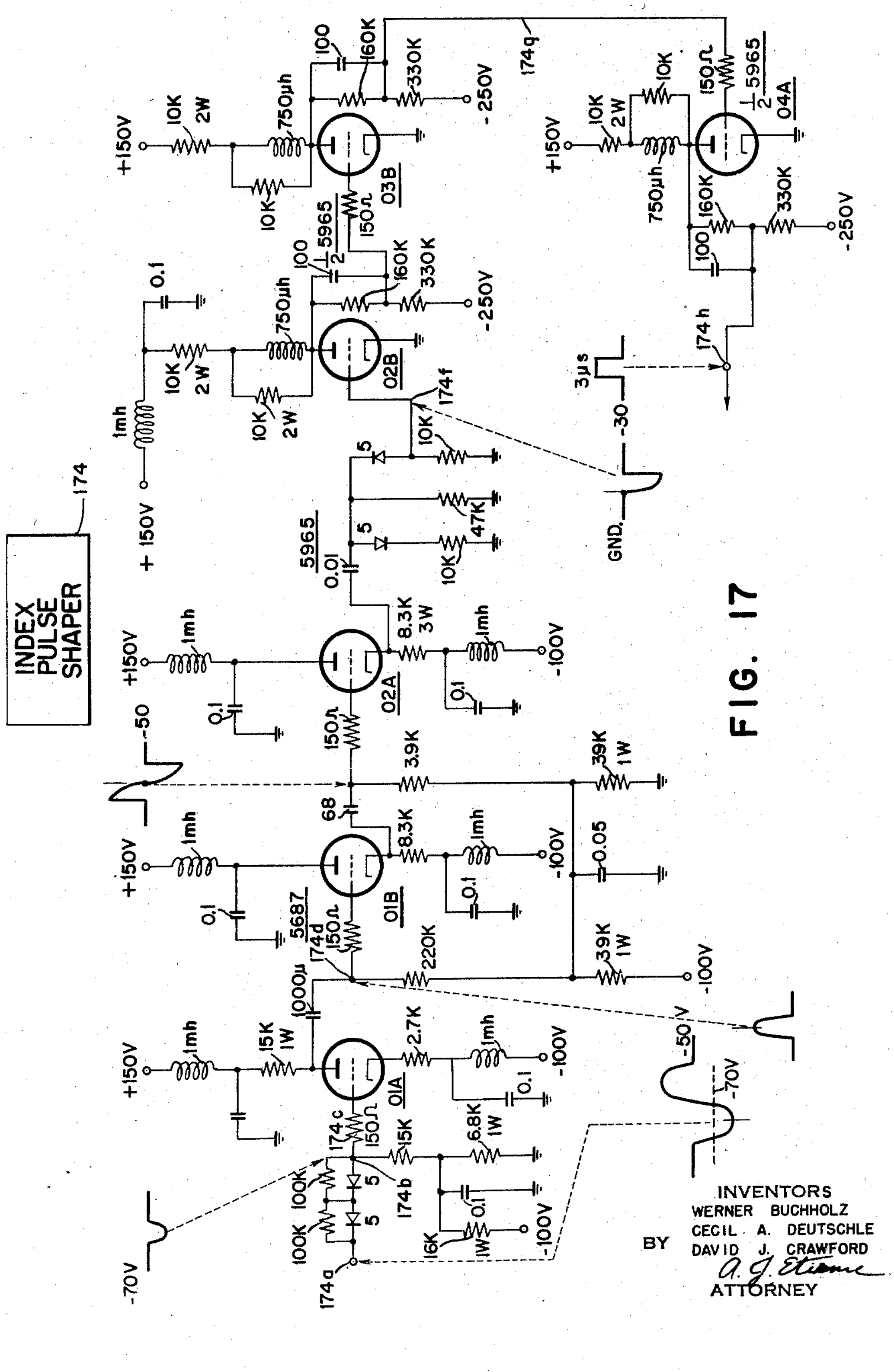

Fig. 17 illustrates both the block symbol and the detailed wiring diagram of the index pulse shaper of Fig. 12*a*, with various pulse shapes tied in with those of Fig. 5*c*.

Figure 18:
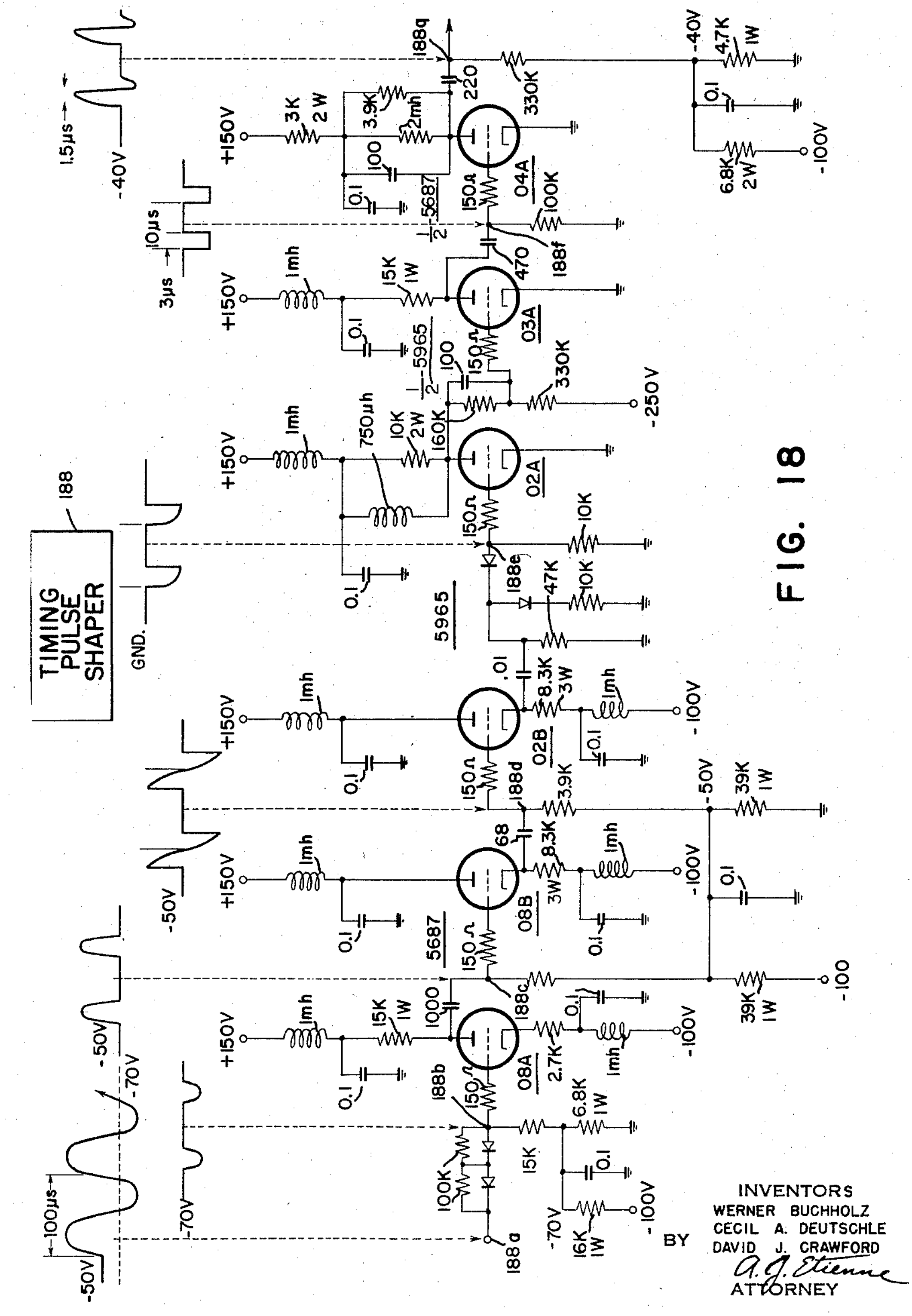

Fig. 18 illustrates both the block symbol and the detailed wiring diagram of the timing pulse shaper of Fig.

Figure 5D:
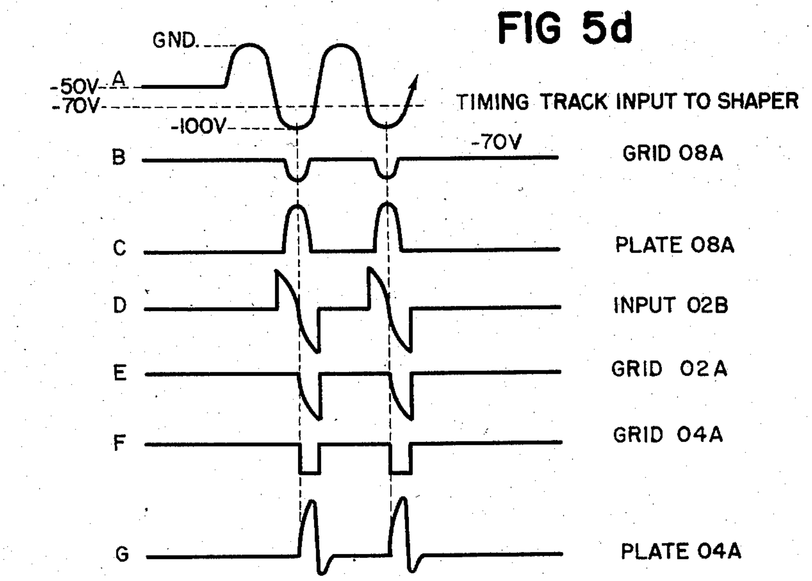
Figure 5E:
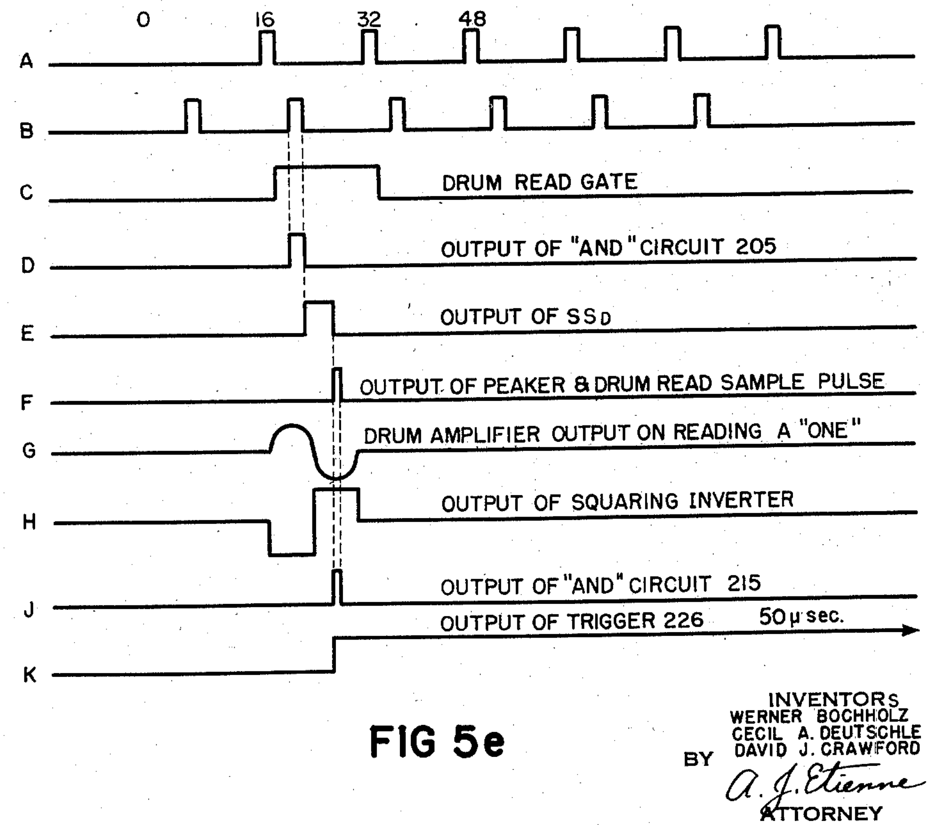

12*a*, with various pulse shapes tied in with those of Fig. 5*d*.

Figures 19, 20, 21:
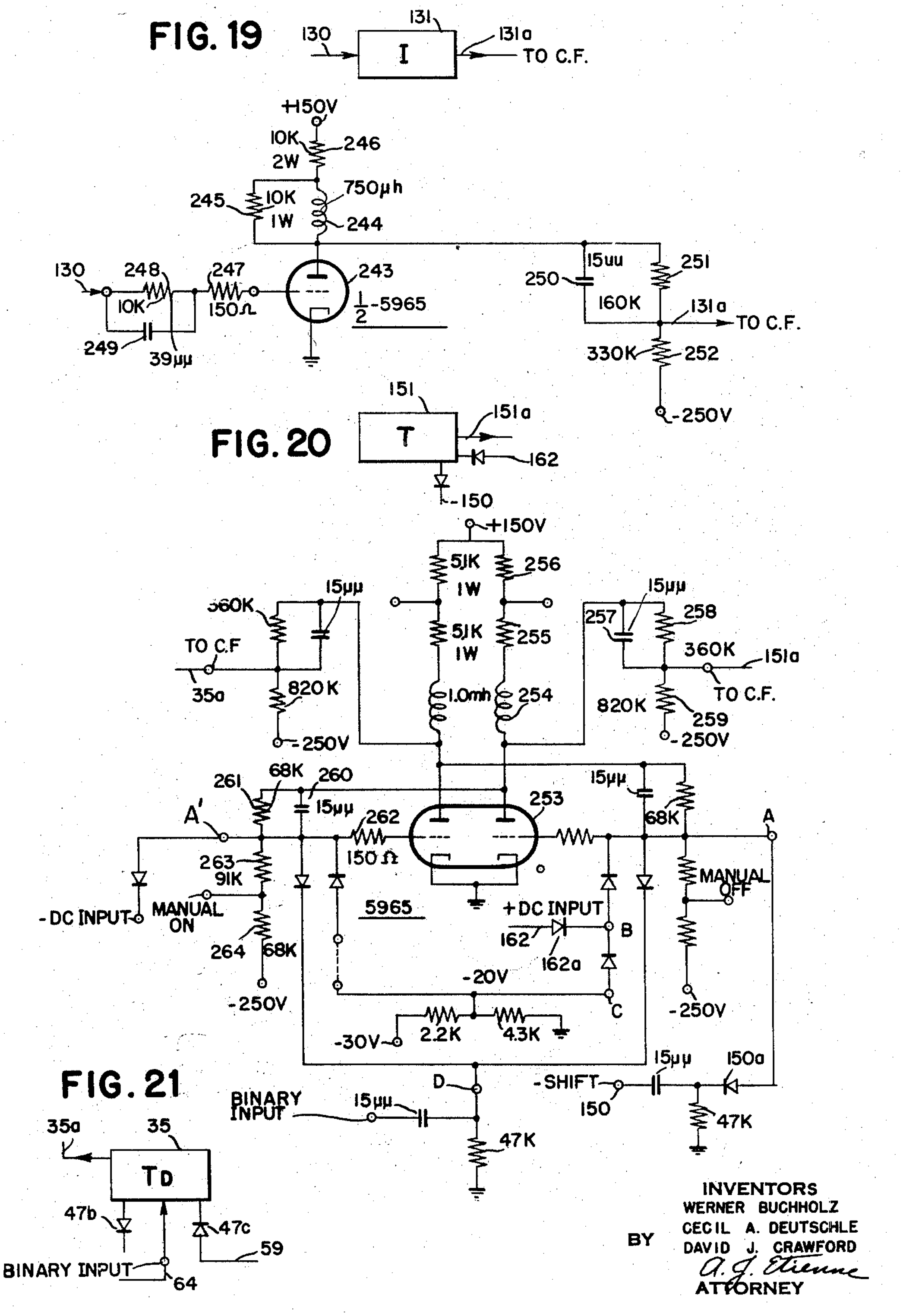

Fig. 19 illustrates both the block symbol and the detailed wiring diagram of one form of inverter I used in the invention.

Fig. 20 illustrates both the block symbol and the detailed wiring diagram of an electronic trigger T used in the invention.

Fig. 21 is a block diagram of a variant $T_D$ of the trigger illustrated in Fig. 20 and also illustrating generally how the trigger is interconnected with the complete circuit.

Figures 22, 23, 24, 25:
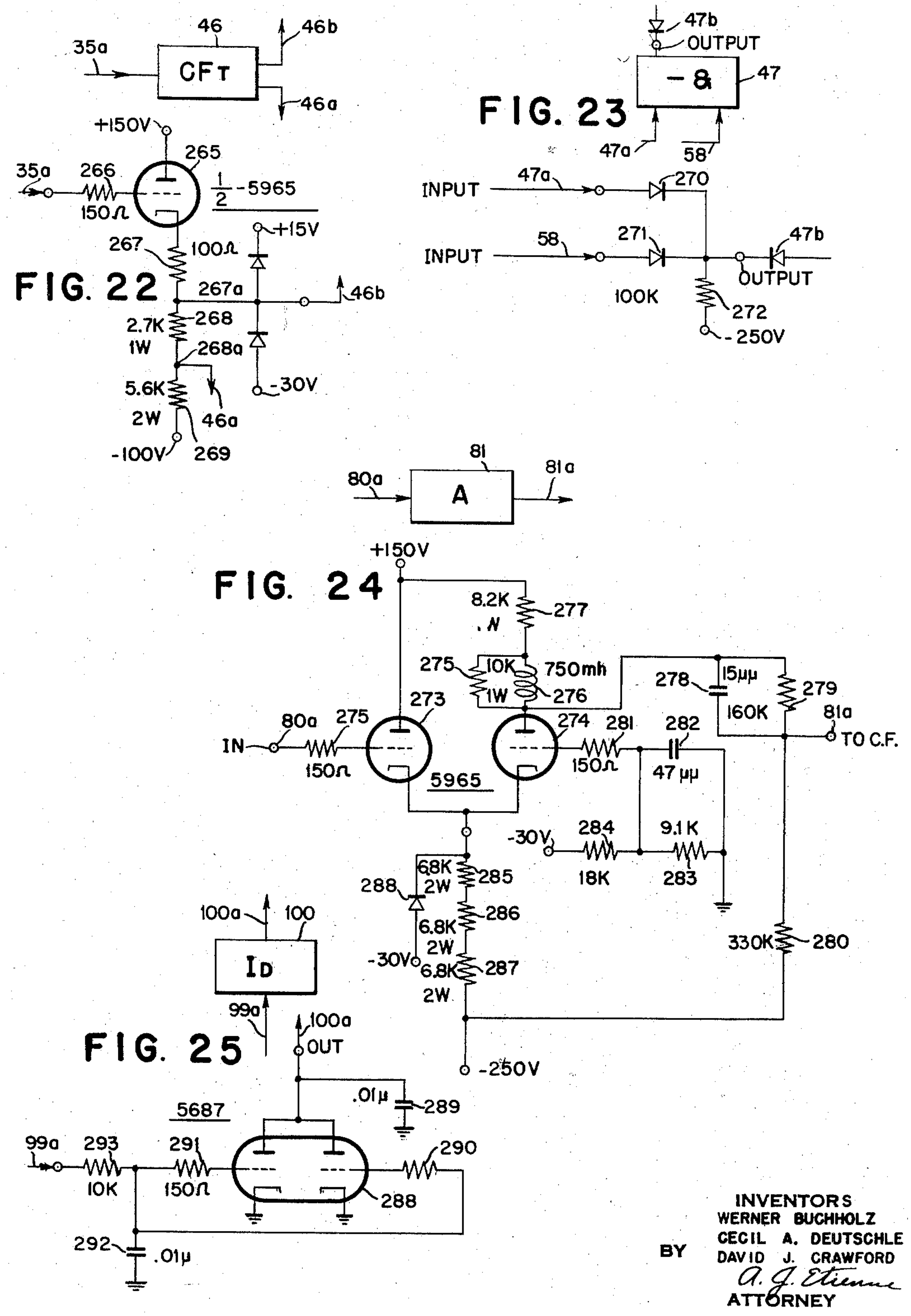

Fig. 22 illustrates both the block symbol and the detailed wiring diagram of a tapped cathode follower used in the invention.

Fig. 23 illustrates both the block symbol and the detailed wiring diagram of a minus "And" circuit used in the invention.

Fig. 24 illustrates both the block symbol and the detailed wiring diagram of a grounded grid amplifier used in the invention.

Fig. 25 illustrates both the block symbol and the detailed wiring diagram of another type inverter $I_D$ used in the invention.

Figure 26:
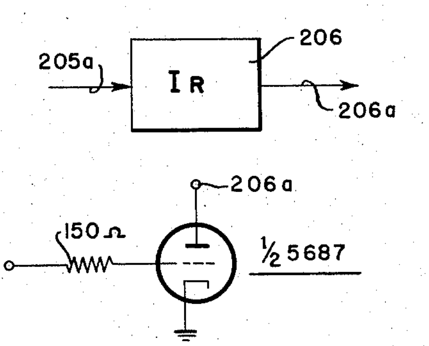

Fig. 26 illustrates both the block symbol and the detailed wiring diagram of still another type inverter $I_R$ used in the invention.

Figure 27:
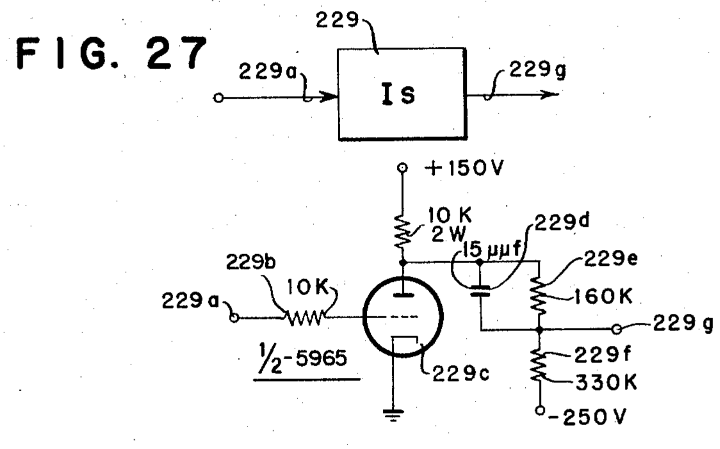

Fig. 27 illustrates both the block symbol and the detailed wiring diagram of another type inverter $I_S$ used in the invention.

Figure 28:
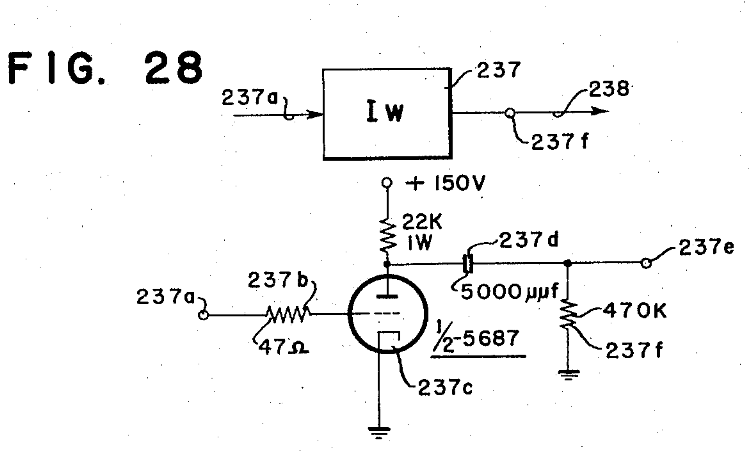

Fig. 28 illustrates both the block symbol and the detailed wiring diagram of a further type inverter $I_W$ used in the invention.

Figure 29:
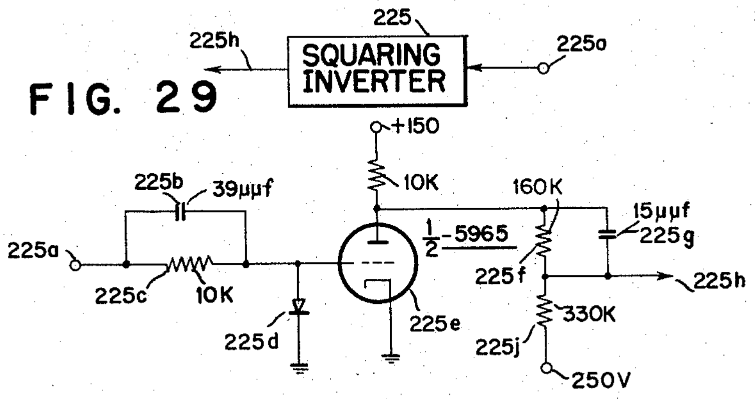

Fig. 29 illustrates both the block symbol and the detailed wiring diagram of a squaring inverter for the storage track reading amplifier.

Figure 30:
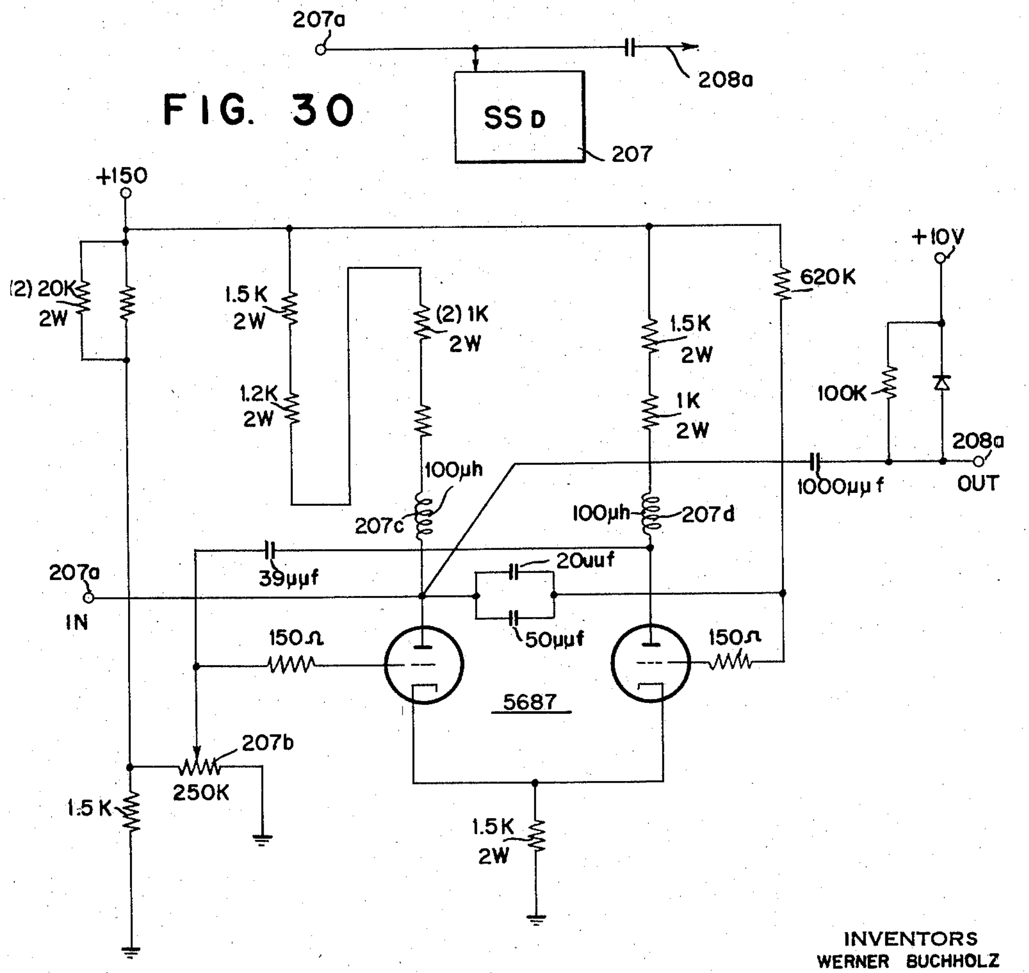

Fig. 30 illustrates both the block symbol and the detailed wiring diagram of a special single-shot multivibrator $SS_D$.

Figure 31:
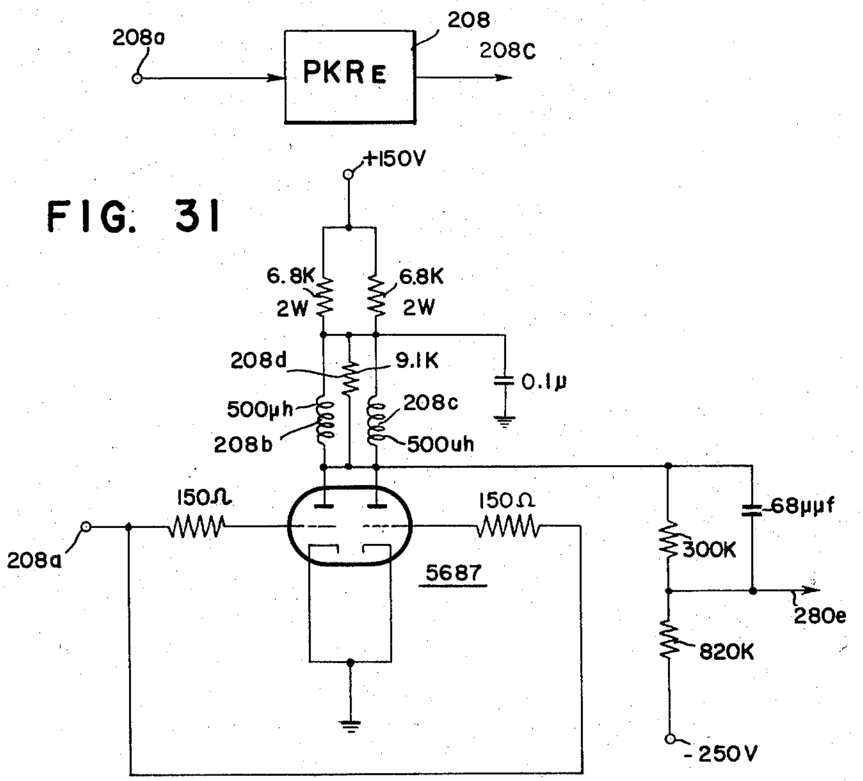

Fig. 31 illustrates both the block symbol and the detailed wiring diagram of a special peaker circuit $PKR_E$, and Figs. 32*a*–32*d* comprise a simplified overall block diagram of the complete wiring.

Figure 1:
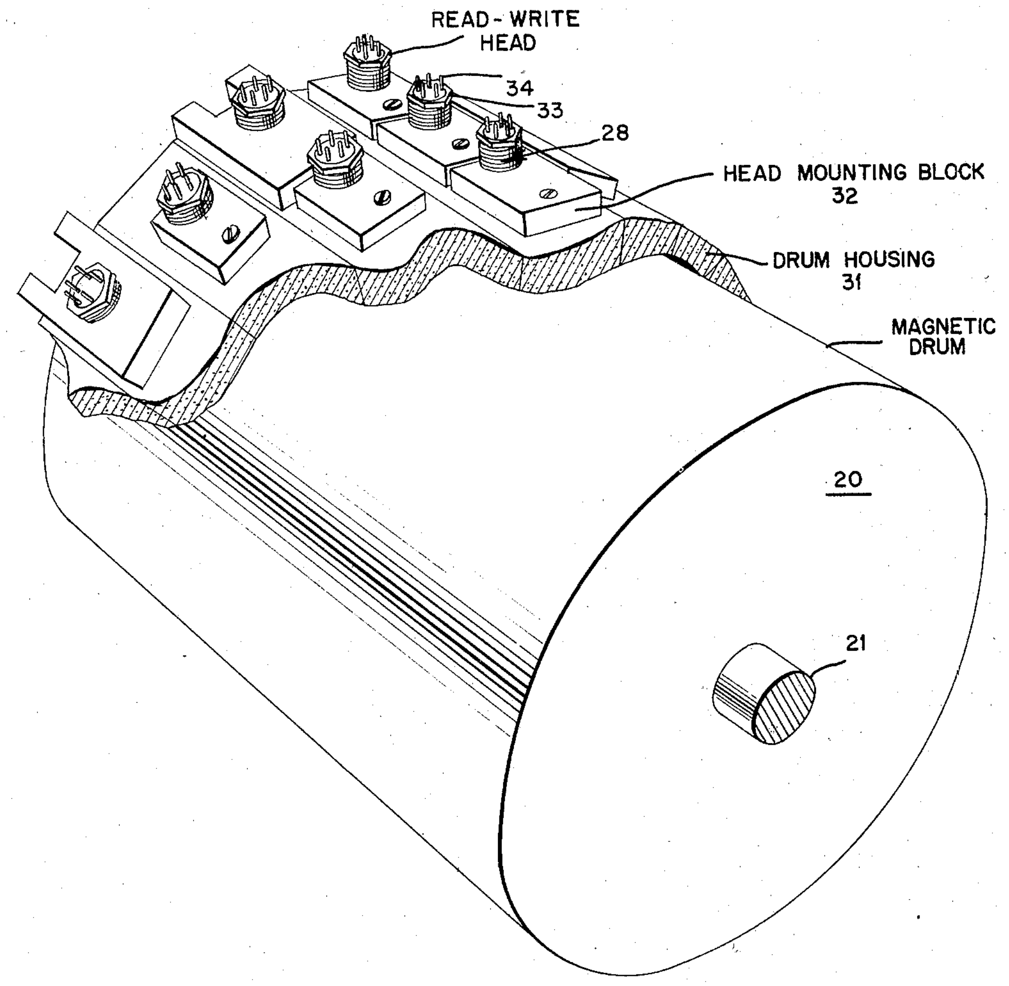
Fig. 1 is a cut away view illustrating the relationship between the magnetic drum, the drum housing, the magnetic read-write head mounting blocks and the read-write heads mounted therein.

Referring to the drawings and more particularly to Figs. 1, 2, 3 and 4, a drum 20 comprises a cast aluminum cylindrical member whose shaft 21 is mounted in journal bearings 22 (Fig. 4) supported by a frame 23 which also partly supports a motor 24 carrying an adjustable diameter pulley 25 which drives a belt 26 to in turn drive a pulley 27, mounted on the shaft 21. The drum 20 is closely wound with cunife wire, to provide a magnetic surface, the wire being ground down leaving an essentially flat surface with excellent magnetic qualities. Particularly the drum illustrated has a diameter of 13" and may be rotated at 2929 R. P. M. so that the surface speed approximates 2000 inches per second, with one drum revolution requiring approximately 20 milliseconds. The drum is provided with 74 storage tracks, two sync tracks and two index tracks, each track extending circumferentially about the drum, which tracks are approximately 1/16 of an inch on centers, with provisions for 2048 bits per storage track. 78 heads, each labeled 28 (Figs. 1 and 2) are provided, the gap between the drum 20 and the head 28 (Fig. 2) indicated by the designation Gap being between 0.5–2 mils. A maximum of 5 heads are placed in one line axially of the drum, the tracking of the 78 tracks by the 78 heads being taken care of by physically distributing the heads as shown in Fig. 1, so that the heads sensing the consecutive axially distributed tracks may be thought of as being arranged in the form of a helix extending approximately around 170° of the drum circumference (Fig. 3). 72 tracks are allocated to storage (two spares are additionally provided), these being grouped into two groups of 36 tracks each group being provided with its own index or start pulse track and a sync or timing pulse track.

Figure 2:
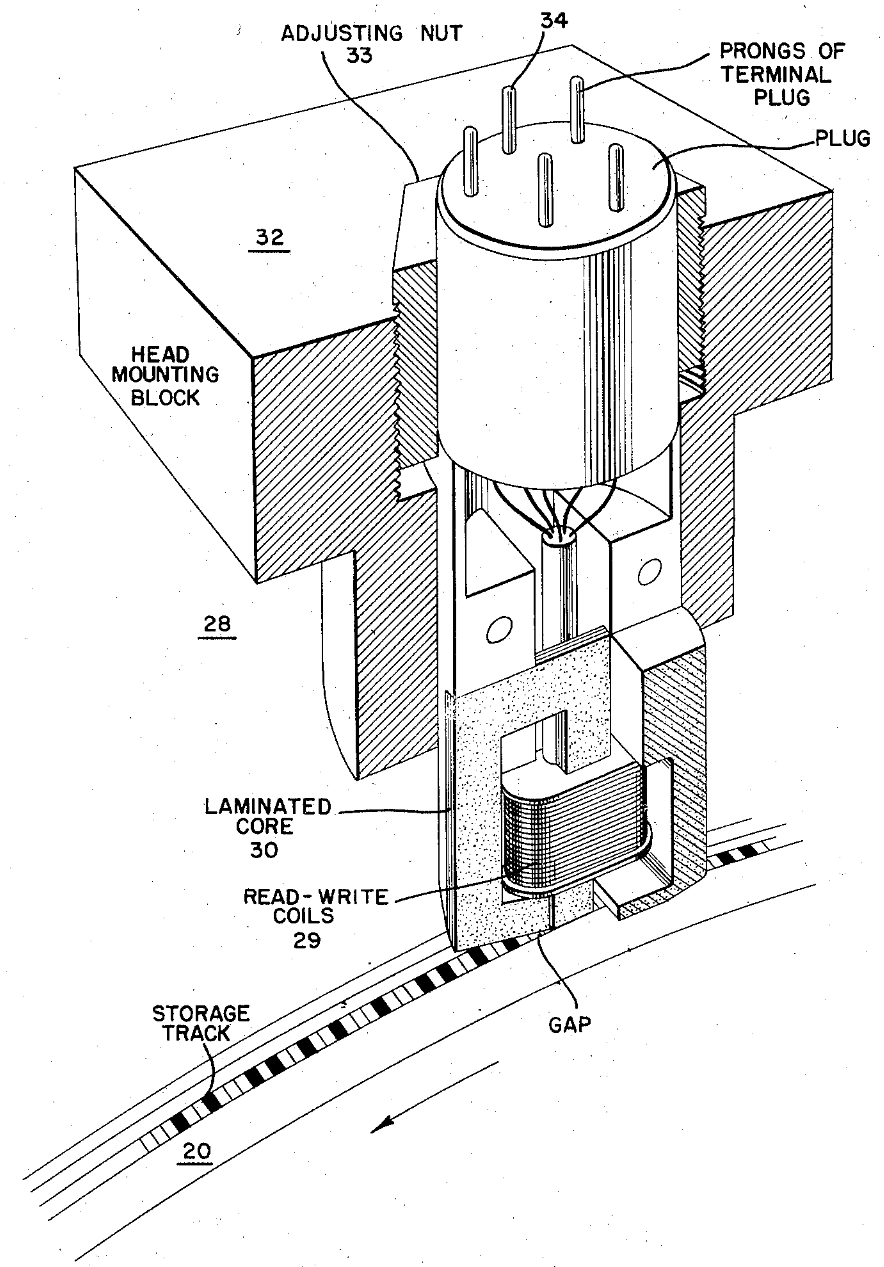
Fig. 2 is a view, on a greatly enlarged scale with respect to Fig. 1, showing the details of one of the heads of Fig. 1 and the relationship between the head and a storage track on the drum, this storage track being illustrated symbolically to more sharply depict the relationship between the drum track and head.
Figure 4:
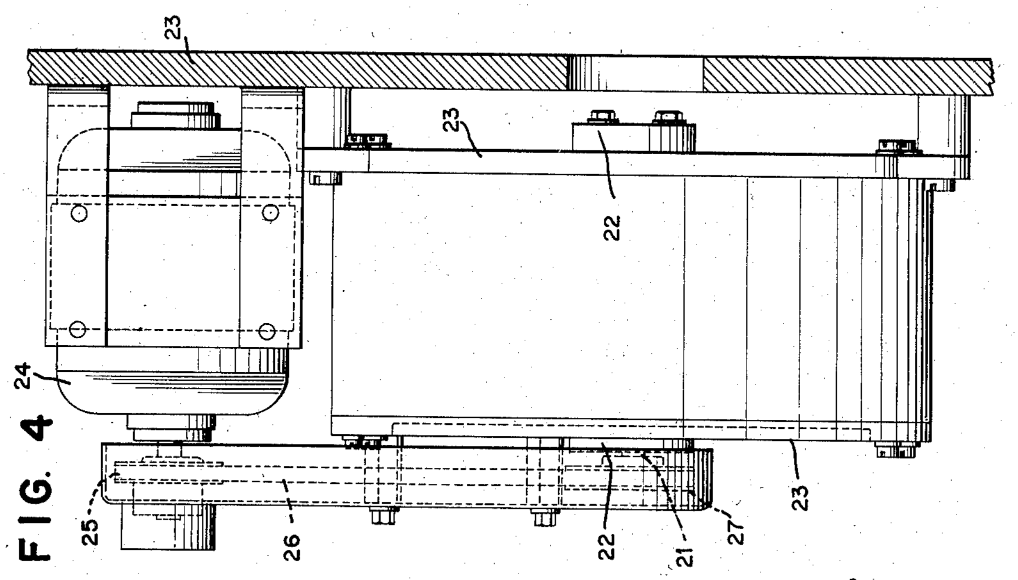
Fig. 4 is a side view of Fig. 3.
Figure 3:
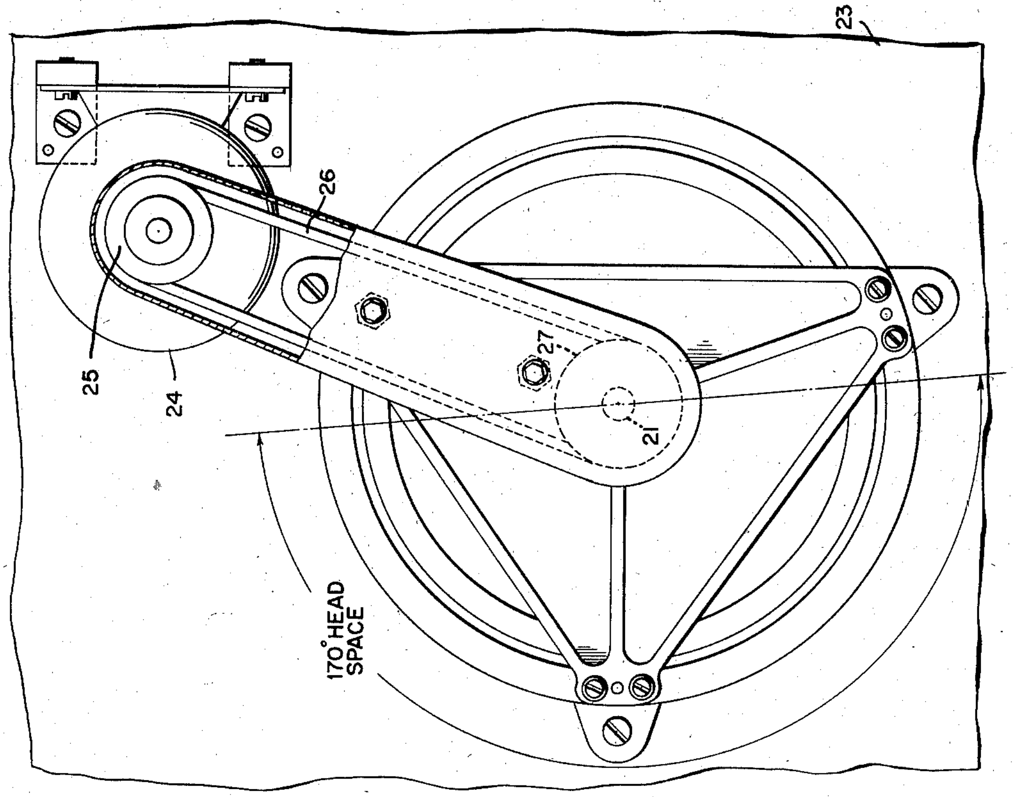
Fig. 3 is an end view, illustrating the mounting of the drum and its driving motor.

Each of the heads 28 comprises a single bobbin upon which are mounted both the read and write coils 29, Fig. 2, which are wound on laminations 30 comprising the core. The entire bobbin and lamination assembly is then mounted in a drum housing 31 (Fig. 1) which carries the head mounting blocks 32, the assembly being mounted for adjustment in a block 32 by means of an adjusting nut 33, the head being provided with 5 prongs 34 constituting the terminal plug.

Referring to Fig. 6, a drum lay-out is illustrated which in simplified form illustrates the basic principle of operation in address selection as employed in the novel means of the present invention. The drum 20 is diagrammatically illustrated as carrying 16 bits of information located in the 16 positions 0 to 15, inclusive, distributed around the drum, the numbers within the circumference, which are underlined, being line numbers, which represent physically adjacent word locations comprising one track around the circumference of the drum, it being recalled that there are 36 such storage tracks normally in use on any one logical drum. The <u>0</u> line number is one of the 16 bit addresses. On the outside of the circle representing the drum 20, there are indicated the number designation of each bit address. For example, starting at 0 on the outside of the circumference of drum 20, the addresses are labeled, reading consecutively, as 0, 4, 8, 12, 1, 5, etc. Thus the address number 1 (on the outside of the circumference 20) appears opposite the line <u>4</u> (on the inside of the circumference 20). Similarly it will thus be seen that address number 2 is opposite line <u>8</u>, address number 3 is opposite line <u>12</u> and address number 4 is opposite line <u>1</u>. Thus there is provided a time interval between successively numbered addresses which time is employed, in the overall data processing machine including the drum, to carry out a short program, which will decide which word (comprising 36 bits) is to be written next or where the last word read from the drum is to go. Consecutive words of a single block of data are located at consecutively numbered addresses. If a block of words, called, for example, a Unit Record, starts with its first word at address number 8, subsequent words of this Unit Record will be stored at addresses 9, 10, 11, etc. By the novel means of this invention including a so-called Middle Carry of a drum counter driven by the sync pulses obtained from the sync track of a selected drum, we can select, not only a particular address, but also several consecutively numbered addresses in a single revolution of the drum, while all the 16 addresses may be selected consecutively in the device of Fig. 6, in 4 revolutions of the drum.

As will be pointed out later, in the system actually employed, the address number itself is automatically inserted into a count-down counter which controls address selection on the drum and no pulses are applied to the drum counter until the Read head of the index track has sensed an index mark, whereupon each subsequent spot on the sync track, produces a pulse, to step the counter downward. When the counter backs down to zero, a so-called End Carry from the counter will be effective, as described later, to select the address, initially entered in the drum counter. Thereafter, successively numbered addresses are automatically selected by the Middle Carry from the drum counter without necessitating insertion of any further addresses into the drum counter.

Referring to Fig. 7, there is illustrated in block diagram form, a drum counter comprising a chain of electronic triggers, to be employed with the system as illustrated in Fig. 6. This counter may be initially set by simultaneously flipping the individual triggers of the counter. The inside of the blocks of the counter are labeled with numbers, indicating the address numbers, as in Fig. 6, while the numbers outside the blocks and underlined again indicate the line number. For purposes of explanation of the broad principle, assume that the Complement Number of the desired address is initially set in the counter of Fig. 7 and further assume that we wish to read at address number 1. A value of 14 (15's Complement) is therefore set in the drum counter, by initially individually operating the separate triggers, so that the triggers 4, 8 and 2 are initially flipped On. The first pulse, which in this symbolic arrangement is the Start pulse, flips trigger 4 Off, which flips 8 Off which flips 1 On, with no further effect. The second pulse flips trigger 4 On, with no further effect. The 3rd pulse flips trigger 4 Off which flips 8 On, with no further effect. The 4th pulse flips trigger 4 On, with no further effect. The fifth pulse flips trigger 4 Off, which in turn flips trigger 8 Off, which in turn flips trigger 1 Off, which in turn flips trigger 2 Off and thus an End Carry is produced. It is to be particularly noted that after the Complement of address number 1 was set into the counter, the counter as employed with the system of Figs. 6 and 7 actually started counting at the 0 or Start pulse line position and that the counter is stepped along in synchronism with the rotation of the drum (Fig. 6) until 5 pulses are counted, at which time the desired address namely number 1, is under the Reading head so that the data, at this number 1 address can be read, under control of the End Carry pulse. Thereafter, every 4 pulses applied to the counter input will flip trigger 8 Off and produce a Middle Carry, so that consecutively numbered addresses can be read every 4th pulse. Thus addresses 2 and 3 can be read, in the same drum rotation as address 1, while with repeated drum rotations, all 15 addresses can be read, one for every 4th pulse applied to the counter input. It is to be further noted that the Start pulse is not repeated after the first one so that address 4 will be reached 4 pulses after address 3 or as explained more fully below, by precessing subsequent drum address selections, using equally spaced addresses, no two address numbers will designate the same physical bit location on the drum, as would occur without precession.

Referring to Fig. 8, a lay-out is shown in which the drum 20 is provided with a practical lay-out which provides storage space for 2048 words, it being understood that 2048 bits may be stored in one storage track circumferentially of the drum and that, in any one logical drum, 36 such storage tracks are provided. Consecutively numbered addresses appear every 128 lines so that 16 words may have their addresses selected and may be Written or Read in a single revolution of the drum. The counter for operation with this particular drum layout (Fig. 8) is illustrated in general block diagram only, the End Carry, and the Middle Carry being labeled, these controlling the switching circuit in the same manner as described in connection with the device of Fig. 7. The drum timing pulses are applied to the input of the first trigger of the binary cascaded trigger counter and a Middle Carry will occur for every 128 pulses applied.

Figure 10B:
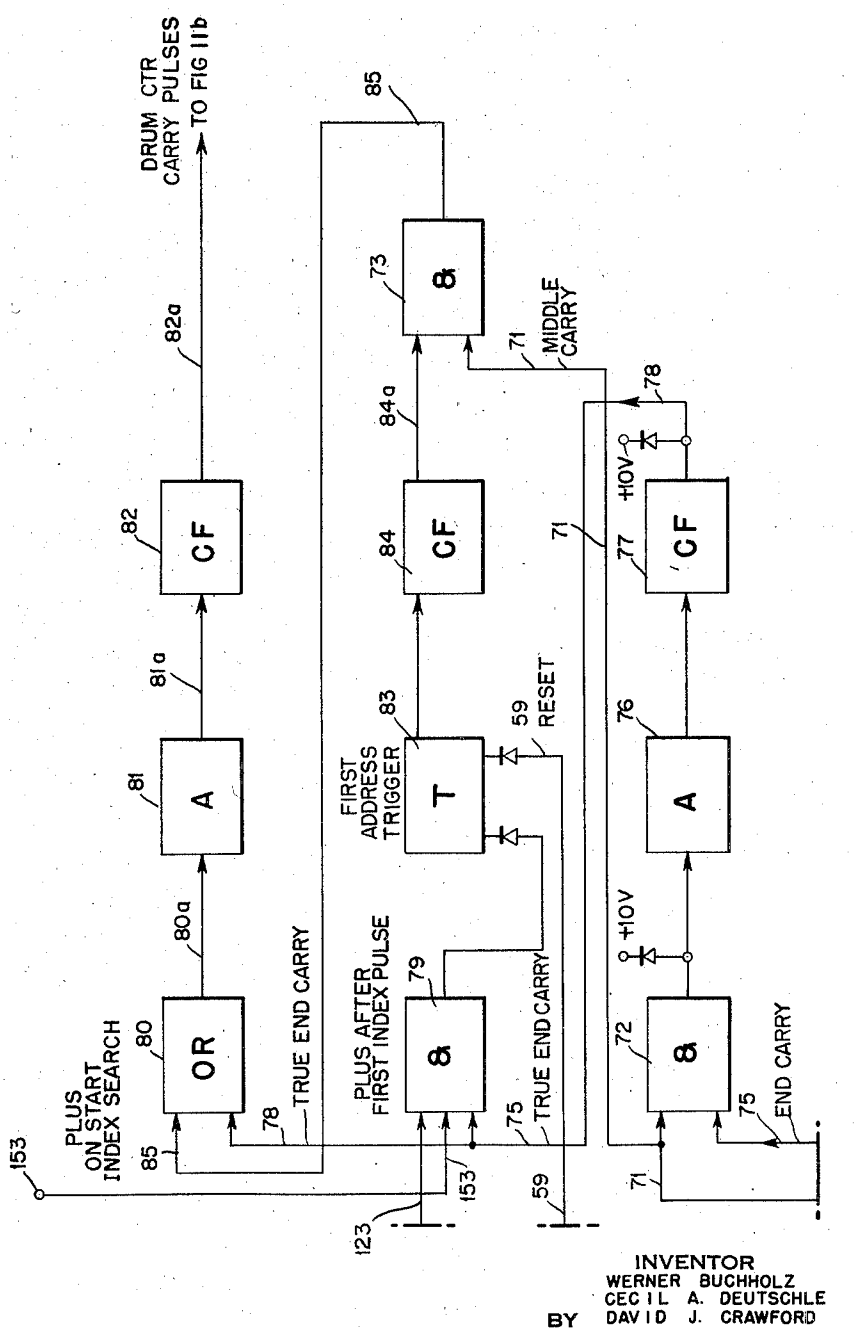
Figure 10C:
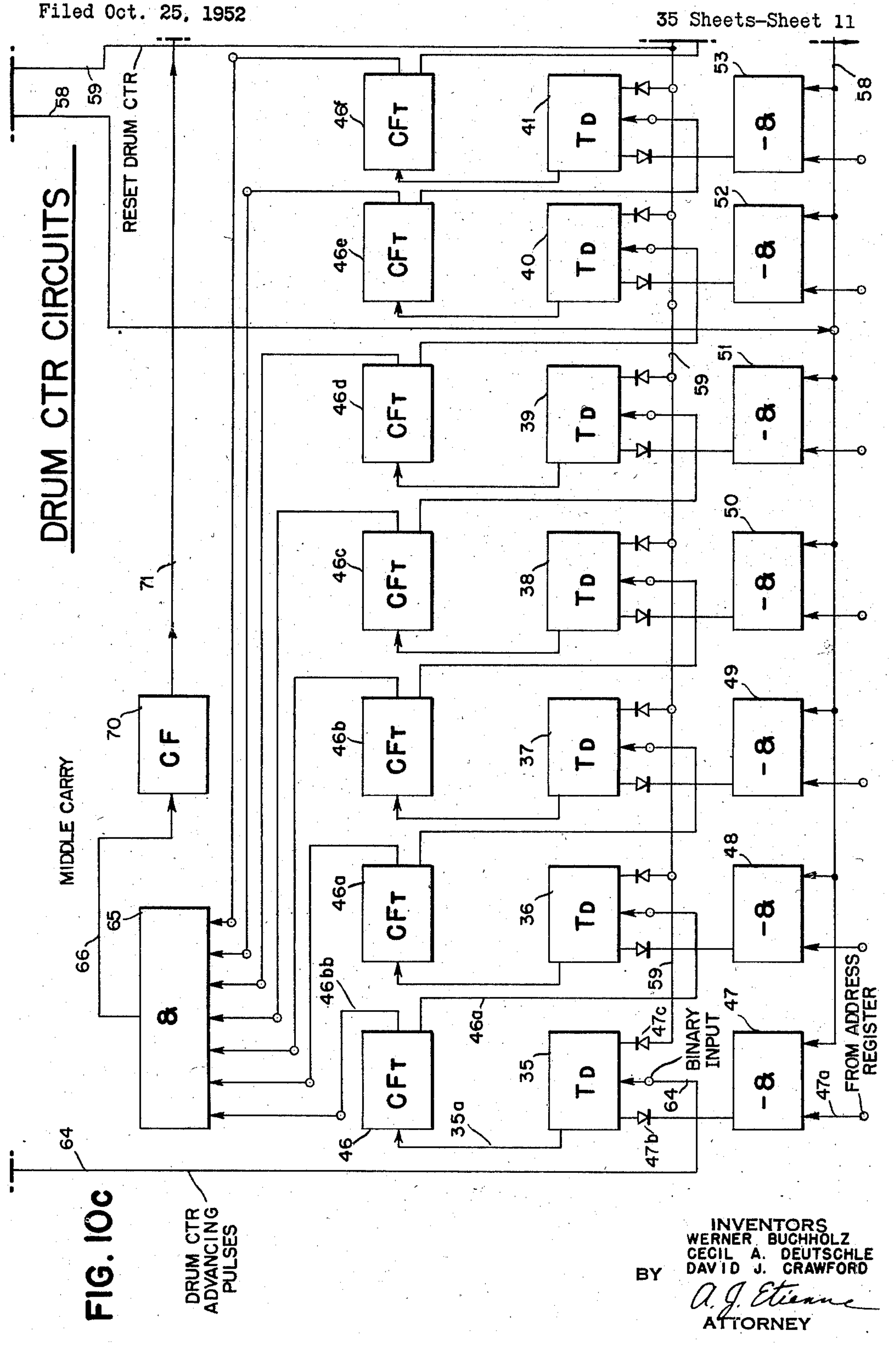
Figure 10D:
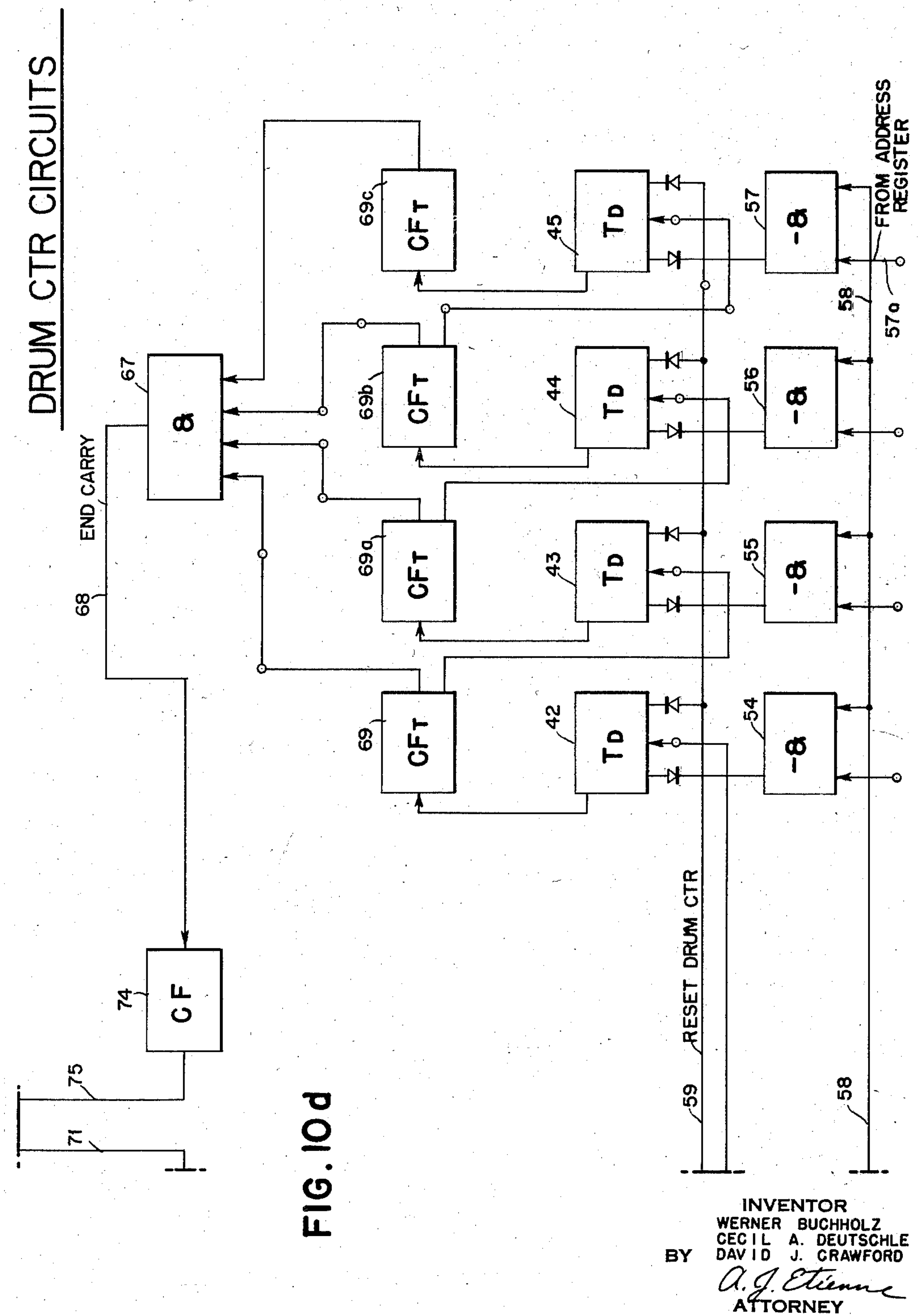

Referring to Figs. 10*a*–10*d*, inclusive, drum counter circuits incorporating the basic concept of Fig. 8 but with certain changes, is illustrated in block diagram form. The relationship of the drum counter circuits to the rest of the drum counter address selecting system is illustrated in Fig. 9. The drum counter circuits comprise 11 triggers, 35 to 45, inclusive, comprising the drum counter, per se (Figs. 10*c* and 10*d*), connected in cascade, but connected for "count down" operation. The details of any block comprising any one trigger are illustrated in Fig. 20 while the specific block symbol $T_D$ for any one of these triggers and the interconnection of trigger 35 (Fig. 10*c*) with the rest of the circuit, is illustrated in Fig. 21. The details of this trigger and the slight difference between triggers T and $T_D$ of Figs. 20 and 21, respectively, will be described at length subsequently. The triggers $T_D$ of Figs. 10*c* and 10*d* are connected, so as to "count down." For example, after all of the triggers 35—45 have been initially reset with their right hand triodes conducting (Fig. 20) which is to be taken as the Off status and, assuming that no Address has been set into the counter, the first pulse applied via a line 64 to the binary input of the first trigger 35 (Fig. 10*c*) will flip this trigger On, i. e. with its left hand triode conducting. This trigger is connected to the next trigger in the cascade, namely trigger 36, so that when trigger 35 goes On, i. e. its left hand triode conducts, it passes a relatively negative pulse via a tapped cathode follower 46 to the binary input (Fig. 20) of the trigger 36, to flip this trigger On, which, in turn, will flip the next trigger 37 On, etc. This phenomenon is utilized, as described in detail later, to set the drum counter to all 1's, prior to the transfer thereto of a particular Address to be selected. It is thus seen that with the counter reset to zero, a single pulse turns all the triggers On.

Assuming that the counter has been reset to zero and then set to all 1's by a single pulse and that some value is entered into the drum counter by individually flipping certain triggers Off, as described presently. Let us assume further that the first and second triggers remain On even after insertion of the desired Address number therein. The first impulse applied to the counter will flip it Off, with no further effect. It is to be remembered that in a "count down" counter, it is only when a trigger is flipped On that the succeeding trigger will be flipped. Thus by the flipping Off of the first trigger the count indicated by the setting of the counter has been reduced by one or in other words the lowest "valued" trigger, representing one, has been turned Off. The next pulse applied to the trigger 35 will flip it On, which, in turn, will flip trigger 36 the two "valued" trigger, Off. Thus the count has been reduced by two. Further operation in counting down, until zero is ultimately reached, will now be deemed clear. In the counter of Figs. 10*c* and 10*d*, an Address is set into the counter in True number form and not in Complement form, as described in connection with the basic devices of Figs. 7 and 8. This is because of the "count down" character of this counter of Figs. 10*c* and 10*d* and because of other features to be described presently. After any Address is thus set into the counter, each pulse applied to the first trigger 35 will, as described above, drive the counter backwards so that the counter will "count down" from the True number, originally set therein, until zero is reached. For zero Address, which is a special case and which in the instant device has novel utility, the operation will be described later.

In order to set the counter to a chosen Address, a plurality of minus "And" circuits 47 to 57, inclusive are provided, the details of such a minus "And" circuit being illustrated in Fig. 23, to be described in detail later. A minus "And" circuit is an "And" or coincidence circuit in which coincidence of two negative voltages, on its two inputs, are required, in order to produce a minus output. One of the two inputs of each of these minus "And" circuits comprises a line 47*a* (Fig. 10*c*), for example, which may lead from a register, which, in the complete data processing machine, is defined as an Address Register. This Address Register (not shown) comprises a plurality of triggers set in a predetermined permutation of On and Off conditions to thus represent an entered number representative of the desired Address. It is to be particularly noted that any one of these lines 47*a*–57*a* inclusive is rendered effective, only if the trigger of the Address Register to which it is connected, has a relatively negative voltage, at the point to which the line is connected, or, in other words, the line is connected to the plate circuit, of that triode of the trigger in the Address Register which is conducting. This has been selected as an indication of binary -0- so that only those triggers of the Address Register whose respective On or Off conditions represent zero will be dumped or transferred into the drum counter. This relatively negative voltage is applied via this line 47*a*, for example, to one input of the minus "And" circuit 47 (see also Fig. 23), the other input of this "And" circuit being controlled by means of a line 58, which will be fed, at the appropriate time, defined as E/R9(D1) time, with a negative timing pulse, to thus control the simultaneous transfer or dumping of all zero indications, from the Address Register into the drum counter. This negative timing pulse applied to this other input of this minus "And" circuit 47, for example, with minus already on line 47*a*, will produce a relatively minus voltage at its output which is fed via a diode 47*b* directly to the grid of the left hand triode of trigger 35 (see —D. C. Input to the point A′ in Fig. 20) to thus flip this trigger Off, to represent a binary 0, the Off condition being that, in which the right hand triode is conducting and the left hand triode non-conducting. In this manner by controlling each of the minus "And" circuits 47—57, the entire pattern of the Address in the Address Register may be transferred to the drum counter, subsequent to its being first reset and then set to all 1's. The reason for setting to all 1's will be apparent from the description below.

The triggers 35—45 are all reset to zero (i. e. all triggers Off) by applying a relatively plus pulse entitled Reset Drum Ctr. via a line 59, to thus apply a +D. C. Input directly to the grids of the right hand triodes of each of the triggers (see +D. C. Input, Fig. 20) to thus render the right hand triodes conductive, as indicated by the small circle adjacent the right hand triode of the trigger of Fig. 20. At a chosen time thereafter, a Set Drum Counter to 1's signal is produced, under control of a Set Drum signal, provided by the Main Machine and is applied, as described later, via a line 60 (Fig. 10*a*) an "Or" circuit 61, whose details are illustrated in Fig. 15*a* and will be described later, an inverter 62, whose details are shown in Fig. 19 and will be described later, a tapped cathode follower 63, whose details are shown in Fig. 22 and will be described later, a line 64 (Figs. 10*a* and 10*c*) to the binary input of the trigger 35. Since all the triggers of the drum counter have been reset Off, the turning On of trigger 35 ripples through all of the triggers 35 to 45, inclusive, to turn them all On, as stated above. Thus all 1's have been set into the drum counter. The reason for setting the drum counter to 1's prior to dumping a chosen Address therein, will be obvious from a consideration of the characteristics of a "count down" counter. If the counter were reset first to zeros and then an Address were immediately dumped therein, it is obvious that any trigger thereby turned On, would flip the next trigger and thus the proper Address would not be set into the drum counter at the end of the Address transfer operation. However, with all triggers set to 1's, in other words with all triggers On, and again assuming that the line 47*a*, for example, has a relatively negative voltage thereon indicative of a binary –0–, when the negative pulse indicative of Address Register Dumped Into Drum Counter is applied to the line 58, the negative output thus produced by the minus "And" circuit 47 is applied, via the diode 47*b*, directly to the grid of the left hand triode of trigger 35 thereby rendering this triode non-conducting and the right hand triode conducting, all as described above, so that the trigger 35 is turned Off. The relatively plus voltage thus produced on the output of trigger 35 (Fig. 10*c*) and applied to the tapped cathode follower 46 will have no effect on trigger 36. This will also obviously be true of each of the other triggers respectively flipped Off, when the Address in the Address Register is transferred to i. e. dumped into the drum counter. Thus the drum counter may be automatically set to the Address desired, without interaction among its triggers. The input pulses for trigger 35 are drived from the sync track of drum 20 and are entitled Drum Timing Pulses but these can be applied to trigger 35 only subsequent to a scanning of the index spot on the index track, as described in detail below. All pulses thereafter will be applied to the trigger 35 binary input, except the pulse obtained from that sync spot physically opposite the index spot on the index track. The effect of this pulse is suppressed, as will be described later. Assuming an Address entry into the drum counter after it is set to all 1's, as stated above, then after a sufficient number of pulses have been applied to the input of trigger 35, then the counter will have counted down to zero from the number initially set into the drum counter, all triggers 35 to 45 will be Off thus applying plus to all inputs of the "And" circuit 67 to produce an End Carry on line 68 and also all inputs of the "And" circuit 65 are plus, thus producing a Middle Carry on line 66. These are produced as follows:

Each of the tapped cathode followers 46, 46*a*, 46*b*, 46*c*, 46*d*, 46*e* and 46*f*, of each of the triggers 35 to 41, is connected to the plus "And" circuit 65 generally of the type as illustrated in Fig. 15*b* to the described later, the "And" circuit 65, however, having seven inputs instead of only two, as illustrated in Fig. 15*b*.

Each of the tapped cathode followers 69, 69*a*, 69*b* and 69*c*, of each of the triggers 42 to 45 is similarly connected to the plus "And" circuit 67, having four inputs. When each of the triggers 35—41 is Off, each left hand triode is non-conducting, thereby applying, via the associated tapped cathode follower, a relatively plus voltage, to all seven inputs of the "And" circuit 65, so that a plus output is produced on line 66 which is applied via a cathode follower 70, of the type as shown in Fig. 15*b* and to be described later, and via a line 71 (Figs. 10*c*, 10*d* and 10*b*) to "And" circuits 72 and 73, (Fig. 10*b*), respectively, to be utilized as described later. This output from the plus "And" circuit 65 is called the Middle Carry and, as described presently, no Middle Carry is "effective" until after the first True End Carry is produced, as described presently.

The triggers 42—45 (Fig. 10*d*) are similarly connected via their associated tapped cathode followers to the plus "And" circuit 67, so that when each of the triggers 42—45 is Off thus applying plus to the four inputs of "And" circuit 67, it produces a plus output on line 68, called the End Carry, which is applied, via a cathode follower 74 and line 75 (Figs. 10*d* and 10*b*) to the plus "And" circuit 72. Thus when all eleven triggers 35—45 of the drum counter are Off, there will be plus voltages applied to both lines 71 and 75 which thus render the "And" circuit 72 operative to produce a plus output which is transferred via an amplifier 76, of the type as shown in Fig. 24 and described later, and a cathode follower 77, which via a line 78 applies a "True End Carry" which is indicative of the coincidence of an End Carry and a Middle Carry to one input of an "And" circuit 79 and also to an "Or" circuit 80, to which, as described presently, the Middle Carry pulses are applied when certain conditions are fulfilled, the output of this "Or" circuit being applied via an amplifier 81 and a cathode follower 82, this output as is seen presently comprising Drum Ctr. Carry Pulses which are fed via this line 82*a* to the Drum Read-Write Control Circuits (see Fig. 11*b*), to be utilized, as described later.

Also, as described in detail later, when the "And" circuit 79 (Fig. 10*b*) is conditioned by a plus voltage representative of "Plus, On Start Index Search" and is also conditioned by a voltage "Plus, After 1st Index Pulse" (Figs. 10*a* and 10*b*), upon the occurrence of such a True End Carry as described above which is applied to the 3rd input of the "And" circuit 79, a plus output is obtained which is applied to a trigger 83, of the type as shown in Fig. 20, to turn this trigger On, this trigger 83 having been reset via line 59 at the same time as the drum counter. This may be called the First Address trigger. With this trigger On, it stores the fact that the index search has been started, that the first index pulse has been sensed and that a True End Carry has occurred.

The plus output of trigger 83, when it is On, is applied via a cathode follower 84 and line 84a to one input of the "And" circuit 73. A plus voltage, as explained above, is applied to the other input of this "And" circuit 73 via line 71, each time a Middle Carry occurs, so that for each such Middle Carry, subsequent to the above three conditions, a plus output voltage is produced by this "And" circuit 73 and is available on a line 85, which is fed to and passes through the "Or" circuit 80, whose output via line 80a is applied to the amplifier 81 and via the cathode follower 82 to the line 82a, as described above. Thus it is seen that a Drum Ctr. Carry Pulse is produced and is effective, for the first time, upon a True End Carry, and subsequent to the first True End Carry, a Drum Ctr. Carry Pulse is effective for every Middle Carry.

From the above it will now be clear that a desired Address can be entered in the drum counter and that a True End Carry will be produced when the pulses derived from the sync track have run the counter backwards to zero, and that subsequent to a first such True End Carry, Middle Carry pulses, each representative of a count of 128, will be produced and effective. The utility of these Middle Carry pulses will be described in detail presently.

Referring to Fig. 9, the lay-out of the block wiring diagram of the entire drum Address selecting device is illustrated therein. The labels within the respective blocks indicate, in general, the type of circuit contained within the block.

A Set Drum signal, which is provided by the Main Machine when an Address is to be transferred to the drum counter is indicated in Fig. 9 as controlling the drum counter and is also identified in Fig. 10a. This signal comprises a conditioning potential which is applied via a line 86a to one input of an "And" circuit 86 (Fig. 10a) while a timed pulse E/R2(D1) is applied to the other input 86b of this "And" circuit. A plus output is produced at this time which will be designated as E/R2(D1) time, this designation identifying a pulse during the Execute-Regenerate portion of the Main Machine cycle, occurring at "2" time of the cycle and with a duration (D) of 1 microsecond. This plus output of "And" circuit 86 is applied to a cathode follower 87 whose output is identified as Set Drum Counter to 1's, and is applied via the line 60, and the "Or" circuit 61 etc. to be utilized, as described above.

Also this Set Drum conditioning potential is applied to another "And" circuit 88 (Fig. 10*a*) whose other input is an E/R9(D1) pulse which defines a pulse during the Execute-Regenerate portion of the Main Machine cycle, occurring at "9" time of the cycle and with a duration (D) of 1 microsecond which produces a plus output from this "And" circuit 88 which is applied via a cathode follower 89 to a line 90 and is identified as a pulse for dumping the Address Register into the drum counter. This plus pulse on line 90 is applied via an inverter 91, a cathode follower 92 and several cathode followers 93 to the line 58, to produce the above described minus conditioning potential on the right hand input of all the minus "And" circuits 47—57, (Figs. 10*c* and 10*d*), so that all such minus "And" circuits, which have a minus voltage on its other input, will thus transfer a binary -0- indication to the corresponding trigger of the drum counter to thus transfer or dump the Address pattern from the Address Register to the drum counter, all as described above. The line labeled Address Register in Fig. 9 represents symbolically all of the lines 47a to 57a of Figs. 10*c* and 10*d*. There is also labeled in Fig. 9, the Drum Ctr. Carry Pulses (see also Fig. 10*b*), while the inputs to the drum counter (Fig. 10*a*) labeled Reset Drum Ctr., Drum Index Pulse (Inverted) and Plus, After 1st Index Pulse, are also indicated in both Figures 9 and 10*a*. These are produced in the Drum Read-Write Control circuits of Figs. 11*a* and 11*b*, which will now be described.

Referring to Figs. 9, 10*a* to 10*d*, inclusive, and to Figs. 11*a* and 11*b*, it is seen that the Drum Ctr. Carry Pulses, produced on line 82a of Fig. 10*b* are conveyed from the Drum Counter Circuits (see also Fig. 9) to the Drum Read-Write Control Circuits (Fig. 11b) and that a Reset Drum Ctr. signal is produced by these Drum Read-Write Control Circuits which is employed as set forth briefly above. There are also produced a Drum Index Pulse (Inverted) (Fig. 11*a*) and a Plus, After 1st Index Pulse by these same Drum Read-Write Control Circuits which pulses are applied to the Drum Counter Circuits where they are utilized, as described in detail below. Also a Drum Disconnect signal (Fig. 11*b*) and a Drum Control MQ Read In signal are produced by these Drum Read-Write Control Circuits and employed as described later. Further, it is seen from Fig. 9, that a Copy signal, a Read Drum Select, Write Drum Select and Select Drums 1 Through 4 signals are applied to these Drum Read-Write Control Circuits which are utilized, as described presently. A Drum Index pulse is received by these Drum Read-Write Control Circuits from the Drum Read-Write Timing Circuits (see Fig. 9) and will be employed, as described presently, while the signal Reset Drum Register is produced and applied to the Drum Read-Write Timing Circuits, which reset signal is also called Drum Copy Proceed and is utilized, as described presently. A Drum Read Gate and a Drum Write Gate signal are produced by the Drum Read-Write Control Circuits and employed in the Drum Read-Write Timing Circuits, as presently described.

Before proceeding to the detailed description of the Drum Read-Write Control Circuits, a brief description of the Drum Selector Circuits of Fig. 13 and of the Drum Relay Switching Circuits of Figs. 14*a* and 14*b* will be given.

Referring to Figs. 9 and 13, the operation of the Drum Selector Circuits will now be described. Either the Select Drum #1 line 94*a*, or the Select Drum #2 line 94b, or Select Drum #3 line 94*c*, or Select Drum #4 line 94d is selectively energized, per the address portion of the Read Drum Select or the Write Drum Select instruction code, which portion identifies the particular one of the 4 drums which is to be selected. Only one such line will be hot. Assume, for example, that the Read Drum Select instruction is given so that line 95 is plus and also assume that the address portion of the instruction defines Select Drum #1 so that line 94*a* is plus. With both plus the two inputs of an "And" circuit 96 are plus whereby a plus output is applied via a cathode follower 97 and via a line 98*a* (see also Figs. 9 and 14*a*) to thus apply a signal Read Drum #1 to the Drum Relay Switching Circuits (Fig. 14*a*) which is effective via an "Or" circuit 99 (Fig. 14*a*) line 99a, an inverter 100, of the type as shown in Fig. 25 and to be described later, to energize the relay 101 which, as is seen in Fig. 12*a*, will close its contacts 101a and 101b, to thus render operative the Drum #1 Reading Heads for both the index and the sync tracks, whereby both these tracks, of Drum #1 only, will control.

Similarly, this Read Drum #1 signal on line 98a (Figs. 14*a* and 14*b*) is also applied via an inverter 102 (Fig. 14*b*) to energize relays 103 and 104 which relay 103, for example, will close its contacts 103a (Fig. 12*d*) controlling the Read circuits of Drum #1 so that only its storage tracks will be read. The operation under control of the signals Read Drum #2, Read Drum #3 or Read Drum #4 on lines 98*b*, 98*c* and 98*d*, respectively, is similar, the particular relays, pertaining to the drum selected, being exclusively operated.

If Write Drum Select is the instruction instead of Read Drum Select and if Drum #1 is again to be selected, line 105 (Fig. 13) is plus, and also line 94a again, so that an "And" circuit 106 has both its inputs plus, so that a plus output entitled Write Drum #1 is applied via a cathode follower 107 to a line 108$a$ whereby (Fig. 14$a$) plus is applied via an inverter 109 to energize relays 110 and 111 and will also act similarly via an inverter 112 to energize relays 113 and 114 and via an inverter 115 to energize relays 116 and 117. These relays (see Fig. 12$b$, relay 110, for example) will close their associated contacts whereby circuits are closed to the Write coils of all heads of all 36 storage tracks of Drum #1 only, to permit writing on Drum #1. Also this signal Write Drum #1 is effective via lines 108$a$ and 118 (Fig. 14$a$) to act via the "Or" circuit 99, as did Read Drum #1 on line 98$a$, to energize the relay 101, whereby again the Reading Heads for both the index and sync tracks of Drum #1 only, are rendered operative, as under Read Drum #1. The operation under control of the signals Write Drum #2, Write Drum #3 and Write Drum #4 on lines 108$b$, 108$c$ and 108$d$ respectively is similar to Write Drum #1, the associated relays of the drum selected being exclusively energized to permit writing on the storage tracks of the selected drum only.

It is to be particularly noted that whether Read Drum #1 or Write Drum #1, for example, is chosen, either signal will energize the relays controlling the Reading Heads for both the index and sync tracks of the selected drum only.

Referring to Figs. 9, 14$a$ and 14$b$, the Drum Relay Switching Circuits are illustrated therein. Briefly, under control of the signals Read Drum #1, #2, #3 or #4, respectively, applied to the lines 98$a$, 98$b$, 98$c$ or 98$d$ respectively, the relays 101, 119, 120 or 121 respectively (Fig. 14$a$) control their respective contacts 101$a$, 119$a$, 120$a$ and 121$a$, as shown in Fig. 12$a$, to thus select the Read Heads for both the index track and the sync track of one chosen logical drum, as described above in connection with the selection of Drum #1.

Similarly, when the Read Drum #1 signal is applied to this line 98$a$ (Figs. 14$a$ and 14$b$) it acts, as described above, to energize relays 103 and 104, the contacts 103$a$, for example (Fig. 12$d$), being operated to thereby select the Read coils of Drum #1, these two relays controlling all the points of all the Read Heads of the 36 storage tracks of Drum #1.

If Write Drum #1 is applied to line 108$a$, it also acts via lines 108$a$ and 118, as stated above, to energize relay 101, to thus select both the index and sync tracks of Drum #1 and it also energizes the relays 110, 111, 113, 114, 116 and 117, whose contacts, 110$a$ and 110$b$, for example (Fig. 12$b$), close the circuit to both sides of the center tapped Write coil to thereby prepare the coil for writing. These 6 relays, when so energized, control, via all their contacts, the circuits of all 36 Write coils of the 36 heads of Drum #1.

Thus, in summary, it is seen that upon energization of the Read Drum #1, line 98$a$ of Fig. 14$a$, the Read Heads for the index track and the sync track of Drum #1 will be selected and also the Read circuits of all 36 heads of the 36 storage tracks of Drum #1 will be selected. Similarly when the Write Drum #1 signal is applied to line 108$a$ (Fig. 14$a$), the Read Heads for the index track and sync track of Drum #1 will be selected and the Write coils for all 36 heads of the 36 storage tracks of Drum #1 will be similarly selected. The operation of the circuits upon selection of any other drum will now be obvious.

The selective operation of the relays for selecting one out of the four drums and the general operation of the drum have now been described. In order to Read or Write on the drum selected, means must be provided for selecting a particular Address thereon.

Novel means are provided for selecting one of 2048 Addresses on a selected drum, these Addresses designating a physical location, circumferentially of the drum, of any one spot, on each of 36 tracks, which is to be Read or upon which a binary -1- or a binary -0- is to be Written. These novel means for selecting a certain Address permit such selection with the use of a minimum of apparatus and also permit a successive selection of consecutively numbered Addresses, in one revolution of the drum, and by repeated revolutions of the drum all of the 2048 Addresses may be selected. The general theory controlling such an Address selection and the general lay-out of the Addresses on the drum was given above in connection with Figs. 6, 7 and 8 and is applicable with certain changes to the preferred embodiment of a system found particularly successful in the operation of a magnetic drum data storage system comprising part of a complete data processing system.

Referring to Figs. 10$b$ and 11$b$, the Drum Ctr. Carry Pulses on line 82$a$, produced as described above, are applied via this line to one input of an "And" circuit 122 (Fig. 11$b$) which may be called the Drum Read circuit. A Read Drum Select signal on line 95 (Fig. 11$a$) is applied (Figs. 11$a$ and 11$b$) to a second input of this "And" circuit 122 while a Plus, After 1st Index Pulse signal on a line 123 (Figs. 11$a$ and 11$b$) produced as described presently, is applied to a 3rd input of this "And" circuit 122 and a Plus On Copy signal on line 124, produced as described presently, is applied to the 4th input of this 4 input "And" circuit 122. Also, when an "And" circuit 355$a$ is conditioned by both a Drum Ctr. Carry Pulse on line 82$a$ and by Plus, After 1st Index Pulse on line 123, its output via a cathode follower 355$b$, an inverter 355$c$ and a line 355$d$ flips a 20 microsecond single shot 356 whose output for this period is applied via a cathode follower 357 and a line 358 to line 358$a$ which applies plus for 20 microseconds to the fifth input of "And" circuit 122. Thus upon coincidence of these 5 conditions, a plus output is produced which, via power cathode followers 125 and a line 126 is applied as a Drum Read Gate signal to the Drum Read-Write Timing Circuits of Figs. 12$a$–12$d$ (see also Fig. 9) to be used as described presently.

The Drum Ctr. Carry Pulses on line 82$a$ are also applied to an "And" circuit 127 which may be called the Drum Write circuit to which is also applied the Plus, After 1st Index Pulse and Plus On Copy signals. A further signal Write Drum Select on line 105 (Figs. 11$a$ and 11$b$) is also applied to this "And" circuit 127 as well as the signal on line 358$a$ so that when all 5 of these conditions are met, the plus output from "And" circuit 127 is applied via power cathode followers 128 to a line 129 as a Drum Write Gate signal to be fed to the Drum Read-Write Timing Circuits (Fig. 9) where it is employed, as described below.

The Drum Index Pulse, produced when the selected drum has its index spot on its index track sensed by the selected index track head, is available on line 130 (Fig. 11$a$) and is passed through an inverter 131 and line 131$a$ to a cathode followed 132 and thus to a line 133 (Fig. 11$a$) by which the inverted signal is fed (Figs. 9 and 10$a$) to the Drum Counter Circuits where it is applied to an "And" circuit 134 to which are also applied the Drum Timing Pulses, produced as described presently, on line 135. A Plus, After 1st Index Pulse produced on line 123 as described presently is also applied to this "And" circuit 134 and when all 3 conditions are met, this "And" circuit passes the Drum Timing Pulses to the "Or" circuit 61 and thence via the inverter 62, the tapped cathode follower 63 and line 64 (Figs. 10$a$ and 10$c$) to the binary input of the first trigger 35 (Fig. 10$c$) of the drum counter, to step the counter backwardly from the Address standing therein, as described in detail above.

As indicated by the labels in Fig. 11$a$, drum selecting potentials for selecting one of the four drums, are applied to an "Or" circuit 136, which, via a cathode follower 137 are respectively supplied to one input of an "And" circuit 138 whose other input is controlled either by the conditioning potential Read Drum Select on line 95 or Write Drum Select, on line 105, either of which is applied via an "Or" circuit 139 to the other input of the "And"

circuit 138. Since any operation of the drum will be either a Read or a Write operation and since one only of the 4 drums will be selected by Select Drum #1, Select Drum #2, Select Drum #3 or Select Drum #4 potentials, when a selected drum is to be operated the plus output from this "And" circuit 138 is fed via cathode followers 140, and line 141 to one input of an "And" circuit 142, to the other input of which a Copy signal is applied, whereupon a plus output is available and fed to a cathode follower 143, an inverter 144, a single-shot multivibrator 145 and via line 146, to one input of a trigger 147, which may be called the Copy trigger and which when On, can be considered as storing a Copy instruction. A Copy instruction is an instruction sent out by the Main Machine whenever it is desired to receive data from a register, which may be called the MQ register, whose data is to be written upon the drum or when it is desired to read data from the drum and store it temporarily in a drum register comprised of a plurality of triggers in Fig. 12*d*, to be described later, from which it may be transferred to an Input-Output line which feeds to or receives data from this MQ register. This MQ register (not shown) comprises buffer storage between the drum and the electrostatic storage (not shown) of the Main Machine, whereby data can be read from electrostatic storage or from other sources, into the MQ register and from the MQ register to the drum or whereby data can be read from the drum into the temporary drum register and from there via the Input-Output lines to the MQ register, from which, in turn, it may be transferred either to electrostatic storage or to some other destination.

This Copy instruction is represented by a voltage on line 148 (Fig. 11*a*) and is a control voltage produced in any desired manner to indicate that the instruction is Copy. As an example, the instruction "Copy" may be represented by a particular permutation of On and Off conditions of a group of triggers connected in cascade, the individual On and Off conditions of the respective triggers applying the particular pattern representative of Copy to an interpreting circuit which circuit will then selectively energize, one single line out of a group, this line being identified as the Copy line, and each time it is energized thus delivering a Copy instruction. Thus line 148 of Fig. 11*a* can be considered as the Copy line and each time it is energized it thus delivers to the "And" circuit 142 an instruction, Copy. This, as descrbied above, is employed to flip the trigger 147 On, whenever a Read Drum Select or a Write Drum Select signal is present, and one drum has also been selected.

For purposes of illustration, let it be assumed that the drum selection to be made is that of Drum #1 so that line 94*a* (Fig. 11*a*) is the only one which is hot, which thus applies a voltage via the "Or" circuit 136, and the cathode follower 137 to one input of the "And" circuit 138. Let it further be assumed that we wish to Read so that line 95 Read Drum Select is hot and applying potential via the "Or" circuit 139 to the other input of the "And" circuit 138. Thus, via the cathode followers 140 and the line 141 (Fig. 11*a*), a plus potential is applied to one input of the "And" circuit 142 while the other is being conditioned by the Copy line 148 being hot. Thus, as stated above, the output from the "And" circuit 142 flips trigger 147 On. This will remain On, until reset, as described later. With trigger 147 On, its left hand triode (Fig. 20) is conducting so that a reduced or relatively minus potential is applied to a line 148*a*, which, via a cathode follower 149 and a line 150 (see also Fig. 20) will apply a negative Shift pulse via a diode 150*a* to the grid of the right hand triode of a trigger 151 which may be designated as the Plus, On Start Index Search trigger to thus shift this trigger On. With this trigger 151 On, its right hand triode is non-conducting, so that a plus voltage is applied via a cathode follower 152 and a line 153 (see also Figs. 11*b* and 10*b*) to the "And" circuit 79 to which is also applied via line 123, the Plus, After 1st Index Pulse signal, produced as described presently, and via line 78 the True End Carry signal produced as described above, to thus render this "And" circuit 79 operative to flip the First Address trigger 83 On, which, via the cathode follower 84 and line 84*a* will condition the "And" circuit 73 so that subsequent Middle Carries on line 71 will pass through this "And" circuit 73 and apply plus to line 85 whereby, as described above, Drum Ctr. Carry Pulses are made available on line 82*a*, once for each subsequent 128 pulses applied to the drum counter, which Drum Ctr. Carry Pulses are utilized in the Drum Read-Write Control Circuits of Figs. 12*a*–12*d*, as described presently.

The Copy signal (Fig. 11*a*) as stated above, flips the Copy trigger 147 to thus flip the Plus, On Start Index Search trigger 151, and trigger 147 applies plus via a line 147*a* to a cathode follower 154, which, via the line 124 applies the Plus On Copy signal, mentioned above, to one input of the "And" circuit 122, which has another input conditioned by the Read Drum Select signal on line 95. Thus when the Plus, After 1st Index Pulse voltage is available on line 123, as presently described, the Drum Ctr. Carry Pulses, applied via line 82*a* to the "And" circuit 122 produce plus outputs which will be applied to the cathode followers 125 so that via the line 126 a Drum Read Gate signal will be applied to the Drum Read-Write Timing circuits of Fig. 12*c*, to be utilized as described presently.

The plus Drum Index Pulse is received on line 130 (Fig. 11*a*) and via the inverter 131, the cathode follower 132 and the line 133 is applied as described above, as an inverted pulse (negative pulse) to the "And" circuit 134 (Fig. 10*a*) to thus "block" passage through this "And" circuit of that pulse produced by sensing that spot on the sync track which is physically opposite the index spot. Thus, as stated above, the sync pulse produced by that magnetized bit on the sync track which is opposite the index magnetized bit does not pass to the drum counter nor do any subsequent pulses from the sync track which are produced by this one bit which is opposite the index bit on the drum. In this manner, the selection of Addresses may be precessed so that a very large number of Addresses, separated by a small physical space can be read in a plurality of revolutions instead of a few Addresses, separated by a large physical space which would ensue without precession.

The Plus, After 1st Index Pulse voltage on line 123, mentioned above is produced as follows:

The Drum Index Pulse, just described, also continues, via line 130 (Fig. 11*a*), to an "And" circuit 155 to thus condition one input of this "And" circuit. Since the Plus, On Start Index Search trigger 151 was flipped a plus voltage is also applied via the cathode follower 152 and the line 153 to another input of this "And" circuit 155. The third input to this "And" circuit 155 is obtained from the Read Drum Select signal, for example, acting via the "Or" circuit 139, the "And" circuit 138, now conditioned by Select Drum #1 in the example chosen, the cathode followers 140, an inverter 156, and a single-shot multivibrator 157 to a cathode follower 158 which is connected to the remaining input of "And" circut 155 so that the first Drum Index Pulse on line 130 subsequent to the start of the index search, and subsequent to the operation of single-shot 157, is now effective to produce an output from this "And" circuit 155, which is applied via a line 159 to a trigger 160 which may be called the First Index Pulse trigger, to flip this trigger On, by pulling the left hand triode thereof conducting. This trigger is later flipped Off by applying a negative pulse to a line 162*a*, which pulse is labeled the Drum Disconnect Pulse and is produced, as described later. When trigger 160 is thus flipped On, it applies a plus pulse via a cathode follower 161 to the line 123 and is labeled Plus, After 1st Index Pulse which is applied (Figs. 11*a* and 11*b*) to an input of "And" circuit 122 which, as described above, will produce the Drum Read Gate.

This Plus, After 1st Index Pulse voltage is also available via the line 123 (see Fig. 10*a*) to condition the "And" circuit 134 as stated previously. Thus this voltage conditions one input of this "And" circuit 134. The line 133 which carries the Drum Index Pulse (Inverted) signal, is normally plus (becomes minus only when the index pulse is sensed), and thus also normally conditions one input of this "And" circuit 134. With two of its three inputs thus conditioned, this "And" circuit 134 will pass the Drum Timing Pulses on line 135 to the "Or" circuit 61, the inverter 62 and the tapped cathode of follower 63 and via line 64, to the binary input of the first trigger 35 (Fig. 10*c*) of the drum counter, so that these timing pulses, derived from the sync track, are all applied, to the drum counter to step it down, when the conditions precedent are met, with the one exception of that sync pulse recorded opposite the index mark.

Referring to Figs. 12*a*–12*d*, and also to Fig. 9, the drum Read-Write Timing Circuits for a system of four logical drums are shown. In the device of the present system, each one of two physical drums is considered "logically" as two drums, each one having 36 tracks of storage and its own index and sync tracks.

Briefly, a series of four similar Read Heads 165, 166, 167 and 168 (Fig. 12*a*) are provided for reading the separate index tracks of each of the four drums, respectively, these heads being represented symbolically only, each read coil being illustrated as wound on its respective core. As the index spot, magnetized in proper position on the index track of the particular drum, passes its Read Head, the change in flux induces a voltage in the coil, as illustrated generally only, in curve C of Fig. 5*b*, which voltage is passed through its respective pre-amplifier 169, 170, 171 and 172 and a common main amplifier 173 whose details are shown in Fig. 16, to a common index pulse shaper 174, whose details are shown in Fig. 17.

The voltage induced in the coil 165 (Fig. 12*a*) for example, is fed via the input **169*a* to the pre-amplifier 169 which comprises (Fig. 16) a resistor 169*b* connected to the input 169*a* and to the grid of a triode 169*c*, which may, as shown, comprise one half of a 12AY7 type tube, its plate output being fed to the main amplifier 173 via an input 173*a* connected via condenser 173*aa* and a resistor 173*b* to the grid of an inverter 173*c*, which may comprise one half of a 12AV7 type tube, whose plate output is connected via a line 173*d*, a condenser 173*e*, and a resistor 173*f* to the grid of an inverter 173*g*, whose plate output is connected via a line 173*h*, a condenser 173*i* and a resistor 173*j* to the grid of an inverter 173*k*, whose plate output is connected via a line 173*m*, a condenser 173*n* and a resistor 173*p* to the grid of a power cathode follower 173*q*, which may comprise one half of a 5687 type tube, whose cathode output at 173*r* is connected to an output 173*s***, which, as is shown in Fig. 12*a* is connected to the input **174*a* of the index pulse wave shaper 174**, whose details are illustrated in Fig. 17.

Referring to Figs. 12*a* and 17, the output of the main amplifier 173, at **173*s*, is fed to the input 174*a* of the index pulse shaper and via a diode and resistor circuit, as illustrated, to the point 174*b*, the raw wave shape at input 174*a*** being as illustrated in Fig. 17 and comprising the curve A of Fig. 5*c*, and after passage through the diodes appearing at point **174*b***, in the form as shown in curve B of Fig. 5*c* and also shown in Fig. 17 above point **174*b*. This wave shape is applied via a resistor 174*c* to the grid of a triode designated as 01A of the type as shown in Fig. 17, whose plate output waveform at point 174*d*** is, as shown, which comprises curve C of Fig. 5*c*. This output is applied to the grid of triode 01B, its cathode output waveform, at point **174*e***, comprising curve D of Fig. 5*c*, this output being applied to the grid of triode 02A whose output waveform at point **174*f*** comprises curve E of Fig. 5*c*, which output is applied to the grid of triode 02B whose output is applied via triode 03B to a line **174*g* and thence to the grid of triode 04A whose plate output waveform at point 174*h*** comprises curve F of Fig. 5*c*. This output at point **174*h*** is applied (Fig. 12*a*) via a pull over inverter 175 to a single-shot multivibrator 176, whose period is adjusted to 10 microseconds its output comprising curve G of Fig. 5*c* which in turn is applied via the power cathode followers 177 and 178 to the Drum Index Pulse line 130 (see also Fig. 11*a*) whereby the output of the Read coil of head 165, for example (Fig. 12*a*), upon sensing the drum index spot is fed as the Drum Index Pulse (curve G of Fig. 5*c*) via line 130 (Figs. 12*a* and 11*a*) to the Drum Read-Write Control Circuits of Figs. 11*a* and 11*b*, and utilized therein as described above.

Contacts **101*a*** (Fig. 12*a*) for example, of relay 101 (Fig. 14*a*) when this relay is selectively energized, as described above, selectively render one only of the drums, effective.

Similarly four additional reading heads 179, 180, 181 and 182 are provided, one for each of the sync tracks of the respective four drums, these heads sensing the 2048 magnetized timing spots of the associated sync track and producing voltage changes in their respective coils, which are fed, via their respective pre-amplifiers 183, 184, 185 and 186, whose details like those of pre-amplifier 169 shown in detail in Fig. 16, their outputs feeding to a common main amplifier 187, whose details are similar to those of the main amplifier 173, also shown in detail in Fig. 16, the output of main amplifier 187 being fed to a timing pulse shaper 188, whose details are shown in Fig. 18. Since the operation of the pulse shaper of Fig. 18 will now be fairly obvious from the description of that of Fig. 17, a brief description only will be given. The output of the main amplifier 187 at **187*s* is fed to the input 188*a*** (Fig. 18) of this pulse shaper, the shape of the raw pulse being as shown in curve A of Fig. 5*d*. The input waveform at point **188*b*** to the grid of triode 08A, of the type as indicated in Fig. 18, is as shown in curve B of Fig. 5*d* while its output waveform at point **188*c*** is as shown in curve C of Fig. 5*d*. The output waveform of triode 08B as point **188*d*** is as shown in curve D of Fig. 5*d*, while the output waveform of triode 02B at point **188*e*** is as shown in curve E of Fig. 5*d*. The output waveform of triode 03A at point **188*f*** is as shown in curve F of Fig. 5*d* while the output waveform of triode 04A at point **188*g*** is as shown in curve G of Fig. 5*d*. This output is fed via a cathode follower 189 (Fig. 12*a*) and power cathode followers 190 to a line 191, connected to the line 135 (Figs. 12*a* and 10*a*) where this output is labeled Drum Timing Pulses which are fed to the drum counter to thus step it downward, as described above. These same voltage changes may be fed from line 191 (Fig. 12*a*) to a line 192 (Figs. 12*a* and 12*c*) and thence via an inverter 193, a cathode follower 194, power cathode followers 195, a distributed electromagnetic delay line 196, which may comprise a piece of delay line, such as RG65U, manufactured by the Federal Telephone and Radio Corp., a piece being cut, in this instance, to provide a delay of 2.4 microseconds, its output being then fed via an inverter 197 and via the line **135*a* to a cathode follower 198 which feeds the 2 microsecond delayed signal to one input of an "And" circuit 199** which, when a Drum Write Gate (curve C of Fig. 5*a*) is present on the line 129 and fed to its other input, produces an output which is applied via an amplifier 200, a power cathode follower 201 and cathode followers 202 to a line 203, as the Drum Write Pulse (curve D of Fig. 5*a*).

The 2 microsecond delayed output of the cathode follower 198 is also fed via a line 204 to one input of an "And" circuit 205, which, when a Drum Read Gate is available on the line 126 and is applied to its other input, produces an output to an inverter 206, whose details are shown in Fig. 26, which merely comprises one half a type 5687 tube with a 150 ohm grid resistor, with its plate connected via a line **206*a*, a resistor 206*b*** (Fig. 12*c*) and line **207*a*** to the special type single-shot multivibrator 207, whose circuit diagram is illustrated in Fig. 30. A comparison of this single-shot circuit and those of Figs. 15*a* and 15*b* will, however, make clear, that the distinction lies only in certain details of components, the operation being fundamentally the same as those of Figs. 15*a* and 15*b* as described below but with certain values of its components being inherently capable of higher speeds, the specific differences including the potentiometer **207*b* for varying the bias on the first triode, the inductances 207*c*, 207*d*** in the plate circuits enabling quicker rise and fall of the waveform. Otherwise the operation is the same as those of the single shots of Figs. 15*a* and 15*b* described below. The output of this single-shot is taken from the plate of the left hand triode and when the single-shot is flipped, a positive pulse whose width is fixed at 5 microseconds is applied via the input **208*a* of the peaker 208 (Fig. 31) to the grids of both its triodes, cutting off both tubes, so that the tuned circuit comprising the two plate inductances 208*b* and 208*c* and the distributed capacity, attempts to oscillate, but due to the 9.1K damping resistor 208*d*, a plus peaked output is obtained at the plate of the left hand triode. This output of peaker 208 at 208*e* is fed to a power cathode follower 209** (Fig. 12*c*) and thence via lines 210 and 211 to the power cathode followers 212 and 213 whose output on line 214 is labeled the Drum Read Sample Pulse (see curve F of Fig. 5*e*) which is fed via line 214 (Figs. 12*a* and 12*d*) to an "And" circuit 215 (Fig. 12*d*).

Figure 12D:
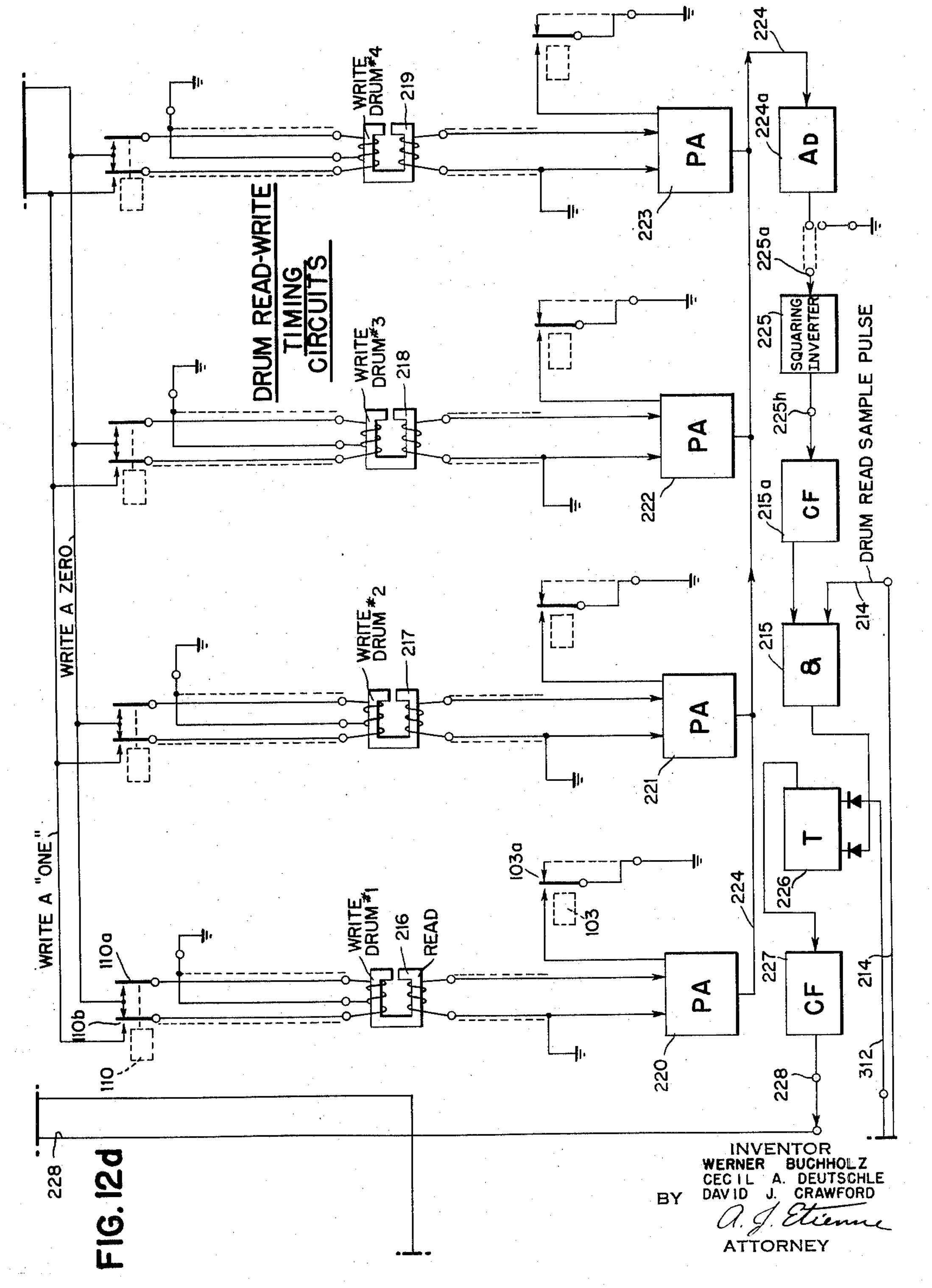

Four Read-Write heads 216, 217, 218 and 219, one for each of the logical drums are illustrated in Fig. 12*d*. A Write coil is diagrammatically illustrated as wound around one side of the U-shaped laminations of the head while a separate Read coil is diagrammatically illustrated as wound around the other side of the laminations of the same head, the actual structure of the head being as illustrated in detail in Fig. 2. Reading with these heads is similar to Reading with the heads for the index and sync tracks. Again, as with the index and sync track Read Heads, all the heads for all the storage tracks of a particular drum are selected by operation of associated relays whose contacts may in this case be relay contacts **103*a*** (Fig. 12*d*) which as described above are selectively controlled by relay 103 (Fig. 14*b*) when the Read Drum #1 signal is applied to line 98 (Figs. 14*a* and 14*b*) in order to pick Drum #1, it being understood that all the heads of the particular selected drum only, are selected simultaneously.

On reading any one of the storage tracks, the change in flux produced in the coil by the passage of the magnetized spots on the associated storage track beneath the head, produces a change in voltage which is fed to the pre-amplifiers 220, 221, 222 and 223, respectively, whose outputs are fed via a line 224 to a Drum Read amplifier **224*a* whose output is applied to the input 225*a* of a squaring inverter 225, shown in detail in Fig. 29. This comprises this input 225*a* connected via a 39 micromicrofarad condenser 225*b* and a 10K resistor 225*c*, in parallel, their junction adjacent the triode being connected to ground via a diode 225*d*, and connected to the grid of a triode 225*e*, which may comprise half of a 5965 type tube. The plate output is connected via a 160K resistor 225*f* and a 15 micromicrofarad condenser 225*g* to an output 225*h*, the lower junction of the resistor and condenser being connected via a 330K resistor 225*j*, to a source of minus 250 volts. This output 225*h* is connected to a cathode follower 215*a*** (Fig. 12*d*) whose output is connected to the second input of the "And" circuit 215, which circuit, as stated above, is also controlled by the Drum Read Sample Pulse on the line 214, whereby the binary –1– value of the magnetized spot or bit sensed by the reading head may then be stored, by flipping an intermediate storage trigger 226, the thirty-six intermediate storage triggers of the thirty-six storage tracks of one drum comprising a Drum Register for registering the values represented by the magnetized spot bits, read from the drum. When a binary –0– is Read the trigger 226 is not flipped. The output from this trigger 226 is fed via a cathode follower 227, and a line 228, to the Input-Output line leading to the MQ storage register, which MQ register may also be the source of data sent out therefrom via this Input-Output line, in order to be written on the drum, as will now be described.

Data received over this Input-Output line is in the form of a pulse and may be either +10 v., representing a binary –1–, or –30 v., representing a binary –0–.

A +10 v. will be fed to the input **229*a* of an inverter 229** (Fig. 12*b*) whose details are shown in Fig. 27, this input **229*a* being connected via a 10K resistor 229*b* to the grid of a triode 229*c* which may comprise half a 12AV7 type tube its plate being connected via a 15 micromicrofarad condenser 229*d* and a 160K resistor 229*e*, in parallel, whose lower junction is connected via a 330K resistor 229*f* to a minus 250 volt source and this lower junction being connected to the output 229*g*** which in turn (Fig. 12*b*) via a cathode follower 230, a line 231, an inverter 232 and a cathode follower 233 feeds plus, to one input of an "And" circuit 234, whose other input is controlled by the Drum Write Pulse on the line 203, as described above.

A –30 v. will be fed via this same inverter 229, as plus, to the cathode follower 230 to one input of an "And" circuit 235, whose other input is controlled by the Drum Write Pulse on line 203, and the output from this "And" circuit 235 is fed via a power cathode follower 236 to the input **237*a* of an inverter 237 whose details are shown in Fig. 28, the input being fed via a 47 ohm resistor 237*b* to the grid of a triode 237*c*, which may comprise half a 5687 type tube. The plate output of the triode is fed via a 5000 micromicrofarad condenser 237*d* to the output 237*e*, the side of this condenser, remote from the plate being also connected via a 470K resistor 237*f*, to ground. The output 237*e*** is fed (Fig. 12*b*) to a line 238 which in turn, via the relay contacts of the selected drum, feed, in one direction, through the Write coil of a thus selected head, when a binary –0– is to be written. The output of the "And" circuit 234 is fed via a line 239 to a power cathode follower 240 whose output is fed via the input **241*a* of an inverter 241, similar to the inverter 237, and thence via a line 242** and the same selected relay contacts, this output is fed, in the opposite direction, through the selected Write coil, to thus write a binary –1–.

While various components such as inverters, amplifiers, single-shot multivibrators, cathode followers, etc. have been illustrated merely as blocks, and some components have been described in detail there is also disclosed and will now be described in detail, an example of one each of the remaining components and still further, with regard to Figs. 15*a* and 15*b*, the wiring details of the components of a portion of the block diagram of Fig. 11*b* and the specific manner of interconnection of these components, is shown and will later be described.

In Figs. 19 to 25, inclusive are illustrated the circuit details of the remaining blocks utilized in the invention which are not covered above or in Figs. 15*a* and 15*b*.

Referring first to Fig. 19, the block symbol labeled I to indicate an ordinary inverter is illustrated and also the details of the circuit within the block. This inverter which, as exemplary only, has been selected as inverter 131 of Fig. 11*a* comprises a triode 243 which may, for example, comprise half of a 5965 type tube, whose plate is connected, via an inductance 244 and a resistor 245, in parallel, these being connected in series with a resistor 246 to a source of +150 v. The grid of triode 243 is connected via a resistor 247, to a resistor 248 and a condenser 249, in parallel, whose farther junction is shown as connected to the line 130 (Fig. 11*a*). The plate of the triode 243 is also connected via a condenser 250 and a resistor 251, in parallel, to the output line **131*a*** which is shown (Fig. 11*a*) connected to the cathode follower 132. The lower junction of condenser 250 and resistor 251 is connected via resistor 252 to a source of —250 v.

While the inverter disclosed in Fig. 19 has been identified as the inverter 131 of Fig. 11*a*, whenever this block symbol, labeled I for an inverter, is illustrated in the drawings, the details within the block will be as illustrated in Fig. 19. Further, while a particular type of tube and particular values for the condensers, resistors and inductance have been indicated, these are illustrative only of values which have been tried and found to be particularly efficient in a Drum Address Selection system employed as part of a complete data processing machine. Other types of tubes and other values of components may be employed in accordance with the particular requirements of circuitry and speed of operation desired.

Referring to Fig. 20, the trigger 151 of Fig. 11*a* is illustrated therein but it is to be understood that wherever the block symbol T appears in the drawings, the contents of the block, labeled T, will comprise the circuit as illustrated in Fig. 20. This trigger comprises a dual triode 253 which may comprise a type 5965 tube. The plate of the right hand triode is connected via an inductance 254 in series with two resistors 255 and 256, respectively, connected to a +150 v. source. Two resistors each of 5.1K–1W value as shown, may be employed when it is desired to provide a tap, as shown, or a single 10K–2W resistor may be employed, when no tap is required. The left plate of dual triode 253 is similarly connected to the +150 v. source. The right plate is also connected to a condenser 257 and a resistor 258, in parallel, whose lower junction is connected to the plate output line 151*a*, which in the case of trigger 151 of Fig. 11*a* leads to the cathode follower 152. This lower connection is also connected via a resistor 259 to a —250 v. source.

The left plate is provided with a similar output connection for feeding a cathode follower and will be referred to in connection with Fig. 21.

The plate of the right hand triode of the dual triode 253 is also connected to the grid of the left hand triode via a condenser 260 and the resistor 261, in parallel, connected together in series with a resistor 262 to the grid of the left triode. The plate of the left triode is similarly connected to the grid of the right triode, to thus provide the now well known cross-coupling of an electronic trigger comprising a pair of triodes. The input A' is illustrated as connected, via a diode, to a —D. C. input whereby the trigger can be flipped Off, as shown, in which condition the right hand triode is conducting, as indicated by the small circle adjacent the envelope of the right hand triode. The gride of the left hand triode is also connected via the resistor 262 and a resistor 263 in series with a second resistor 264 to a source of —250 v., the junction of the two resistors being connected to an input labeled Manual On, whereby, by manual operation, a plus voltage may be applied to flip the trigger On. Similarly, the grid of the right-hand triode is connected to an input labeled Manual Off, whereby, by application of a plus potential, the trigger may turn Off, which is the status indicated. The flip-flop operation of such an electronic trigger is now well known, the trigger being flipped On or Off, as desired, the Off condition, as stated above, being that in which the right hand triode is conducting and the left hand triode nonconducting. Similarly by the application of a minus voltage to the Binary Input, which is shown connected to input D, such a negative voltage is applied to both grids but is effective only on the grid of that triode which is already conducting, to thus block its conduction and render this triode non-conducting. As illustrated in Fig. 20, a minus pulse applied to the Binary Input will render the right hand triode non-conducting and the left hand triode conducting. In order to more clearly set forth the particular connections of the trigger 151 of Fig. 11*a*, the output of this trigger to the cathode follower 152 is labeled 151*a* (Fig. 20) while the minus Shift input to shift the trigger On is indicated as 150, while the plus input to flip the trigger Off, or to reset it Off, is labeled 162 in both Figs. 11*a* and 20. Thus the detailed On and Off operation of the trigger 151 of Fig. 11*a* will now be deemed obvious.

In Fig. 21, there is illustrated, schematically only, the type of trigger $T_D$ which is employed in the drum counter illustrated in Figs. 10*c* and 10*d*. Trigger 35 of Fig. 10*c* is shown as exemplary. The sole difference between this trigger $T_D$ and the trigger T of Fig. 20 lies in the value of the cross-coupling condensers, these being each 33 micromicrofarads in the trigger of Fig. 21 instead of the 15 micromicrofarad condensers such as condenser 260 as illustrated in Fig. 20.

Referring to Figs. 10*c*, 20 and 21 and assuming that trigger $T_D$ is reset with its right hand triode conducting, the first plus timing pulse available at the output of the "And" circuit 134 of Fig. 10*a* is applied via the "Or" circuit 61 to the inverter 62 by which it is inverted to a minus pulse which is applied via the tapped cathode follower 63 to the line 64, so that a negative pulse is applied to the Binary Input of trigger 35 (Figs. 10*c* and 21) whereby the right hand triode is rendered nonconductive and the left hand triode conductive, so that the trigger 35 is turned On. Thus the voltage at the plate of the left hand triode will be relatively minus and this is applied via the output line 35*a* (Figs. 21, 20 and 10*c*), to the tapped cathode follower 46, whose output is applied via the line 46*a*, as minus, to the Binary Input of trigger 36, to flip this trigger On, which in turn, flips On trigger 37, etc. Thus the detailed operation of each of the triggers $T_D$ of Figs. 10*c* and 10*d* will be deemed obvious, these triggers being reset Off by a plus voltage applied via line 59 (Figs. 10*c* and 21) to thus render the right hand triodes of all of the triggers conducting. This is exactly similar to the application of a +D. C. input to line 162 of Fig. 20.

Referring to Fig. 22, the tapped cathode follower 46 of Fig. 10*c* is illustrated therein, this however being deemed exemplary of all tapped cathode followers employed herein. This tapped cathode follower 46 comprises a triode 265 which may comprise half of a type 5965 tube whose plate is connected to a source of +150 v. The grid is connected to the input line 35*a* (see Fig. 10*c*) by a resistor 266. The cathode is connected via the three resistors 267, 268, and 269, in series, to a source of —100 v. A tap 267*a* is taken between resistors 267 and 268 which tap is provided with diodes, connected as shown, for protective purposes, and this tap 267*a* provides the normal cathode output connected to the line 46*b*, which, as shown in Fig. 10*c*, applies the full cathode follower output to the "And" circuit 67. A tapped output 268*a* is taken from between the resistors 268 and 269 and feeds to the line 46*a* which is the tapped cathode follower output to the next trigger 36, as shown in Fig. 10*c*.

Referring to Fig. 23, there is illustrated therein what is designated as a minus "And" circuit, the particular minus "And" circuit 47 of Fig. 10*c* being illustrated as exemplary. A minus "And" circuit comprises a coincidence circuit requiring the coincidence of two negative potentials, on its two inputs, to produce a negative output. The minus "And" circuit 47 comprises (Fig. 23) a pair of diodes 270 and 271 which may comprise a Sylvania D436A or D437A, the type D436A having a back resistance of 400K ohms at 50 volts and 50° centigrade while type D437A has one half this back resistance. These diodes 270 and 271 are connected, as shown, to a resistor 272 whose lower terminal is connected to a source of —250 v. Upon application of a negative potential, (assume —30 v.) to the input 47*a* (Figs. 10*c* and 23), which negative potential, as described above, is derived from an Address Register and upon simultaneous application of another negative potential of —30 v. to the line 58 (Figs. 10*c* and 20), which line controls the dumping of the address desired, from the Address Register into the drum counter, a negative potential of —30 v. is available at the output and acts via the diode **47*b*** (Fig. 10*c*) to flip the trigger 35 Off, if this trigger has been turned On by the entry of 1's into the drum counter, as described above. This is the equivalent of the application of a —D. C. Input, as labeled and illustrated in Fig. 20. Thus upon coincidence of two negative potentials on the two inputs of the minus "And" circuit 47, a negative output is available. If either of the inputs is relatively plus, no such negative output will be available.

Referring to Fig. 24, the grounded grid amplifier 81 of Fig. 10*b* is illustrated in block symbol labeled A and also in detail. This comprises a pair of triodes 273 and 274 which together may comprise a type 5965 dual triode. The plate of triode 273 is directly connected to a source of +150 v. while its grid is connected via a resistor 275 to the input line **80*a*** (see Fig. 10*b*). The plate of triode 274 is connected via the resistor 275 and the inductance 276, in parallel, both in series with the resistor 277 connected to a source of +150 v. The plate of triode 274 is also connected via a condenser 278 and a resistor 279, in parallel, to the output line **81*a* leading to the cathode follower 82**, in Fig. 10*b*. This output is also connected via a resistor 280 to a source of —250 v. as shown.

The grid of triode 274 is connected via a resistor 281 to a condenser 282, in parallel with a resistor 283, the other side of the parallel circuit being connected to ground, as shown. The end of resistor 281, remote from triode 274 is also connected via a resistor 284 to a source of —30 v.

The cathodes of the two triodes 273 and 274 are connected, as shown, and are also connected to the —250 v. source via three resistors 285, 286, and 287, in series, as shown. The joined cathodes are also connected, via a diode 288 to a source of —30 v.

Assuming the application of a potential of +10 v. to the input line **80*a*, the triode 273, acting as a cathode follower, will produce approximately +13 v. at the common cathode. The grid voltage of the right triode is determined by the voltage divider and this voltage is —10 v., if no grid current is flowing. With +13 v. on the cathode and —10 v. on the grid, triode 274 will be cut off, producing +144 v. at the plate. This signal is divided between the +144 v. and the —250 v. source, as shown, to obtain an output of +10 v. on line 81*a***.

If the voltage on the grid of triode 273 were —20 v., the cathode would be approximately —18 v. With —18 v. on the cathode of triode 274 and —10 v. on its grid, the grid will draw current reducing the grid-to-cathode voltage, to approximately zero, thus allowing full conduction. The plate voltage will drop to about +70 v. which is divided via the circuit, as shown, producing an output of —36 v. on line **81*a***.

This circuit is designed for maximum response. The coil in the plate circuit of triode 274 decreases the rise time of the plate when the input to this grounded grid amplifier is going in the opposite direction. The 47 micromicrofarad condenser 282 in the grid network of triode 274 is employed to by-pass the grid, to ground, and to allow triode 274 to respond faster as the cathode voltage is dropped. When the grid of triode 274 begins to conduct, the voltage at the grid does not drop immediately but is held up by the potential of the grid condenser 282. This positive grid-to-cathode voltage provides a surge of plate current to aid the fall of the plate of triode 274.

Thus in the utilization of the grounded grid amplifier 81 of Fig. 10*b*, when a True End Carry pulse of +10 v. is applied, via the "Or" circuit 80 to the input line **80*a* of the grounded grid amplifier 81, a +10 v. will be available immediately at line 81*a* which is fed via the cathode follower 82 to line 82*a***, as one of the Drum Ctr. Carry Pulses.

Referring to Fig. 25, the inverter $I_D$ is illustrated which is chosen as inverter 100 of Fig. 14*a*. This comprises a dual triode 288 which may comprise a type 5687 tube. The plates are connected together, as shown, and are connected to the output line **100*a*. The plates are also grounded via a condenser 289, as shown. The grid of the right hand triode is connected via resistors 290 and 291 to the grid of the left hand triode, the junction of these two resistors being connected to ground via a condenser 292, and also being connected via a resistor 293, to the input line 99*a***.

Upon application of a relatively positive potential indicative of Read Drum #1 on line 98 (Fig. 14*a*) this is fed via the "Or" circuit 99 to the input line **99*a* of this relay driving inverter 100 (Fig. 25) whose relatively negative output on line 100*a* thereby drives relay 101 whereby the relay 101** actuates its contacts, as described above, to select Drum #1 for reading.

Referring to Figs. 15*a* and 15*b*, there is illustrated therein the "Or" circuit 294 of Fig. 11*b* and its connection to a pull over inverter 295 which via line 296 is employed to pull over a single-shot multivibrator 297 (Fig. 15*b*) one of whose outputs is fed to a cathode follower 298, whose output, in turn, is fed via a line 299 to turn Off the Copy trigger 147 (Fig. 11*a*), as described presently. Also, there is illustrated in Fig. 15*a*, the connection from the pull over inverter 295 via a line 300 to a single-shot multivibrator 301 and the connection from the output D of this single-shot multivibrator 301 via a line 302 to the input A of another single-shot multivibrator 303. Another output E of the single-shot multivibrator 301 is via a resistor and condenser to a line 304 connected to a cathode follower 305 (Fig. 15*b*) whose output in turn is connected to a plus "And" circuit 306, the output of which is connected via a cathode follower 307 to the line 308. The output on this line 308 comprises the Drum Control M/Q Read In (Fig. 11*b*).

There is also illustrated in Fig. 15*a*, the connection between the output E of the single-shot multivibrator 303 via a resistor and condenser to a line 309 connected to a cathode follower 310 (Fig. 15*b*) whose cathode output is connected to four power cathode followers represented as 311 whose outputs at line 312 (Fig. 11*b*) comprises the Reset Drum Register signal and on line 313 comprises the Drum Copy Proceed signal.

The "Or" circuit 294, pull over inverter 295, the single-shot multivibrator 297, the cathode follower 298, and also the plus "And" circuit 306 and the power cathode followers 311, will be described in detail, the remaining single-shot multivibrators 301 and 303 and ordinary cathode followers 298, 305, 307 and 310 being obviously the same circuit components as those now or previously described, their detailed circuitry being included in Figs. 15*a* and 15*b* in order to provide a clear picture of the exact details of the interconnections of the respective components included within the blocks, Figs. 15*a* and 15*b* comprising a complete portion of the circuit illustrated in Fig. 11*b*.

Referring to Fig. 15*a*, the "Or" circuit 294 comprises a pair of diodes 314 and 315 joined at their cathodes and connected via a resistor 316 to a source of —250 v. The application of a +10 v. to either the input **126*a* or 129*a*** (see also Fig. 11*b*) will produce a +10 v. at the output. This is also true when both of the inputs are plus. Thus the "Or" circuit 294 comprises a plus "Or" circuit which passes a plus voltage applied to any one of its inputs. On the other hand, a minus voltage applied to either input will not produce any change at the output. The plus output of "Or" circuit 294 produced when a plus input is applied to either line **126*a* or 129*a* is applied via a condenser 317 to a line 318** which is connected via a resistor 319 to a source of −30 v. and via a resistor 320 to ground. Line 318 is also connected to the input labeled "A" of the pull over inverter 295, the input A being connected via a resistor 321 to the grid of the triode 322 of this inverter which may comprise half of a type 5965 tube. The plate of triode 322 is connected via the line 296 (Figs. 15*a* and 15*b*) to the input D of the single-shot multivibrator 297 (Fig. 15*b*) and this pull over inverter acts, when plus is applied to its grid, to pull over single-shot multivibrator 297 by producing a drop in potential in the 33K–2W plate resistor of its left hand triode. It is thus, that the inverter 295 acts as a pull over for a single-shot multivibrator. Line 296, as shown, is connected not only to the plate of triode 295 but also to the point D of this single-shot multivibrator 297, so that when said single-shot multivibrator "restores," a plus pulse is applied via lines 296 and 300 (Figs. 15*b* and 15*a*) to a condenser 323 (Fig. 15*a*) connected to the input A of the single-shot multivibrator 301, this input A being connected to the tap B and via a condenser 324 to the tap C, which via a resistor 325 is connected to the grid of the left hand triode of the dual triode 326 of this single-shot multivibrator 301. This dual triode may comprise a type 5965 tube. The plate of the right hand triode is connected via a resistor 327 to a source of +150 v. while the plate of the left hand triode is connected via a resistor 327*a* to this same +150 v. source. This source is also connected via a resistor 328 to the input A which is also connected via a resistor 329 to a source of −100 v. The tap B is connected via the condenser 324 to the tap A, as shown, and is also connected via a resistor 330, in shunt with the condenser 324, to the tap C, which is connected via a diode 331 to the junction of two resistors 332 and 333, the remote end of the resistor 332 being connected to a source of −30 v. while the remote end of the resistor 333 is connected to the −100 v. source while the cathodes of the two triodes are joined, as shown, and connected via a resistor 334 to this −100 v. source. The junction of the resistors 332 and 333 is connected to ground via a condenser 335 and is also connected via a diode 336 to the joined cathodes of the two triodes, which are connected between diode 336 and another diode 337 whose cathode is connected to a +10 v. source, as shown, an output 338 being taken from between diodes 336 and 337, as illustrated. The plate of the right hand triode is connected via output E to a resistor 339, in parallel with a condenser 340, their remote junction being connected via a resistor 341 to a source of −250 v., this remote junction also being connected to line 304 (Figs. 15*a* and 15*b*) which as is seen from Figs. 11*b* and 15*b* comprise the input to the cathode follower 305. The plate of the left hand triode of the single-shot multivibrator 301 (Fig. 15*a*) is connected via a condenser $C_T$ and a resistor 342 to the grid of the right hand triode, while the junction of this resistor 342 and condenser $C_T$ is connected, via a resistor $R_T$, to a source of +220 v. The resistor $R_T$ has a value of 560K ohms while the condenser $C_T$ has a value of 220 micromicrofarads, these components being the main determining factor in fixing the period of the single-shot multivibrator 301 whose period of flop over with these values is 30 microseconds.

The operation of the single-shot multivibrator 301 is as follows:

Upon "restoration" of the single-shot multivibrator 297 (Fig. 15*b*), which occurs at the end of its 25 microsecond period, a plus pulse is applied via line 296 (Figs. 15*b* and 15*a*) and line 300, condenser 323, taps A and B and condenser 324 to tap C and via the resistor 325 to the grid of the left hand triode of the dual triode 326 (Fig. 15*a*). Normally the right hand triode is conducting and the single-shot multivibrator is in its stable or Off condition. However, upon application of this plus pulse to the grid of the left hand triode, it becomes conductive and the right hand triode non-conductive, in the well known manner. The left hand triode will remain conductive for a period, determined in main by the value of the condenser $C_T$ and of the resistor $R_T$ which will, with the values as shown, comprise a period of 30 microseconds, at the end of which period the single-shot multivibrator 301 automatically "restores" to its normal or Off status, that is with the right hand triode conducting, as indicated by the small circle at the lower right of dual triode 326 (Fig. 15*a*). Thus, an output of 30 microseconds duration may be produced or an output may be delayed for 30 microseconds after application of the plus input to the grid of the left hand triode. When so operated, the single-shot multivibrator 301 (Figs. 11*b* and 15*a*) produces a plus output of 30 microseconds at the output E, which is applied via the line 304 (Figs. 15*a* and 15*b*) to the cathode follower 305 and via the "And" circuit 306 and the cathode follower 307 to the output line 308 whereby a plus output, of approximately 30 microseconds duration, is available, to control the read in of data, read from the drum and to be read into and M/Q Register, as described above. Also, after this 30 microsecond delay, a plus output is available at the output D of this single-shot multivibrator 301 (Fig. 15*a*) which is applied via the line 302 to the input A of the single-shot multivibrator 303 whereby plus is applied to the grid of the left hand triode of this single-shot to flip it On, the values of $C_T$ and $R_T$ of this single-shot multivibrator 303 being, as shown, to provide a flipped period approximately 5 microseconds in duration whereby a plus potential is applied via output E and line 309 (Fig. 15*a* and Fig. 15*b*), the cathode follower 310 and the four power cathode followers 311 to the output lines 312 and 313, to produce thereon a plus output of 5 microseconds duration, which, as stated above, are employed to reset a Drum Register as described presently, and also serves as a Drum Copy Proceed signal (Fig. 11*b*) to enable a Copy instruction to be applied to line 148 (Fig 11*a*) so that this Copy signal may flip the Copy trigger 147, also as presently described.

As stated above, the output E of the single-shot multivibrator 301 is applied via the line 304 to the cathode follower 305 (Fig. 15*b*). This output is applied via this line 304 and via a resistor 343 connected to the grid of a triode 344 which may comprise half of a 5965 type tube. This cathode follower 305 is generally the same as the tapped cathode follower illustrated in Fig. 19 and described above, with the exception that no tapped output is provided between its 2.7K–1W and 5.6K–2W resistors.

The output of this cathode follower 305 (Figs. 15*b* and 11*b*) is applied via a line 305*a* to one input of the "And" circuit 306. This "And" circuit is a plus "And" circuit, as contrasted to the minus "And" circuit of Fig. 23. In other words, a coincidence of two +10 v. inputs, for example, applied respectively to the lines 305*a* and 95 are effective via diodes 345 and 346 to produce a +10 v. output, the plates of the diodes being joined and connected via a resistor 347 to a source of +220 v. This "And" circuit 306 (Figs. 11*b* and 15*b*) is connected via a resistor 348 to a cathode follower 307 (Figs. 11*b* and 15*b*) which is composed of a triode 349 which may comprise half a 12AV7 type tube and this cathode follower is similar to the cathode follower 305.

As stated above, the cathode follower 310 is connected (Figs. 11*b* and 15*b*) to four power cathode followers represented as 311. Each of these comprises a triode 350, which may comprise half of a 5687 type tube instead of half a 5965, as employed for ordinary cathode followers. Further, the three cathode resistors 351, 352 and 353 are respectively 300 ohms, 3K–2W and 3K–2W. Otherwise the power cathode followers 311 are similar to the standard cathode followers 305 or 306 of Fig. 15*b*.

The details of the component members and component circuits having been fully covered, the operation of the complete Address selecting device will now be described. Reference will be made to the composite drawing of Figs. 32*a*–32*d*, inclusive. In order to highlight the operation, these figures omit such devices as cathode followers, for example, the description of whose operation is now deemed clear and which is not essential to the understanding of the operation of the novel means of the invention.

Figures 32, 32B:
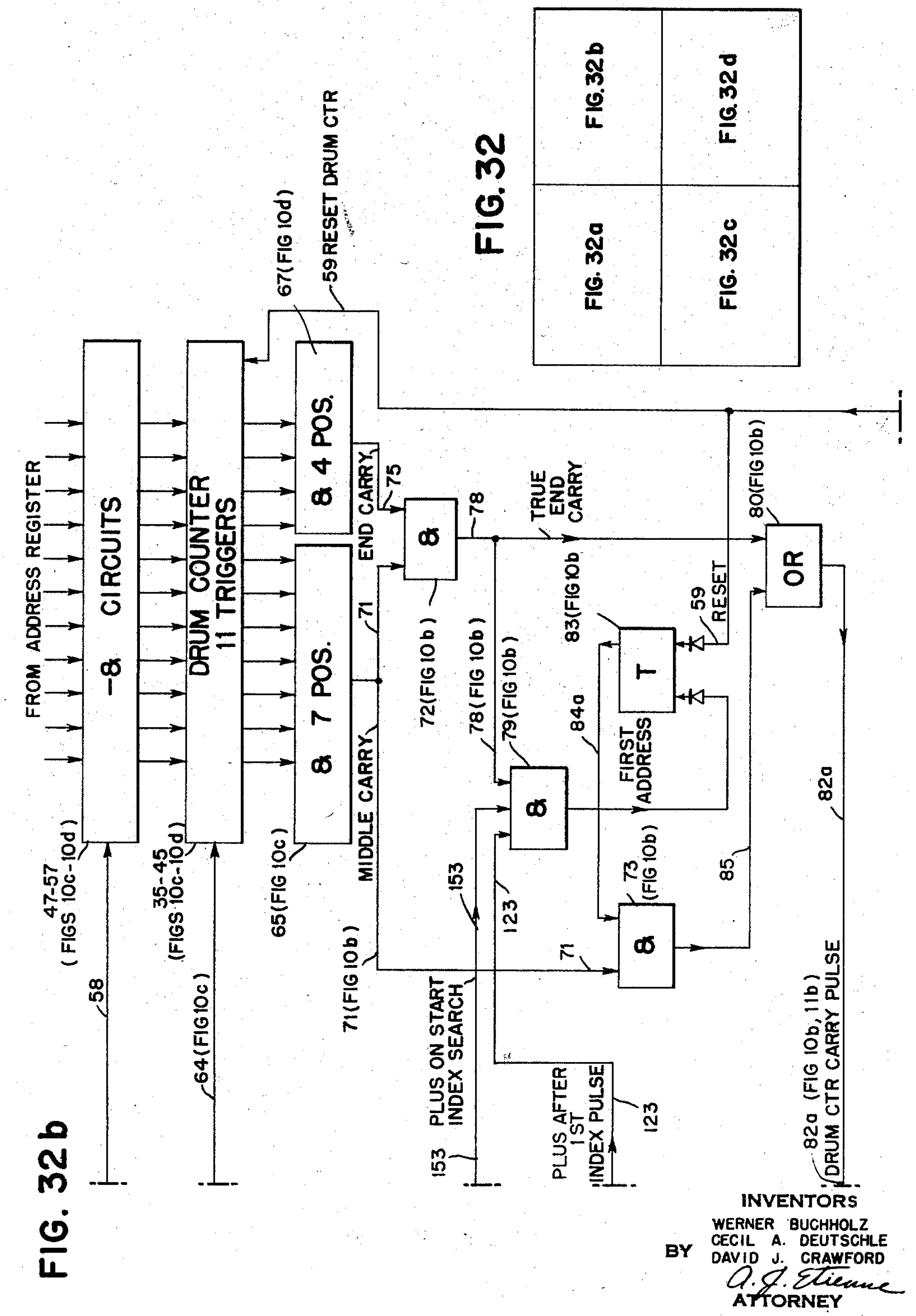

When it is desired to Read the value stored at a certain Address on the drum, this Address is first stored in the eleven triggers of the drum counter (Fig. 32*b*). Next assume that the line 94*a* (Fig. 32*c*) Select Drum #1 is conditioned that line 95, Read Drum Select is conditioned and that the instruction "Copy" is given by energizing line 148. This Copy instruction signal is applied to one input of the "And" circuit 142. Since Read Drum Select on line 95 acts via the "Or" circuit 139, to condition one input of "And" circuit 138, and since its other input is conditioned by Select Drum #1 on line 94*a* acting via the "Or" circuit 136, the output of "And" circuit 138 is effective to aply a signal, via line 141 to the other input of "And" circuit 142. The output of this "And" circuit 142 is applied to the single-shot multivibrator 145, whose period is 50 microseconds. When writing, this delay is sufficient to allow time for the information in Memory at the Copy address, to move from Memory in the Main Machine to the MQ and to the drum. This single-shot thus acts, after this delay, to flip the Copy trigger 147, On. This produces plus on the line 124 which thus applies the signal entitled Plus On Copy, to one input of the Drum Read "And" circuit 122, so that it will, as described presently, produce a Drum Read Gate signal on lines 126 and 126*a*. This Drum Read Gate signal is employed, as described presently, to permit passage, to the MQ register, of the signal produced by sensing the spot at the Address chosen, and solely that signal.

Figure 32A:
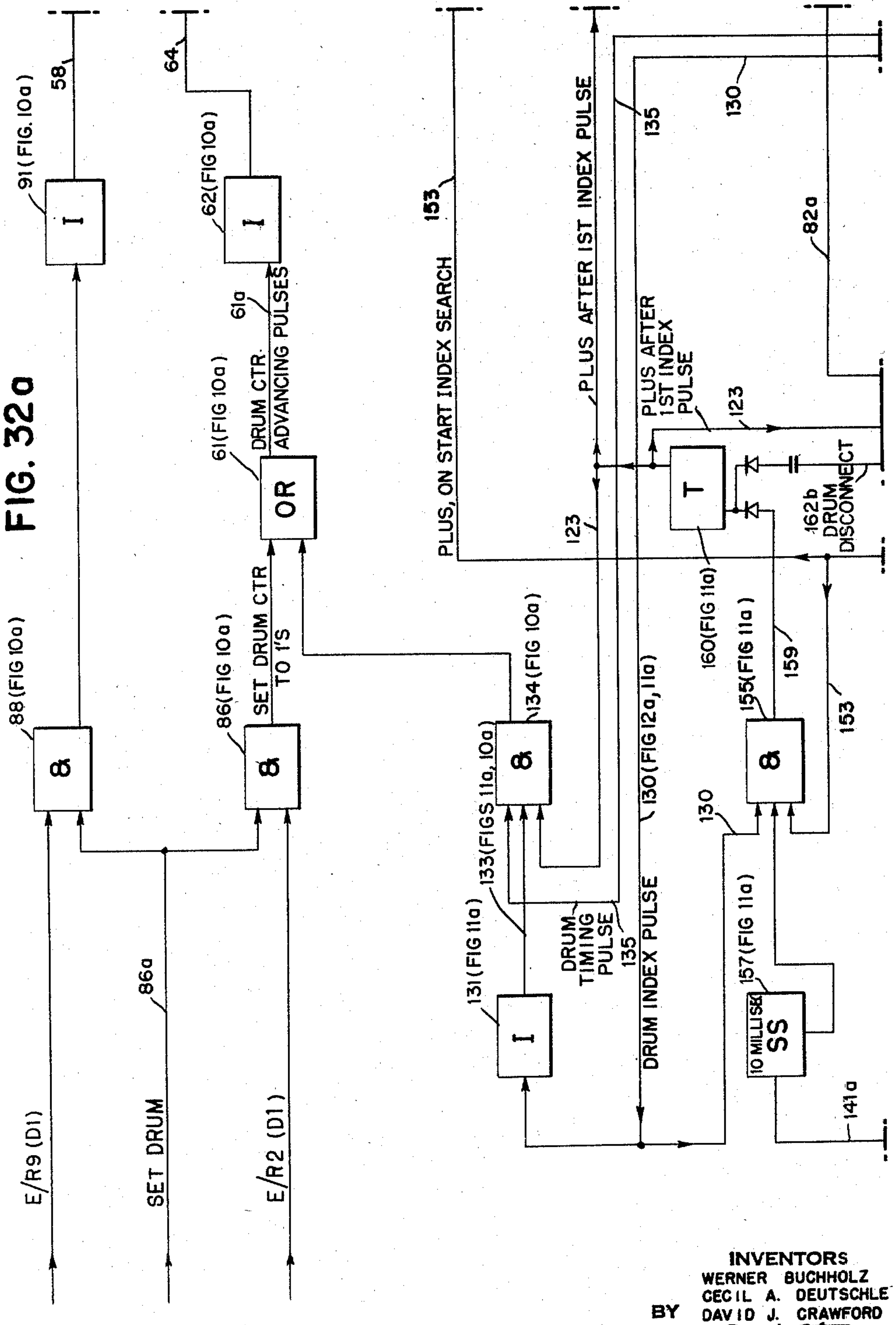
Figure 32C:
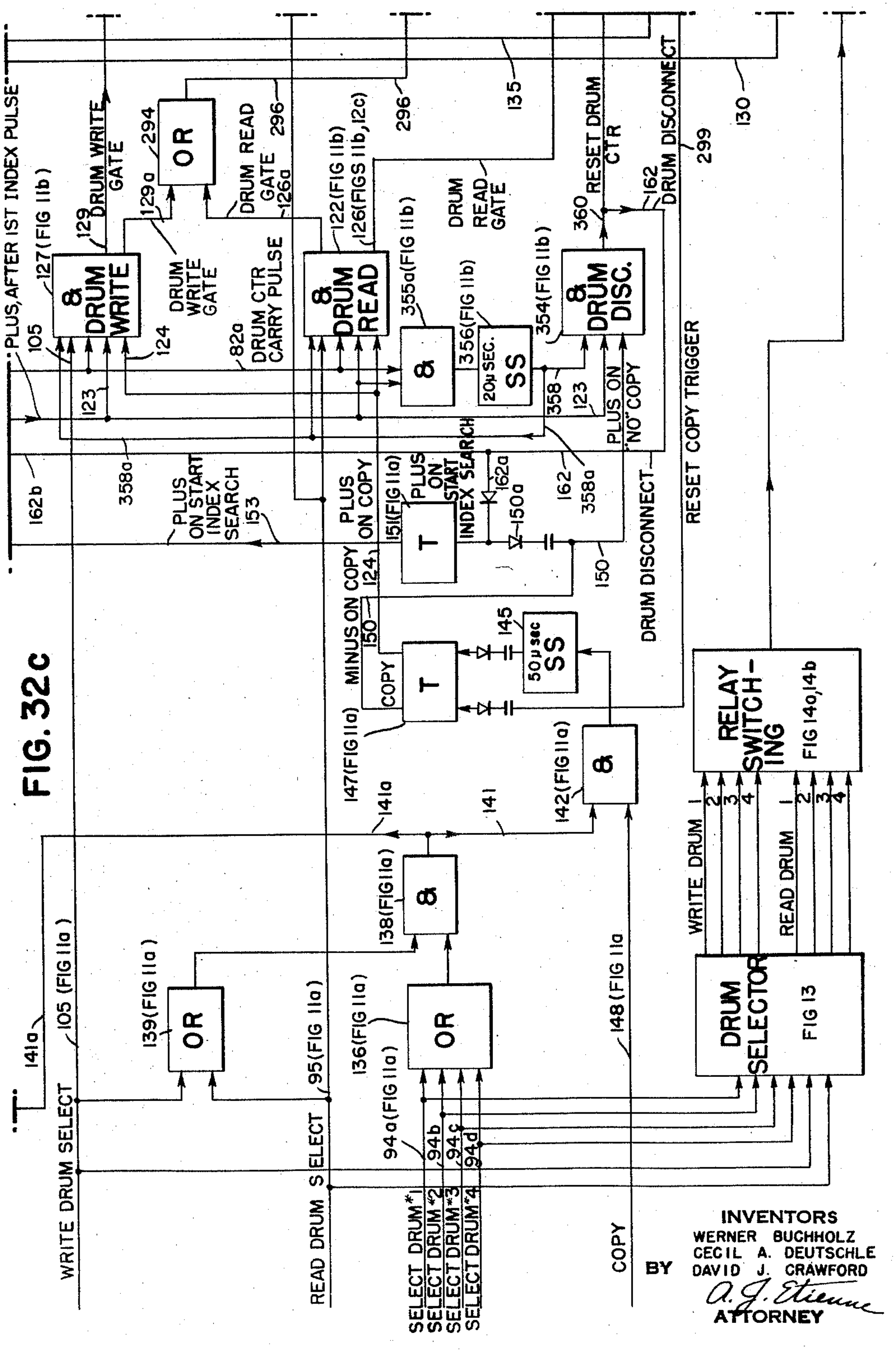
Figure 32D:
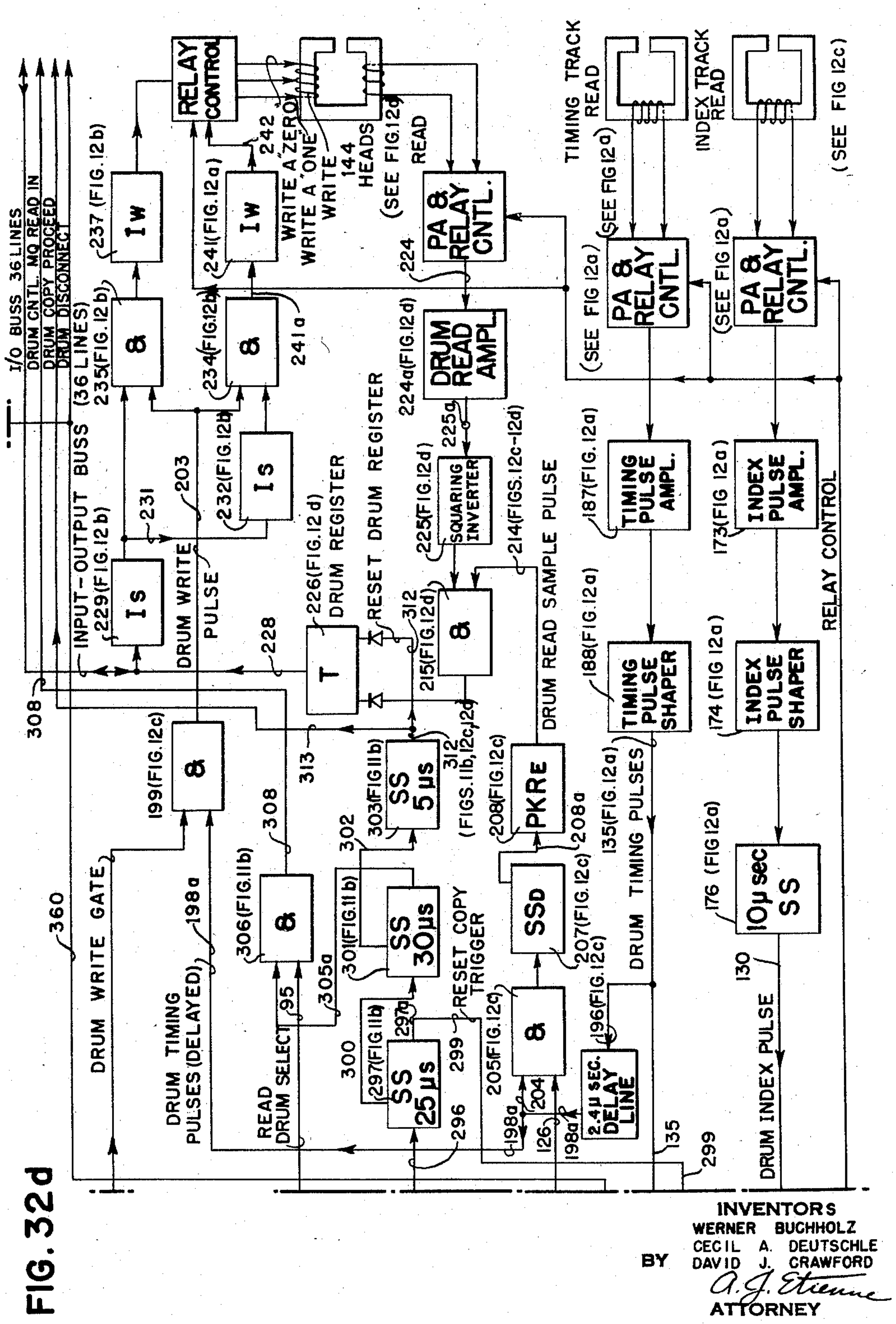

This flipping On of the Copy trigger 147 (Fig. 32*c*) produces a negative pulse on the line 150 which negative pulse entitled Minus On Copy is effective via the diode 150*a* to flip On the trigger 151 which is labeled Plus, On Start Index Search. With this trigger 151 On, it applies this Plus On Start Index Search signal via line 153 to one input of the "And" circuit 155 (Fig. 32*a*). The signal Read Drum Select on line 95 (Fig. 32*c*) is, as stated above, applied via the "Or" circuit 139 to one input of the "And" circuit 138, whose other input is conditioned, by the Select Drum #1 signal, so that the output of this "And" circuit 138 is effective via line 141*a* to apply a signal to the single-shot multivibrator 157 (Fig. 32*a*) whose period is 10 milliseconds, which provides time for the drum selecting relays to select Drum #1. After this delay, the single-shot multivibrator 157 is effective to apply a conditioning potential to a second input of the "And" circuit 155. Thus with two of its inputs conditioned, the first "subsequent" sensing of the index mark of this selected Drum #1, produces a third plus input, on line 130, to the "And" circuit 155, which signal is labeled Drum Index Pulse. Since the other two inputs of the "And" circuit 155 are already conditioned, this Drum Index Pulse produces an output from the "And" circuit 155 which is effective via line 159, to flip the Plus, After First Index Pulse trigger 160, On, which thus indicates that the first index mark, subsequent to the Copy instruction and subsequent to the operation of single shot 157, has been sensed. With trigger 160 On, it applies plus to line 123 where it appears as the signal Plus, After First Index Pulse, which signal is applied via this line 123 to another input of the Drum Read "And" circuit 122 (Fig. 32*c*). Thus with the signals Read Drum Select, Plus On Copy and Plus, After 1st Index Pulse respectively conditioning three of the five inputs of this "And" circuit 122, when the drum counter counts down to zero, from the Address number stored therein, as described above, to thus indicate that the desired Address has been reached on the drum so that a plus signal, Drum Ctr. Carry Pulse, is produced on line 82*a*, and when plus is available on line 358*a* then, since the other three inputs of the "And" circuit 122 are now conditioned, this produces an output from this "And" circuit 122 which is applied to the line 126, on which it appears as the signal Drum Read Gate. This signal, as described in detail above, is applied to one input of the "And" circuit 205 (Fig. 32*d*) to whose other input the 2.4 microsecond delayed signal initiated by a Drum Timing Pulse is applied, so that the output of this "And" circuit is applied to the single-shot multivibrator 207, which, when flipped, produces a positive pulse at its right hand triode which is fed to the peaker 208 whose output comprises the Drum Read Sample Pulse, which in turn permits the signal read at the desired Address and applied to one input of the "And" circuit 215 (Fig. 32*d*) and that signal only, to operate the trigger 226, if a binary –1– is Read which will then produce a pulse which is indicative of binary –1– on the Input-Output line. If a binary zero is read, trigger 226 is not flipped so that no pulse is produced on the Input-Output line.

The Plus On Start Index Search signal is also applied via line 153 to the "And" circuit 79 (Fig. 32*b*). Further, the Plus, After 1st Index Pulse signal, on line 123, is also applied to this same "And" circuit 79. Thus two inputs of this "And" circuit 79 are conditioned. When the drum counter counts down to zero, it produces the End Carry pulse on line 75 which acts via the "And" circuit 72 also conditioned by the Middle Carry on line 71, to thus produce a True End Carry output from "And" circuit 72, which is applied to line 78 which comprises one input to the "And" circuit 79. Since the other two inputs of this "And" circuit 79 are already conditioned, an output is produced which flips the trigger 83 which is labeled, the First Address trigger whose output is applied via line 84*a* to one input of the "And" circuit 73 to thus condition one input, its other input being already conditioned by the Middle Carry on line 71 so that under control of the True End Carry an output is produced on the line 85 which is applied to the "Or" circuit 80 which applies to the line 82*a* a signal entitled Drum Ctr. Carry Pulse, which acts, as just described above, to produce the Drum Read Gate signal. This Drum Read Gate signal is therefore produced when the drum counter counts down to zero, or in other words, when the desired Address is reached.

The Plus, After 1st Index Pulse signal on line 123 is also applied to the "And" circuit 134 (Fig. 32*a*) so that for each Drum Timing Pulse, except that one produced at the index time which is suppressed, as described in connection with the detailed operation, these Drum Timing Pulses pass through this "And" circuit 134 to the "Or" circuit 61 and appear as positive Drum Ctr. Advancing Pulses on the line 61*a* which are inverted by the inverter 62 and are applied as negative pulses to the first trigger 35 (Fig. 10*c*) of the eleven triggers of the drum counter (Fig. 32*b*). Thus the count "down" of this counter can not start until an index point is sensed so that we may say that the drum counter starts from a chosen index position and the Drum Counter Advancing Pulses step the drum counter down, in step with the drum rotation, so that when the chosen Address on the drum is reached, the counter will have backed down to zero, to thus produce the End Carry, True End Carry, and also the Drum Ctr. Carry Pulse on line 82*a* which Drum Ctr. Carry Pulse, as described above, passes through the Drum Read "And" circuit 122 to produce the Drum Read Gate signal, on line 126, which in turn produces the Drum Read Sample Pulse on line 214 (Fig. 32*d*) to thus pass, solely that signal which is produced by Reading the bit, at the Address selected, which bit may be either a binary –1– or a binary –0–. If it is a binary –1–, a signal is produced by the squaring inverter 225 (curve H of Fig. 5*e*) at this time and since the "And" circuit 215 is now conditioned by the Drum Read Sample Pulse (curve F of Fig. 5*e*) and its output (curve J of Fig. 5*e*) flips a Drum Register trigger 226 (Fig. 32*d*) one being provided for each of the 36 storage tracks, to thus produce a pulse on line 228 which is fed to the Input-Output circuit, the presence of the signal on this line (see curve K of Fig. 5*e*) being representative of a binary –1– Reading. If the bit stored is a binary –0–, no pulse is produced at the output of "And" circuit 215 so that the corresponding Drum Register trigger 226 is not flipped and no pulse is produced on line 228 or on the Input-Output line, which is thus indicative of a binary –0– being Read at the selected Address. As stated above, all 36 bits, axially of the drum, are located at the given Address, and the respective binary 1's and binary 0's indications are transmitted over the respective lines, to be stored by the components of an MQ register.

Novel means are also provided whereby if no Set Drum signal is provided on line 86*a* (Fig. 10*a* and see also Fig. 32*a*) but the other required signals are provided by the Main Machine, the zero Address will be selected as the first address. Subsequently, further addresses may be selected, as described below, just as if the first Address selected had not been the zero Address.

With no Set Drum signal provided, the Address in the Address Register is not dumped into the drum counter. Also, without the Set Drum signal, the drum counter is not set to all 1's after having been reset to zero, which does occur when Set Drum is provided. Thus the Address in the drum counter is the zero Address.

Thus, with zero Address in the drum, the "And" circuit 127 for Drum Write and the "And" circuit 122 for Drum Read have one input conditioned by the Drum Counter Carry signal. Upon receipt of a Copy signal, Plus On Copy is applied to a second input of each of these "And" circuits. The Copy signal also flips the Plus, On Start Index Search trigger 151 so that upon sensing of the index spot, Plus, After 1st Index Pulse is produced and applied to the "And" circuits 127 and 122, one of which is thus rendered operative depending upon whether Write Drum Select or Read Drum Select is available and conditioning its associated "And" circuit.

Novel Middle Carry means are provided to produce a Middle Carry at each 128 pulses applied to the drum counter and thus provide means whereby each and every successively numbered Address may be selected. As stated in the description of Fig. 8, consecutively numbered Addresses are 128 pulses apart. Thus after the first Address is selected (which may be the zero Address), the successively numbered addresses can all be selected and 16 of these can be selected in one rotation of the drum. The Main Machine will in this case be programmed to provide a Copy signal for each one of these 16 addresses and if all 2048 addresses are to be selected, a Copy signal will be provided for each of the 2048 addresses.

Upon production of the End Carry by the output of the multiple input "And" circuit 67 (Fig. 32*b*) to line 75, and upon production of the Middle Carry, the True End Carry signal is produced on line 78, as described above, and acts on the "And" circuit 79 (Fig. 32*b*) to in turn flip the First Address trigger 83 which thus via line 84*a* maintains one input of the "And" circuit 73 conditioned, all as described above. Subsequent Middle Carries, produced on line 71, will pass through the "And" circuit 73 to produce Drum Ctr. Carry Pulses, for each 128 pulses applied to the drum counter, so that a Drum Read Sample pulse is available on line 214 and applied to the "And" circuit 215 (Fig. 32*d*) to pass the signal produced, on the Reading of each of the consecutively numbered Addresses.

The plus Drum Read Gate is also effective via line 126*a* (Fig. 32*c*) the "Or" circuit 294, the line 296 (Figs. 32*c* and 32*d*), the single-shot multivibrator 297 whose period is 25 microseconds, so that when the single-shot 297 "restores," the fall of the pulse on lines 297*a* and 299 and entitled Reset Copy Trigger, resets the Copy trigger 147 (Fig. 32*c*) Off. Thus a new Copy instruction must be provided, for each Address to be read. This Drum Read Gate signal, via line 126*a*, and the "Or" circuit 294 operates the single-shot multivibrator 297, as just described, and when the single shot "restores" its output is also effective via line 300, as described in detail above in connection with Figs. 15*a* and 15*b* to flip the single-shot multivibrator 301 whose period is 30 microseconds, which, on its return, produces a plus pulse on line 302 which operates the single shot 303 also as described above. Also the plus output of single shot 301 on line 304, during its flipped period, is applied via line 305*a* to the "And" circuit 306 which is now conditioned by a Read Drum Select signal on line 95, whereby a plus signal is transmitted to the line 308 where it appears as the signal Drum Control MQ Read-In, which controls the Read In of the data, just read from the drum, into the MQ register (not shown) of the Main Machine during the flipped period of the single shot 301. When the single-shot multivibrator 303 is flipped it produces a plus Reset Drum Register signal on line 312 during its flipped period which is applied to all of the Drum Register triggers to reset those triggers Off, which were flipped On by the data read. Also via line 313, a plus Drum Copy Proceed signal is transmitted, which, in any desired manner, is utilized to permit the next Copy instruction to be applied to the line 148 (Fig. 32*c*) provided such a Copy instruction is to be given. Therefore, it is seen that the Drum Register is reset between the readings of each Address, the Copy trigger 147 is also reset and Read-In control signals are provided for the MQ register, so that the data Read, may be entered therein, and also a signal is given for any desired further Copy signals to be applied to line 148 whereby the next Address, which may be only 128 sync pulses separated from the Address just read, may in turn be read.

If no Copy signal is available or in other words, if after reading one Address, it is not desired to read another Address, then no Copy signal is available on line 148 and the Copy trigger 147 (Fig. 32*c*) is not flipped, so that no Plus On Copy signal is available via line 124 at "And" circuit 122 and no Drum Read Gate signal is produced. Also, since trigger 147 is not flipped, line 150 is plus, indicating Plus On No Copy so that plus applied via line 150 to one input of an "And" circuit 354. Since trigger 160 (Fig. 32*a*) is still flipped, a Plus, After 1st Index Pulse signal is still available on line 123 to condition another input of this "And" circuit 354. Further, when the Drum Ctr. Carry Pulse is produced on line 82*a*, while it can have no effect on the "And" circuit 122, it is applied via an "And" circuit 355*a* to flip a single-shot multivibrator 356 whose period is 20 microseconds, which thus applies plus to a line 358 to thus condition the third input of this "And" circuit 354 but only during this 20 microsecond period of the single-shot multivibrator 356 so that during the normal reset of the Copy trigger when line 150 goes plus for the duration of this reset, line 358 which is plus for only 20 microseconds will no longer be plus and a false Disconnect signal can not be produced.

The output from the "And" circuit 354, when all three of its inputs are plus, applies a plus Reset Drum Ctr. signal to line 360 (Figs. 32*c* and 32*d*) which in turn applies this signal to line 59 (Figs. 32*d* and 32*b*) whereby as stated above, plus is applied directly to the grids of the right hand triodes of all the eleven triggers of the drum counter, to reset all of the triggers Off and to thus reset the drum counter to zero. This 20 microsecond signal on line 358 is also applied via line 358*a* to the Drum Read "And" circuit 122 and to the Drum Write "And" circuit 127 to render those operative only during this 20 microsecond period, when all other four conditions are also met. Further, since this 20 microsecond pulse must be present to render "And" circuits 122 and 127 operative, upon reading the highest numbered Address, no "hash" can be read between this Address and the Address next to be read.

Also, a plus signal Drum Disconnect produced on line 162 (Fig. 32*c*) acts to reset the Plus, On Start Index Search trigger 151, while the "fall" of this signal is applied via a line 162*a* to the grid of the left hand triode of the First Index Pulse trigger 160, to reset this trigger Off. This signal on line 162, called the Drum Disconnect signal, also acts to terminate the actual operation of the drum by applying this signal via line 162*c*, to produce a disconnect of the drum from the Main Machine, in any desired manner.

If it is desired to Write on Drum #1, instead of Read, the operation is generally the same with certain differences, as will now be pointed out.

The Write Drum Select signal on line 105 (Fig. 32*c*) is provided when a Write operation is desired and this signal is applied to the "Or" circuit 139, instead of a Read Drum Select signal, as described above, and assuming again that the Select Drum #1 signal is again provided on line 94*a*, it is applied via the "Or" circuit 136 to condition one input of the "And" circuit 138. The Write Drum Select signal applied to the "Or" circuit 139 is thus effective via the other input of this "And" circuit 138 to produce an output which is applied via line 141 to one input of the "And" circuit 142 whereby it cooperates with the Copy signal, applied to other inputs of this "And" circuit 142, so that the Copy trigger 147 and the Plus, On Start Index Search trigger 151 will again be flipped, as under the Read instruction. A Plus On Copy signal is now available on line 124 which is applied to the "And" circuit 127, to which the Write Drum Select signal on line 105 is also applied.

Also the output of this "And" circuit 138 is applied via line 141*a* (Figs. 32*c* and 32*a*) to the single-shot multivibrator 157 having a period of 10 milliseconds to allow time for relay pick up and at the end of these 10 milliseconds, plus is applied to one input of the "And" circuit 155. Since the Plus, On Start Index Search trigger 151 has been flipped, a plus voltage is vailable on line 153 so that another input to this "And" circuit 155 is conditioned, so that subsequently, when the drum index spot is sensed, the Drum Index Pulse signal, on line 130, is applied directly to the third input of this "And" circuit 155 so that its output on line 159 flips the plus, After First Index Pulse trigger 160, which, as before, acts via line 123 to apply conditioning potential to another input of the Drum Write "And" circuit 127 (Fig. 32*c*). Thus three of the five inputs to the "And" circuit 127 are plus. It is assumed that the Address at which the data is to be written, has been entered into the drum counter, as described above, so that when this counter counts down to zero, a Drum Ctr. Carry Pulse is again available, as during Read, on line 82*a* which is applied to the fourth input of the "And" circuit 127 so that when line 358*a* is plus, its output is available on line 129 (Figs. 32*c* and 32*d*) as the Drum Write Gate signal and is applied to the "And" circuit 199 to whose other input the Drum Timing Pulses, delayed by 2.4 microseconds are applied via line 198*a*, so that the output of "And" circuit 199 which comprises the Drum Write Pulse is applied to line 203 and thence to one input of each of the "And" circuits 234 and 235. If a binary –1– is to be Written, this appears on the Input-Output Buss as a +10 v. signal, while if a binary –0– is to be Written, this appears as a —30 v. signal. Upon application of the Drum Write Pulse via line 203 to one side of the "And" circuit 234, if a binary –1– is to be written, the +10 v. signal is inverted in inverter 229 and fed via line 231 to inverter 232 where it is again inverted and thus appears as plus on the second input of this "And" circuit 234, whose output is applied via line 241*a* and inverter 241 to be passed via line 242 to the now operated relay contacts of Relay Control to a corresponding head of Drum #1 in which it passes from the left side of the coil of the head to the center tap, to thus Write a binary –1–. Likewise, if a binary –0– is to be written, this appears as plus at the other input of "And" circuit 235 whose output is applied via line 237*a* and inverter 237 to be passed via line 238 to the relay contacts of Relay Control to the head in which it passes from the right side of the coil of the head to the center tap, to thus Write a binary –0–. It is to be particularly understood that each of the 36 heads of Drum #1 will receive its individual binary –1– or binary –0– signal, and that all are written simultaneously.

Writing on the selected Drum #1 is controlled by the Drum Write Gate as just described. Further, this signal is also applied via line 129*a* (Fig. 32*c*), the "Or" circuit 294, and line 296 leading to the single-shot multivibrator 297, which when it restores, after 25 microseconds, acts via line 299, to reset the Copy trigger 147, as under Read.

Also this Drum Write Gate signal when it acts via this line 129*a*, the "Or" circuit 294 and line 296, to flip the single-shot multivibrator 297, is effective when this multivibrator restores, 25 microseconds later, to act via line 300 to flip the single-shot multivibrator 301, which when it restores, 30 microseconds later, acts via line 302 to flip the single-shot multivibrator 303, which applies a 5 microsecond pulse via the line 312 labeled Reset Drum Register, as under Read, and also via line 313 the Drum Copy Proceed signal is transmitted to the Main Machine so that any further desired Copy signals may now be applied to line 148.

As before, if after Writing at the selected Address, no more Copy signals are available, the "And" circuit 142 (Fig. 32*c*) is rendered inoperative, the Copy trigger 147 is not flipped so that no Plus On Copy signal is available via line 124 at "And" circuit 127 so that no further Drum Write Gate signals are produced and also the Drum Disconnect signal will be given, as well as Reset Drum Ctr., to thus terminate the Write condition for the drum and disconnect the drum from the Main Machine as during the Read operations described above.

In summary, there are provided in conjunction with a Main Machine comprising a complete data processing machine, a drum storage device including novel means for selecting an Address on a constantly rotating drum and for selecting consecutively numbered Addresses quickly in succession, either during one single revolution of the drum or during a succession of such revolutions until all 2048 addresses are selected, if so desired. This Address selection is controlled by three instructions provided by the Main Machine which initiate the selection of the first Address and selection of subsequent Addresses, if desired, these being selected from one of four drums and either a Read function or a Write function being selected to be performed at each such Address selected.

Briefly, each logical drum is provided with reading heads for the index pulse track and the sync track and with reading and writing heads for the storage tracks. A single head for each of the storage tracks contains a Read coil and also a Write coil which latter has provision for passing current therethrough, in one direction in order to write a binary –1– and in the other direction to write a binary –0–. Similarly on Reading, the output of a coil is rendered effective to produce a signal representative of a binary –1– but if a binary –0– is Read, no signal is produced, thereby indicating binary –0–. The index track provides an indexing pulse at a time which may be called the starting time of the drum which thus indexes the drum. The 2048 bits of the sync track are written thereon to produce equally spaced pulses or the pulses may all be equally spaced except that a gap is provided between the last pulse and the index pulse. As the sync track is sensed, pulses are produced which are available to step down the single drum counter from the number set therein, which identifies the Address to be Read or at which Writing is to take place. However, the timing pulses are prevented from being applied to the counter to start stepping the Address number down, until all the necessary preliminary conditions are set up by instructions, not only in accordance with the particular drum to be operated but also the function (Read or Write) to be performed. The index pulse also renders ineffective that single pulse from the sync track which would otherwise be produced, at index pulse time.

The three instructions that are required for either Read or Write are:

(1) Either Read Drum or Write Drum Select.
(2) Set Drum.
(3) Copy.

The Read Drum or Write Drum Select is originally represented in the Main Machine by permutations or combinations of the On and Off conditions of a cascade of trigger elements whose On and Off conditions are applied to an interpreting circuit to produce conditioning of either the Read Drum Select line 95 (Fig. 32*c*) or the Write Drum Select line 105 and also to produce a signal on the proper line designating which one of the four drums is to be Read or Written, such as Select Drum #1 for example on line 94*a*.

The Set Drum instruction controls timing pulses provided by the Main Machine which in turn time the setting of the drum counter to ones, prior to transfer thereto of the number indicative of the first Address to be selected and also time the transfer, of the Address to be selected, from the Address Register into the drum counter. The drum counter is always reset to zero prior to being set to 1's and then the Address from the Address Register is dumped therein. This number thus set into the drum counter can not be run down, until the Copy instruction is received.

Only after the Copy instruction has been received can the circuits be set up to initiate Read or Write and this Copy instruction also acts, in conjunction with the Select Drum signal, to start the index search, whereupon the next index pulse Read, starts the run down of the drum counter by producing a Plus, After 1st Index Pulse signal which permits "subsequent" timing pulses, only, to pass to the drum counter, to step it down (except each timing pulse which would otherwise occur, in step with the index pulse). Thus the drum counter is always counted down in step with the drum timing pulses, and when it counts down to zero, the Address desired is at the heads of the storage tracks and at this time, a Drum Write Gate or a Drum Read Gate pulse is provided under control of the Write Drum Select or Read Drum Select signal and also under control of the Copy signal which initiated the operation, a Carry signal being produced when the drum counter counts down to zero, to thus time the Drum Write Gate or the Drum Read Gate.

The Drum Write Gate permits data from the MQ register which comprises part of the Main Machine, to be written at the Address selected and on the drum selected. The drum is selected by relays, which close those relay contacts only of the particular drum selected, to permit the signal produced jointly by the Drum Write Gate, for example, and a delayed Drum Timing Pulse, to permit the data to be Written and on the selected drum only.

Likewise, the drum circuits of a drum, selected to be Read, are controlled by a signal produced jointly by a Drum Read Gate and a delayed Drum Timing Pulse so that only the signals, produced by the bits on the storage tracks at the Address desired, are permitted to pass the "And" circuit 215 (Figs. 12*d* and 32*d*) to flip one of the Drum Register triggers 226 to thus temporarily store the data read and also this flipping of an associated trigger 226 produces a signal on the Input-Output line which is fed to the MQ register, which register is also supplied with the control signal Drum Control MQ Read-In to permit the data to be read into the MQ register, from which it may be transferred to the electrostatic storage of the Main Machine to a punch, to a printer or to any desired storage device.

Each Drum Read or Write Gate also acts to reset the Copy trigger 147 so that a new Copy signal must be provided for each Address to be selected and each Drum Read Gate produces a Reset Drum Register signal after each Read operation.

Also after the counter has once been run backwards to zero to produce an End Carry, each subsequent Middle Carry, which occurs for each 128 pulses applied to the drum counter may be used to Read or Write, at consecutively numbered Addresses, by merely supplying Copy instructions for these Addresses, whereby all Addresses may be Read or Written. This greatly improves the overall operation of the Address selector system.

If after a Read or a Write function has been performed, no further Copy signal is available, then the triggers including the Plus, On Start Index Search trigger 151, the Plus, After First Index Pulse trigger 160 and all the triggers of the drum counter will be reset, while a Drum Disconnect signal disconnects the drum from the Main Machine, to ensure that no further operation of the drum will ensue under control of the Main Machine.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a data storage system for computers and the like, a rotatable drum having a magnetizable periphery, means to rotate said drum, a track extending circumferentially about said drum and containing a number of locations for storing data represented by varying magnetic status, means providing timing signals, one for each of said locations, means providing an index signal to provide a manifestation of the presence of a certain location at a pre-chosen rotative position of said drum, means associated with said track for writing in each of said locations and for reading data stored at each of said locations, and means for addressing said drum to thereby select a chosen location and subsequently other chosen locations to be written upon or read from, said locations including a zero location, said means comprising a single count-down counter, means for operating said counter to transfer to said counter a value manifestation of a first address to be selected, means controlled by said index signal for initiating count-down operation of said counter under control of said timing signals, means providing one series of outputs from said counter and means providing another output from said counter when it counts down to zero, means controlled by said last means to render said first outputs ineffective until production of said second output, means controlled by said second output to produce selection of a first desired address, means controlled by each of said effective first outputs to successively select different desired addresses, and means also controlled by said index means for preventing operation of said counter under control of a timing pulse coincident in time with said index pulse, whereby successive addresses chosen are precessed about the periphery of said drum.

2. A device as in claim 1, and including a plurality of said drums, a source of a read or write signal, a drum selecting signal, a set drum signal and a copy signal, means controlled by said read or write signal for selectively producing read or write at a selected address, means controlled by said drum selecting signal to select a single drum only, means controlled by said set drum signal to control transfer of a desired address to said counter, and means controlled by said copy signal to initiate selection of the address entered into said counter.

3. A device as in claim 1, and including a source of a read or write signal, a set drum signal and a copy signal, and means for selecting said zero location automatically as the first desired address, when no set drum signal is present.

4. A device as in claim 1, and including means for delaying the read or write operation until said single counter has reached a temporary condition of stability.

5. A device as in claim 1, means for receiving and temporarily storing a manifestation of the data read at a selected address, means for resetting said temporary storage means, means for transferring said stored manifestation to outside buffer storage including a transmission line between said temporary and said buffer storage means, and means for delaying said reset until said transmission line has become charged.

6. A device as in claim 1, and including means for temporarily storing a manifestation of data read, prior to transfer of said manifestation to buffer storage, and means producing a delay prior to said transfer to said buffer storage to permit said buffer storage to be adjusted to a preliminary receiving condition.

7. A device as in claim 1, said counter comprising a series of cascade connected dual-stability storage elements, means for resetting said elements to one chosen condition of stability and means controlled by said address transferring means for setting said counter to a chosen pattern prior to transfer thereto of an address to be selected.

8. A device as in claim 2, and including delay means for delaying initiation of operation of the address selecting means until the drum selecting means have operated.

9. A device as in claim 2, and including delay means for delaying initiation of operation of the address selecting means until the manifestation of an address to be selected has been transferred from an outside source to said address selecting means.

10. A device as in claim 2, and including trigger means for storing said copy signal, means for resetting said trigger after selection of an address and means for delaying said reset.

11. A device as in claim 3, and including means rendered operative, when no copy signal is present, to produce a drum disconnect signal.

12. A device as in claim 11, said timing signals comprising equally spaced timing signals except that between the highest number address location and the zero address location a greater spacing is provided, and means for preventing said greater spacing from producing a false disconnect signal when said highest number address is selected comprising means producing a dynamic limited period manifestation that the highest address has been reached, to thus prevent generation of a false disconnect signal.

13. In a data storage system for computers and the like, a rotatable drum having a magnetizable periphery, means to rotate said drum, a track extending circumferentially about said drum and containing a number of locations for storing data represented by varying magnectic status, means providing timing signals, one for each of said locations, means providing an index signal to provide a manifestation of the presence of a certain location at a pre-chosen rotative position of said drum, means associated with said track for writing in each of said locations and for reading data stored at each of said locations, and means for addressing said drum to thereby select any one of said locations as a chosen location and subsequently other chosen locations to be written upon or read from, said means comprising a single count-down counter comprising a cascade connection of elements, means for selectively operating said counter to transfer to said counter a value representative of the address of any one of said locations as a first address to be selected, means controlled by said index signal for initiating count-down operation of said counter under control of said timing signals, means repeatedly producing an output from one of the intermediate elements of said cascade of elements during the operation of said cascade and means controlled respectively by said outputs for producing selections of desired addresses.

14. In a data storage system for computers and the like, a rotatable drum having a magnetizable periphery, means to rotate said drum, a track extending circumferentially about said drum and containing a number of locations for storing data represented by varying magnetic status, means providing timing signals, one for each of said locations, means providing an index signal to provide a manifestation of the presence of a certain location at a pre-chosen rotative position of said drum, means associated with said track for writing in each of said locations and for reading data stored at each of said locations, and means for addressing said drum to thereby select any one of said locations as a chosen location and subsequently other chosen locations to be written upon or read from, said means comprising a single count-down counter including a plurality of elements, means for operating the elements of said counter to transfer to said counter a value representative of the address of any of said locations as a first address to be selected, means controlled by said index signal for initiating count-down operation of said counter under control of said timing signals, means producing one output from said counter from one of said elements when said counter counts down to zero, means producing another effective output from a different element of said counter after a predetermined degree of operation of said counter and means controlled by said outputs for selectively controlling selected different desired addresses.

15. In a data storage system for computers and the like, a rotatable drum having a magnetizable periphery, means to rotate said drum, a track extending circumferentially about said drum and containing a number of locations for storing data represented by varying magnetic status, means providing timing signals, one for each of said locations, means providing an index signal to provide a manifestation of the presence of a certain location at a pre-chosen rotative position of said drum, means associated with said track for writing in each of said locations and for reading data stored at each of said locations, and means for addressing said drum to thereby select a chosen location and subsequently other chosen locations to be written upon or read from, said means comprising a single count-down counter, means for operating said counter to transfer to said counter a value representative of a first address to be selected, means controlled by said index signal for initiating count-down operation of said counter under control of said timing signals, means producing one output from said counter when it counts down to zero, means for producing a second output from said counter after a subsequent predetermined operation thereof, and means controlled by said first means to render said last output effective.

16. In a data storage system for computers and the like, a rotatable drum having a magnetizable periphery, means to rotate said drum, a track extending circumferentially about said drum and containing a number of locations for storing data represented by varying magnetic status, means providing timing signals, one for each of said locations, means providing an index signal to provide a manifestation of the presence of a certain location at a pre-chosen rotative position of said drum, means associated with said track for writing in each of said locations and for reading data stored at each of said locations, and means for addressing said drum to thereby select a chosen location and subsequently other chosen locations to be written upon or read from, said means comprising a single count-down counter, means for operating said counter to transfer to said counter a value representative of a first address to be selected, means controlled by said index signal for initiating count-down operation of said counter under control of said timing signals, means for producing an output from said counter when it counts down to zero, means producing an output from said counter after a predetermined degree of operation thereof, means controlled by said first means to render said last output effective, and means controlled by said zero representing output to produce selection of a first desired address.

17. In a data storage system for computers and the like, a rotatable drum having a magnetizable periphery, means to rotate said drum, a track extending circumferentially about said drum and containing a number of locations for storing data represented by varying magnetic status, means providing timing signals, one for each of said locations, means providing an index signal to provide a manifestation of the presence of a certain location at a pre-chosen rotative position of said drum, means associated with said track for writing in each of said locations and for reading data stored at each of said locations, and means for addressing said drum to thereby select a chosen location and subsequently other chosen locations to be written upon or read from, said means comprising a single count-down counter, comprising a plurality of cascade connected dual-stability storage elements, means for operating said counter to transfer to said counter a first address to be selected, means for resetting said elements to one chosen stable condition and means controlled by said address transferring means for presetting said elements to a chosen pattern of stability conditions prior to transfer thereto of another pattern representative of an address to be selected.

18. In a data storage system for computers and the like, a rotatable drum having a magnetizable periphery, means to rotate said drum, a track extending circumferentially about said drum and containing a number of locations for storing data represented by varying magnetic status, means providing timing signals, one for each of said locations, means providing an index signal to provide a manifestation of the presence of a certain location at a pre-chosen rotative position of said drum, means associated with said track for writing in each of said locations and for reading data stored at each of said locations, and means for addressing said drum to thereby select a chosen location and subsequently other chosen locations to be written upon or read from, said means comprising a single count-down drum counter comprising a plurality of cascade connected dual-stability storage elements, means for resetting said elements to one chosen stable condition, means for transferring an address to be selected to said drum counter, means providing outputs from said counter, means controlled by said outputs for selecting chosen addresses on said drum and means controlled by said index means for preventing operation of said counter under control of one of said timing pulses whereby successive addresses chosen are precessed about the periphery of said drum.

19. In a data storage system for computers and the like, a rotatable drum having a magnetizable periphery, means to rotate said drum, a track extending circumferentially about said drum and containing a number of locations for storing data represented by varying magnetic status, means providing timing signals, one for each of said locations, means providing an index signal to provide a manifestation of the presence of a certain location at a pre-chosen rotative position of said drum, means associated with said track for writing in each of said locations and for reading data stored at each of said locations, and means for addressing said drum to thereby select a chosen location and subsequently other chosen locations to be written upon or read from, said means comprising a single count-down counter, means receiving said index signal and normally ineffective to pass said signal, means controlling said index signal receiving means for rendering said index signal effective, and means comprising a trigger element for storing an indication that said index signal has been rendered effective.

20. A device as in claim 19, and including means for selectively producing a read or write operation at a chosen address, and means controlled by said trigger, by said selective means and by said means rendering said index signal effective, for initiating said read or write function.

21. In a data storage system for computers and the like, a rotatable drum having a magnetizable periphery, means to rotate said drum, a track extending circumferentially about said drum and containing a number of locations for storing data represented by varying magnetic status, means providing timing signals, one for each of said locations, means providing an index signal to provide a manifestation of the presence of a certain location at a pre-chosen rotative position of said drum, means associated with said track for writing in each of said locations and for reading data stored at each of said locations, and means for addressing said drum to thereby select a chosen location and subsequently other chosen locations to be written upon or read from, said means comprising a single count-down counter, means receiving said index signal and normally inffective to pass said signal, means controlling said index signal receiving means for rendering said index signal effective, means comprising a trigger element for storing an indication that said index signal has been rendered effective, means for selectively producing a read or a write operation at a chosen address, and means controlled by said trigger and by said selective means for initiating said read or write function.

22. In a data storage system for computers and the like, a rotatable drum having a magnetizable periphery, means to rotate said drum, a track extending circumferentially about said drum and containing a number of locations for storing data represented by varying magnetic status, means providing timing signals, one for each of said locations, means providing index signals to provide a manifestation of the presence of a certain location at a pre-chosen rotative position of said drum, means associated with said track for writing in each of said locations and for reading data stored at each of said locations, and means for addressing said drum to thereby select a chosen location and subsequently other chosen locations to be written upon or read from, said means comprising a single count-down counter, means for operating said counter to transfer to said counter a value indicative of a first address to be selected, and means controlled by an index signal for initiating count-down operation of said counter under control of said timing signals, and comprising a trigger operated by said index signal, and an AND circuit, controlled by said trigger and by an index pulse signal for producing a manifestation that said index signal has been rendered effective to produce initiation of its control function.

23. A device as in claim 22, and including means for selectively producing a read or a write function at a selected address, said means comprising an AND circuit controlled by said last means, by said trigger and by said indicating means, to initiate said read or write function.

24. In combination, a rotatable drum having a magnetizable periphery, means to rotate said drum, and means for selectively addressing different locations on said drum including means producing synchronously, indications of the respective addressable locations, means providing an index indication of one chosen address of said drum and means controlled by said indexing means for altering the operation of said synchronous means, whereby successive addresses chosen are precessed about said drum.

25. In a data storage system for computers and the like, a rotatable drum having a magnetizable periphery, means to rotate said drum, a track extending circumferentially about said drum and containing a number of locations for storing data represented by varying magnetic status, means providing timing signals, one for each of said locations, means providing an index signal to provide a manifestation of the presence of a certain location at a pre-chosen rotative position of said drum, means associated with said track for writing in each of said locations and for reading data stored at each of said locations, and means operated by said timing signals for addressing said drum to thereby select a chosen location and subsequently other chosen locations to be written upon or read from, means providing outputs from said addressing means, means controlled by said outputs for selecting chosen addresses on said drum and means controlled by said index means for preventing operation of said addressing means under control of one of said timing pulses whereby successive addresses chosen are precessed about the periphery of said drum.

26. In combination, a rotatable drum having a magnetizable periphery, means to rotate said drum, and means for selectively addressing different locations on said drum including means producing synchronously, indications of the respective addressable locations, means providing an indication of the index position of said drum and means controlled by said index indication providing means for rendering less than the total number of said synchronous indications effective whereby successive addresses chosen are precessed about said drum.

27. In combination, a rotatable drum having a magnetizable periphery, means to rotate said drum, and means for selectively addressing different locations on said drum including means producing timing indications indicative of the respective addressable locations, means providing an indication of the index position of said drum and means controlled by said latter means for blocking a selected timing indication whereby successive addresses chosen are precessed about said drum.

28. In a data storage system for computers and the like, a rotatable drum having a magnetizable periphery, means to rotate said drum, a track extending circumferentially about said drum and containing a number of locations for storing data represented by varying magnetic status, means providing timing signals, one for each of said locations, means providing an index signal to provide a manifestation of the presence of a certain location at a prechosen rotative position of said drum, means cooperating with said track for writing in each of said locations and for reading data stored at each of said locations, means for addressing said drum to thereby select any one of said locations as a chosen location and subsequently other chosen locations to be written upon or read from, and means controlled by said index signal for altering the operation of said addressing means whereby successive addresses chosen are precessed about the periphery of said drum.

29. In a data storage system for computers and the like, a rotatable drum having a magnetizable periphery, means to rotate said drum, a track extending circumferentially about said drum and containing a number of locations for storing data represented by varying magnetic status, means providing timing signals, one for each of said locations, means providing an index system to provide a manifestation of the presence of a certain location at a prechosen rotative position of said drum, a single read-write means for said track, means for addressing said drum to thereby select any one of said locations as a chosen location and subsequently other chosen locations to be written upon or read from, and means controlled by said index signal for altering the operation of said addressing means whereby successive addresses chosen are precessed about the periphery of said drum.

30. In a data storage system for computers and the like, a rotatable drum having a magnetizable periphery, means to rotate said drum, a track extending circumferentially about said drum and containing a number of locations for storing data represented by varying magnetic status, means providing timing signals, one for each of said locations, means providing an index signal to provide a manifestation of the presence of a certain location at a prechosen rotative position of said drum, means cooperating with said track for writing in each of said locations and for reading data stored at each location, means for addressing said drum to thereby select a chosen location and subsequently other chosen locations to be written upon or read from, and means controlled by said index signal for preventing operation of said addressing means under control of said timing pulses whereby successive addresses chosen are precessed about the periphery of said drum.

31. In a data storage system for computers and the like, a rotatable drum having a magnetizable periphery, means to rotate said drum, a track extending circumferentially about said drum and containing a number of locations for storing data represented by varying magnetic status, means providing timing signals, one for each of said locations, means providing an index signal to provide a manifestation of the presence of a certain location at a prechosen rotative position of said drum, a single read-write means for said track, means for addressing said drum to thereby select a chosen location and subsequently other chosen locations to be written upon or read from, and means controlled by said index signal for preventing operation of said addressing means under control of said timing pulses whereby successive addresses chosen are precessed about the periphery of said drum.

32. In a data storage system for computers and the like, a rotatable drum having a magnetizable periphery, means to rotate said drum, a track extending circumferentially about said drum and containing a number of locations for storing data represented by varying magnetic status, means providing timing signals, one for each of said locations, means providing an index signal to provide a manifestation of the presence of a certain location at a prechosen rotative position of said drum, means cooperating with said track for writing in each of said locations and for reading data stored at each location, and means for addressing said drum to thereby select a chosen location and subsequently other chosen locations to be written upon or read from, means for transferring addresses to be selected to said addressing means, means providing outputs from said addressing means, means controlled by said outputs for selecting chosen addresses on said drum and means controlled by said index means for preventing operation of said addressing means under control of one of said timing pulses whereby successive addresses chosen are precessed about the periphery of said drum.

33. In a data storage system for computers and the like, a rotatable drum having a magnetizable periphery, means to rotate said drum, a track extending circumferentially about said drum and containing a number of locations for storing data represented by varying magnetic status, means providing timing signals, one for each of said locations, means providing an index signal to provide a manifestation of the presence of a certain location at a prechosen rotative position of said drum, a single read-write means for said track, means for addressing said drum to thereby select a chosen location and subsequently other chosen locations to be written upon or read from, means for transferring addresses to be selected to said addressing means, means providing outputs from said addressing means, means controlled by said outputs for selecting chosen addresses on said drum, and means controlled by said index means for preventing operation of said addressing means under control of one of said timing pulses whereby successive addresses chosen are precessed about the periphery of said drum.

34. In a data storage system for computers and the like, a rotatable drum having a magnetizable periphery, means to rotate said drum, a track extending circumferentially about said drum and containing a number of locations for storing data represented by varied magnetic status, means providing timing signals, one for each of said locations, means providing an index signal to provide a manifestation of the presence of a certain location at a prechosen rotative position of said drum, means cooperating with said track for writing in each of said locations and for reading data stored at each location, means for addressing said drum to thereby select a chosen location and subsequently other chosen locations to be written upon or read from said means including means for receiving a value representative of a first address to be selected, means controlled by said index signal for initiating operation of said addressing means under control of said timing signals, and means controlled by said index signal for preventing operation of said addressing means under control of one of said timing pulses whereby successive addresses chosen are precessed about the periphery of said drum.

35. In a data storage system for computers and the like, a rotatable drum having a magnetizable periphery, means to rotate said drum, a track extending circumferentially about said drum and containing a number of locations for storing data represented by varied magnetic status, means providing timing signals, one for each of said locations, means providing an index signal to provide a manifestation of the presence of a certain location at a prechosen rotative position of said drum, a single read-write means for said track, means for addressing said drum to thereby select a chosen location and subsequently other chosen locations to be written upon or read from said means including means for receiving a value representative of a first address to be selected, means controlled by said index signal for initiating operation of said addressing means under control of said timing signals, and means controlled by said index signal for preventing operation of said addressing means under control of one of said timing pulses whereby successive addresses chosen are precessed about the periphery of said drum.

References Cited in the file of this patent

UNITED STATES PATENTS

| | | |
|---|---|---|
| 2,540,654 | Cohen | Feb. 6, 1951 |
| 2,549,071 | Dusek | Apr. 17, 1951 |
| 2,564,403 | May | Aug. 14, 1951 |
| 2,587,532 | Schmidt | Feb. 26, 1952 |
| 2,594,731 | Connolly | Apr. 29, 1952 |
| 2,609,143 | Stibitz | Sept. 2, 1952 |
| 2,609,439 | Marshall | Sept. 2, 1952 |
| 2,611,813 | Sharpless | Sept. 23, 1952 |
| 2,614,169 | Cohen | Oct. 14, 1952 |
| 2,721,990 | McNaney | Oct. 25, 1955 |
| 2,737,342 | Nelson | Mar. 6, 1956 |
| 2,739,299 | Burkhart | Mar. 20, 1956 |

UNITED STATES PATENT OFFICE

CERTIFICATE OF CORRECTION

Patent No. 2,863,134 December 2, 1958

Werner Buchholz et al.

It is hereby certified that error appears in the printed specification of the above numbered patent requiring correction and that the said Letters Patent should read as corrected below.

Column 36, line 60, for "said" read -- and --.

Signed and sealed this 14th day of April 1959.

(SEAL)

Attest:

KARL H. AXLINE

Attesting Officer

ROBERT C. WATSON

Commissioner of Patents